(12) United States Patent
Yamamoto et al.

(10) Patent No.: US 6,198,553 B1
(45) Date of Patent: Mar. 6, 2001

(54) IMAGE PROCESSING APPARATUS AND METHOD

(75) Inventors: Nobuo Yamamoto, Tokyo; Yasumichi Suzuki, Yokohama; Mitsuru Kurita, Yokohama; Toshiyuki Kitamura, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/683,704

(22) Filed: Jul. 17, 1996

(30) Foreign Application Priority Data

| Jul. 19, 1995 | (JP) | ................................................ 7-182556 |
| Jul. 20, 1995 | (JP) | ................................................ 7-184189 |
| Jul. 20, 1995 | (JP) | ................................................ 7-184225 |

(51) Int. Cl.$^7$ ....................................................... H04N 1/46
(52) U.S. Cl. ........................... 358/520; 358/519; 358/527
(58) Field of Search ................................. 358/518, 519, 358/520, 523, 524, 527, 530; 382/162, 167

(56) References Cited

U.S. PATENT DOCUMENTS

| 4,393,398 | * | 7/1983 | Horiguchi et al. ...................... 358/76 |
| 4,742,387 | * | 5/1988 | Oshima .................................. 358/29 |
| 4,893,178 | * | 1/1990 | Matama et al. ....................... 358/500 |
| 5,012,299 | * | 4/1991 | Sawamura ............................. 355/326 |
| 5,105,263 | * | 4/1992 | Shioda .................................... 358/29 |
| 5,245,419 | * | 9/1993 | Gu ........................................ 358/521 |
| 5,301,017 | * | 4/1994 | Murakami ............................ 348/645 |
| 5,303,071 | * | 4/1994 | Kakimura ............................. 358/519 |
| 5,557,412 | * | 9/1996 | Saito et al. ........................... 358/296 |
| 5,610,997 | * | 3/1997 | Ohta ..................................... 382/218 |
| 5,619,229 | * | 4/1997 | Kumaki ................................ 345/150 |
| 5,831,686 | * | 11/1998 | Beretta ................................. 348/602 |

* cited by examiner

Primary Examiner—Jerome Grant, II
(74) Attorney, Agent, or Firm—Fitzpatrick, Cella, Harper & Scinto

(57) ABSTRACT

An image processor matches a hue of an output image with a hue of a preview image. The image processor generates preview image data to confirm on a display, an output color image generated by an image forming unit. The image processor incudes an input unit which inputs from the image forming unit density data representative of the output color image, the density data depending on the output characteristics of the image forming unit. A conversion unit converts the input density data into luminance data in a predetermined color space, and a color correction unit corrects color of the luminance data in accordance with the display characteristics and observation conditions of the display. The preview image data is generated dependent on the type of display and color temperature of the display.

32 Claims, 44 Drawing Sheets

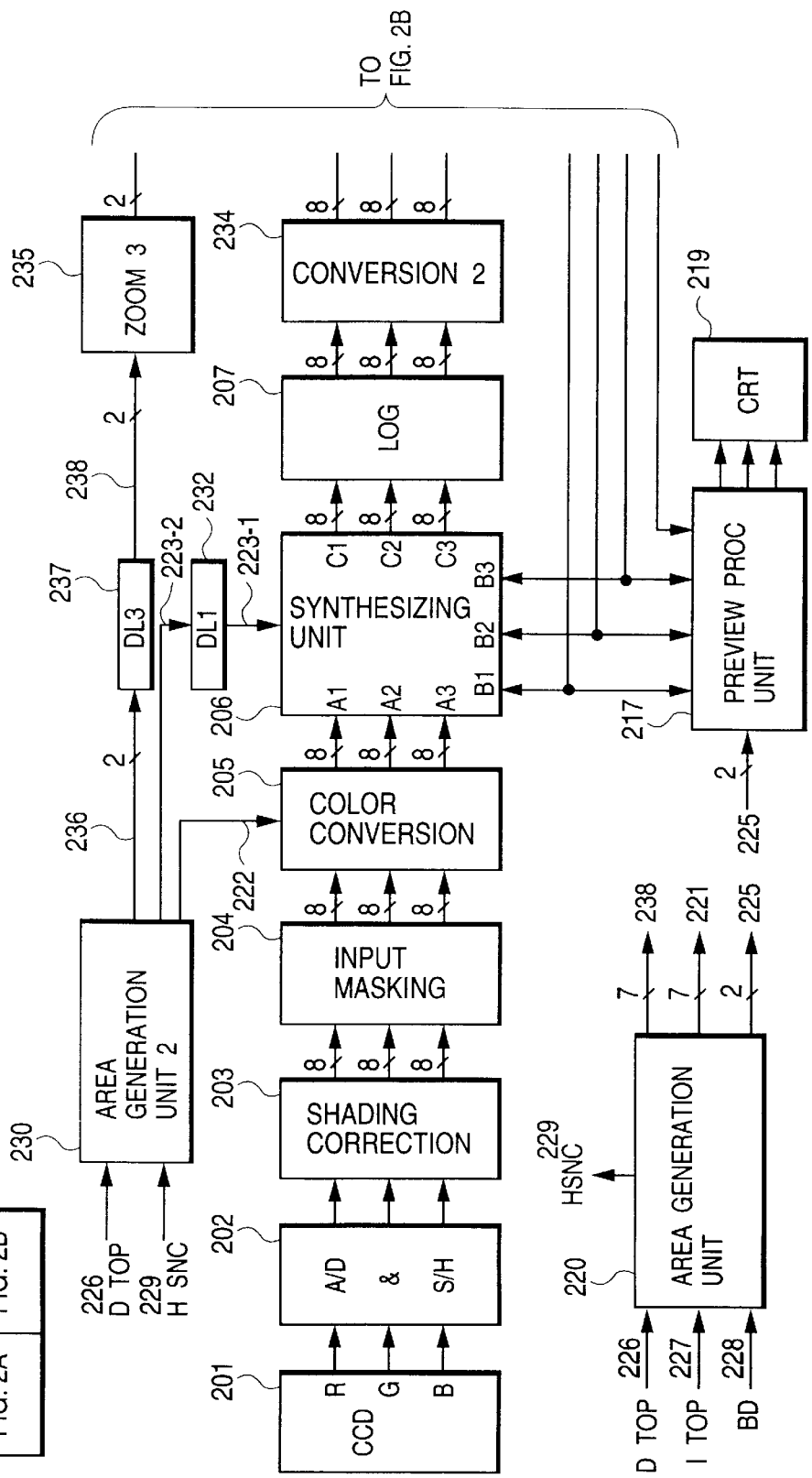

FIG. 41A

| DIRECTORY |
|---|
| PERIPHERAL LIGHT MEASURING MODULE (S21) |
| DISPLAY COLOR MEASURING MODULE (S22) |
| CONVERSION MATRIX OBTAINING MODULE (S23) |
| MATRIX COEFFICIENT CALCULATING MODULE (S24) |
| MATRIX REWRITING MODULE (S25) |
| MIXING AMOUNT CALCULATING MODULE (S26) |
| GAMMA CORRECTION TABLE FORMING MODULE (S27) |
| ...... |

FIG. 41B

| DIRECTORY |
|---|
| PROC SELECTING MODULE (S31, S32) |
| PERIPHERAL LIGHT MEASURING MODULE (S34) |
| COLOR ADAPTATION PREDICTING MODULE (S35) |
| CONVERSION TABLE FORMING MODULE (S36) |
| ... |
| DISPLAY COLOR MEASURING MODULE (S22) |
| CONVERSION MATRIX OBTAINING MODULE (S23) |
| MATRIX REWRITING MODULE (S33) |
| MIXING AMOUNT CALCULATING MODULE (S26) |
| GAMMA CORRECTION TABLE FORMING MODULE (S27) |
| ...... |

IMAGE PROCESSING APPARATUS AND METHOD

BACKGROUND OF THE INVENTION

1. Field of the Invention

The present invention relates to an image processing apparatus and method for performing a color adjustment process for an image before it is printed.

2. Related Background Art

High image quality and sophisticated functions of digital color copiers are becoming more common. A color adjustment process and an editing process for an output image now meet most of requirements of users. Copiers having a so-called preview function are also being manufactured. With this preview function, instead of printing an image several times on recording sheets in order to obtain a desired image, an image is displayed on a CRT or the like.

There are copiers having a monochrome liquid crystal display for displaying and confirming a read original image. For a color copier, however, a preview system of full-color is desired in order to adjust colors.

One example of a preview system is shown in FIG. 42. Blocks 101 to 109 constitute a full-color copier, and blocks 110 to 111, and 219 constitute a preview system.

In FIG. 42, reference numeral 101 represents an RGB output sensor for reading a reflection original, reference numeral 102 represents an S/H and A/D converter, reference numeral 103 represents a shading correction circuit, reference numeral 104 represents an input masking circuit, reference numeral 105 represents a LOG converter circuit, reference numeral 106 represents a masking UCR for adjusting the colors to match the printer characteristics, reference numeral 107 represents an image editing circuit for performing various processes such as trimming, masking, painting, and a variable power process, reference numeral 108 represents an edge emphasis circuit, and reference numeral 109 represents a printer unit for scanning a reflection original three or four times to print a full-color image.

Reference numeral 110 represents an image memory unit for storing image signals (RGB) after input masking, reference numeral 111 represents a memory control circuit for controlling the image memory 110 (the memory control circuit having an address counter and controlling data transfer between an unrepresented CPU and image memory), and reference numeral 219 represents a CRT for displaying data in the image memory. If a read image is simply displayed on a CRT, a desired editing process entered from an operation unit is not reflected in the image.

There may sometimes be a hue difference between the printed image of a digital color copier and the preview image.

SUMMARY OF THE INVENTION

The invention has been made under the above circumstances and aims at matching hues of an output image and a preview image.

The invention also aims at matching hues of an output image and a preview image irrespective of the display characteristics of a display device and the observation conditions.

According to one aspect of the present invention, there is provided an image processing apparatus for generating preview image data to confirm on a display, an output color image generated by an image forming apparatus, comprising: input means for inputting from the image forming apparatus density data representative of the output color image, the density data depending on the output characteristics of the image forming apparatus; conversion means for converting the input density data into luminance data on a predetermined color space; and color correction means for correcting color of the luminance data in accordance with the display characteristics and observation conditions of the display, and generating the preview image data being dependent on the display.

The invention also aims at readily making a white color temperature of a display device and an ambient light color temperature equal to each other.

According to another aspect of the present invention, there is provided an image processing apparatus comprising: measurement means for measuring a first color temperature of a white color of a display and a second color temperature of ambient light; and conversion means for converting an input image signal into an image signal for the display in accordance with the measurement results of the measurement means, wherein the conversion means performs an image signal conversion so as to match the first color temperature with the second color temperature.

The above and other objects of the invention will become apparent from the following detailed description and the claims when read in connection with the accompanying drawings.

BRIEF DESCRIPTION OF THE DRAWINGS

FIGS. 41A and 41B are diagrams showing examples of a memory map of a storage medium which stores program codes.

DETAILED DESCRIPTION OF THE PREFERRED EMBODIMENTS

First Embodiment

Figure 1:
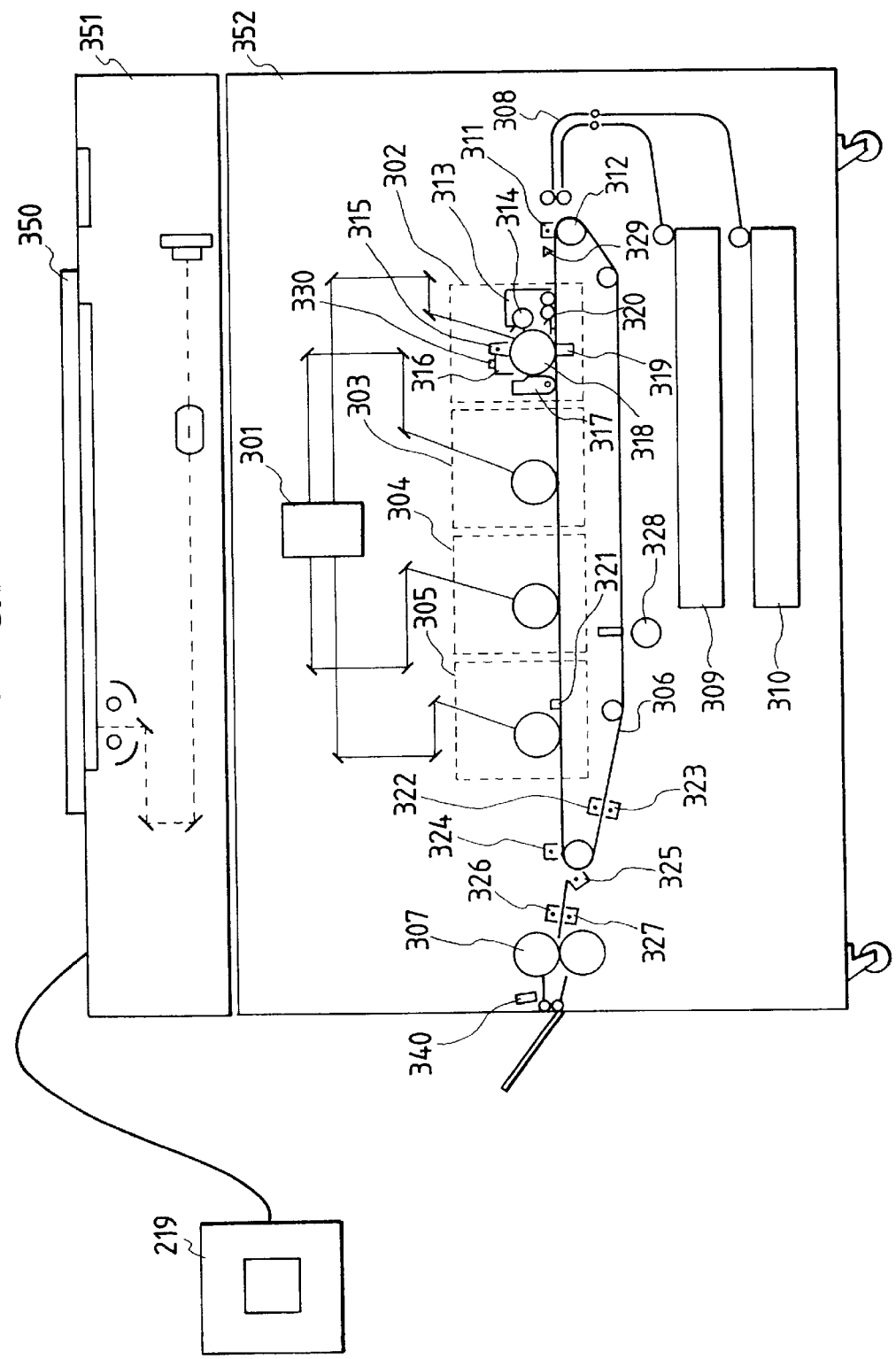
FIG. 1 is a schematic diagram showing an example of an image forming apparatus according to a first embodiment of the invention.

FIG. 1 is a schematic diagram showing the structure of a copier according to the first embodiment.

The color copier of this embodiment is constituted by a color reader unit 351 and a printer unit 352. The color reader unit 351 reads a color original and executes a digital editing process and the like. The printer unit 352 produces a color image in accordance with a digital image signal for each color sent from the reader unit 351.

The color copier has a digitizer 350 and a monitor 219 for displaying a preview image. The monitor 219 is connected to the copier by a VGA interface.

Structure of Printer Unit

Referring to FIG. 1, reference numeral 301 represents a polygon scanner for scanning a laser beam on a photosensitive drum 318, reference numeral 302 represents a first stage magenta (M) image forming unit, and reference numerals 303, 304, and 305 represent cyan (C), yellow (Y), and black (K) image forming units having the same structure as the magenta image forming unit 302. The polygon scanner 301 scans the photosensitive drum 318 with a laser beam of each color radiated from a laser element independently driven for MCYK by a laser controller unit.

In the image forming unit 302, the photosensitive drum 318 forms a latent image through exposure to a laser beam, and a developing unit 313 develops the latent image into a toner image on the photosensitive drum 318. In the developing unit 313, a sleeve 314 performs toner development by applying a developing bias. Reference numeral 315 represents a primary charger for charging the photosensitive drum 318 to a desired potential. Reference numeral 317 represents a cleaner for cleaning the surface of the drum 318 after the image transfer. Reference numeral 316 represents an auxiliary charger for discharging the surface of the drum 318 cleaned with the cleaner 317 to allow good charging by the primary charger 315. Reference numeral 330 represents a pre-exposure lamp for removing residual charges on the drum 318. Reference numeral 319 represents a transfer charger for discharging the drum from the back surface side of a transfer belt 306 to transfer the toner image on the drum 318 to a recording sheet.

Reference numerals 309 and 310 represent a cassette for accommodating recording sheets. Reference numeral 308 represents a paper feeder for feeding recording sheets one after another from the cassettes 309 and 310. Reference numeral 311 represents a suction charger for sucking and attaching a recording sheet fed from the feeder unit to the transfer belt 306. Reference numeral 312 represents a transfer belt roller for rotating the transfer belt 306 and for sucking and attaching a recording sheet to the transfer belt 306 together with the suction charger 311.

Reference numeral 324 represents a discharger used for making a recording sheet easy to be separated from the transfer belt 306. Reference numeral 325 represents a charger used for eliminating an image disturbance to be caused by discharge when a recording sheet is separated from the transfer belt. Reference numerals 326 and 327 represent a pre-fixation charger used for eliminating an image disturbance for supplementing a suction force of the toner on the recording sheet after separation. Reference numerals 322 and 323 represent a transfer belt discharger for discharging the transfer belt 306 to electrostatically initialize it. Reference numeral 328 represents a belt cleaner for removing stains or dust on the transfer belt 306. Reference numeral 307 represents a thermal fixing unit for thermally fixing a toner image charged again by the pre-fixation chargers 326 and 327 on a recording sheet. Reference numeral 340 represents a paper discharge sensor for detecting a recording sheet on a transport path along the fixing unit. Reference numeral 329 represents a paper front end sensor for sensing the front end of a recording sheet fed by the feeder unit 308 to the transfer belt. A detection signal of the paper front end is supplied from the printer unit 352 to the reader unit 351 and used for generating a sub scan synchronization signal which is used for the transmission of a video signal from the reader unit to the printer unit.

Structure of Reader Unit

FIG. 2 is a block diagram showing a digital image processing unit of the reader unit 351. A color original placed on the original support is exposed. An image reflected from the original is picked up by CCD 201, output signals from which are sampled and held and thereafter converted by an A/D and S/H circuit 202 into three-color RGB digital signals. These color separated digital signals are subjected to a shading and black correction by a shading correction circuit 203, converted into an RGB signal on a predetermined color space of CCD 201 by a masking circuit 204, and color converted by a color conversion circuit 205 to supply the color converted signal to a synthesizing unit 206. The synthesizing unit 206 synthesizes the image data of a reflection original and the output data of an image memory 208, the synthesized result being subjected to a LOG correction process by a LOG conversion circuit 207 and to a variable power process (when a variable power is set) by a second variable power circuit 234. The variable power process is actually an enlargement process because the compression process by the image memory unit 208 operates as a low-pass filter. An output of the second variable power circuit 234 is input to the image memory unit 208.

The image memory unit 208 is constituted by three fields including a compression field, an image memory field, and an expansion field. The second variable power circuit 234 supplies one series of outputs to the image memory unit 208. There are four series of outputs to the masking UCR unit 212 because CMY data (24 bits×4) before an output masking process corresponding to the four drums are read from the image memory unit 208 synchronously with the image forming by the four drums.

The image memory unit 208 becomes necessary for correcting a difference between timings because the printer shown in FIG. 1 has each image forming unit at a different position and the image data of each image forming unit is different in position on the display screen. Compression and expansion is used for reducing the amount of image data and hence the memory capacity.

Reference numeral 212 represents a masking UCR unit for generating color signals for the respective drums, the color signals matching the printer characteristics. Reference numeral 213 represents an editing circuit for a free color process and a paint process. The edited result is subjected to a gamma correction by a gamma correction circuit 214, to a variable power process (specifically, a reduction process) by a first variable power circuit 211, and to an edge emphasis process by an edge emphasis circuit 215, and sent to a color LBP 216.

The masking UCR unit 212, editing circuit 213, gamma correction circuit 214, first variable power circuit 211, and edge emphasis circuit 215 each have four series of processing circuits corresponding to the four drums, and each series processes synchronously with the image forming by each drum.

Reference numeral 217 represents a preview processing unit which is constituted by a CRT image memory for storing edited image data and a memory control unit for controlling the CRT image memory. Reference numeral 219 represents a CRT display for displaying data in the CRT image memory.

Reference numeral 220 represents an area generating unit. This area generating unit 220 outputs a signal 229 which is either a signal generated from a main scan synchronization signal or a BD signal 228 output from LBP 216. The area generating unit 220 is inputted with a DTOP signal 226 output from the image front end sensor, and an ITOP signal 227 generated in LBP 216 (during printer output, a sub scan enable signal synchronous with the rotation of each drum is generated in response to this signal). The area generating unit 220 outputs: a signal 221 for controlling the image memory 208, including two write enable signals (a main scan write enable signal 221-1 and a sub scan write enable signal 221-2) and five read enable signals (a main scan read enable signal 221-3 and sub scan read enable signals 221-M, 221-C, 221-Y, and 221-K); signals 238 (a main scan write enable signal 238-1, a sub scan write enable signal 238-2, a main scan read enable signal 238-3, and sub scan read enable signals 238-M, 238-C, 238-Y, and 238-K) generated synchronously with the ITOP signal 227 while considering delays at the compression and expansion fields of the image memory 208 to adjust the timing of the image signal and an area signal; and an enable signal 225 (for main scan and sub scan) for a CRT image memory for the preview process.

The read enable signal used for independently controlling the four series for reading image data from the image memory unit 208 is different when it is used for the image forming or for the preview display.

Specifically, when the read enable signal is sued for the image forming, it is synchronized with the image forming by each drum, and sub scan enable signals 221-(M to K) are output in accordance with the positions of the four drums. When the read enable signal is used for the preview display, the sub scan enable signals 221-(M to K) are output at the same timing.

Reference numeral 230 represents a second area generating unit for generating an area signal for each editing process. This unit is constituted by a bit map memory and a bit map memory controller (e.g., AGDC (Advanced Graphic Display Controller)) for controlling the bit map memory. A write operation is controlled by CPU 240, whereas a read operation is performed synchronously with an HSNC signal 229 and the DTOP signal 226 synchronizing with the scanning an original image.

CPU 240 calculates an area in accordance with a point designated by a digitizer, and writes it in the second area generating unit 230.

If an area is corrected while observing the preview display, the area stored in the second area generating unit 230 is modified under the control of CPU 240.

A signal 205 is an enable signal of the color conversion circuit, a signal 223-2 is an enable signal of the image synthesis circuit, and a signal 236 is an enable signal of the masking UCR unit 212 and the editing circuit 213 for performing the free color mode, paint mode, and the like.

An area memory unit 231, delay circuits 232 (DL1), 233 (DL2), and 237 (DL3), and a third variable power circuit 235 operate to adjust a timing when the image signal and area signal are synchronized together.

Specifically, the delay circuit DL1 delays the output signal 223-2 of the area generating unit 230 by a process time required by the color conversion circuit 205. A pixel delay is achieved by a D-type flip-flop and a line delay is achieved by a FIFO memory.

The delay circuit DL2 delays the output signal 226 of the area memory unit 231 by a process time required by the masking UCR circuit 226. A pixel delay is achieved by a D-type flip-flop and a line delay is achieved by a FIFO memory.

The delay circuit DL3 delays the output signal 236 of the area generating unit 230 by a process time required by the color conversion circuit 205, image synthesizing circuit 206, and LOG conversion circuit 207. A pixel delay is achieved by a D-type flip-flop and a line delay is achieved by a FIFO memory.

The variable power circuit 235 actually performs an enlargement process and is controlled in quite the same manner as the variable power circuit 234 (delay times are the same).

The area memory unit 21 compensates for the process time required by the image memory unit, and supplies control signals which are different for each color, in response to a signal 238.

Reference numeral 240 represents a CPU which controls a program ROM 241 and a working RAM 242 via a CPU bus 243. Each circuit described earlier is connected to the CPU bus 243 and is set with data by CPU 240 via the CPU bus 243.

An operation unit 224 is used for designating various displays and for setting various parameters, to be described later.

Signal Flow in Each Image Mode

A flow of a video signal and setting an I/O port in each mode will be described with reference to FIGS. 2A and 2B.

Normal Copy

The flow of a video signal is 201→202→203→204→205→206 (A input→C output) →207→234→208 →212→213→214→211 215→216.

The sub scan read enable signals 221-(M to K) and 238-(M to K) are controlled to become enable in accordance with the distances between the respective color drums.

Display of RGB Editing Process (Color Conversion) Result on CRT

The flow of a video signal is 201→202→203→204→205→206 (A input→C output) →207→234→208 →212→213→214→211 215→217→219.

In this mode, data in the image memory unit 208 is updated each time the editing contents are modified in the preview mode so that each time the data is displayed on CRT, the original is read (the flow of a video signal is repeated starting from 201). At this time, the sub scan read enable signals 221-(M to K) and 238-(M to K) rise and fall at the same time.

For printing out an image after the preview, the optical scanning is not performed but printing is performed simply by reading the data from the image memory 208. At this time, the sub scan enable signals 221-(M to K) are controlled to become enable in accordance with the distances between the respective color drums.

Display of CMYK Editing Process (Paint, Free Color) Result on CRT

The flow of a video signal is 201→202→203→204→205→206 (A input→C output) →207→234→208 →212→213→214→211→215→217→219.

In this mode, data in the image memory unit 208 does not change with the editing contents in the preview mode so that for displaying the data on CRT at the second and following times, the optical scan is not performed but the data is displayed simply by changing the editing parameters and reading the data from the image memory 208 (the flow of a video signal starts from 208).

At this time, the sub scan read enable signals 221-(M to K) and 238-(M to K) rise and fall at the same time.

For printing out an image after the preview, the optical scanning is not performed but printing is performed simply by reading the data from the image memory 208.

At this time, the sub scan enable signals 221-(M to K) are controlled to become enabled in accordance with the distances between the respective color drums.

Display of Synthesis Result on CRT (1) The flow of a video signal, when a first image is written, is 201→202→203→204→205→206 (A input→C output)→207→208.

(2) The flow of a video signal, when the first image is synthesized with a second image and the result is written in the image memory 208, is as follows.

(2-1) For memory output, the flow is 208→212→213→211→214→215→206. In this case, the data passes through the masking UCR circuit 212 without any process, and the gamma correction circuit 214 is set with an inverse LOG table.

(2-2) For a video signal from a reflection original, the flow is 201→202→203→204→205→206.

(3) The flow of an output from the synthesis circuit is 206→207→208 (memory write), and the flow to a CRT output is 208→212→213→214→211→215→217→219.

Settings in Editing Mode and Printing with Preview Function

The overall flow will be described with reference to FIG. 3.

First, an editing process is selected from the operation unit (FIG. 11) (S402), next, at least one of a color conversion process (S406), a paint process (S407), and a free color process (S408) is selected, and final parameters are determined using the preview function and the like (S403). The final image is printed out (S405) in response to turning on a copy button (S404).

The procedure of each image process mode will be described.

(1) Color Conversion Process

Figure 4:
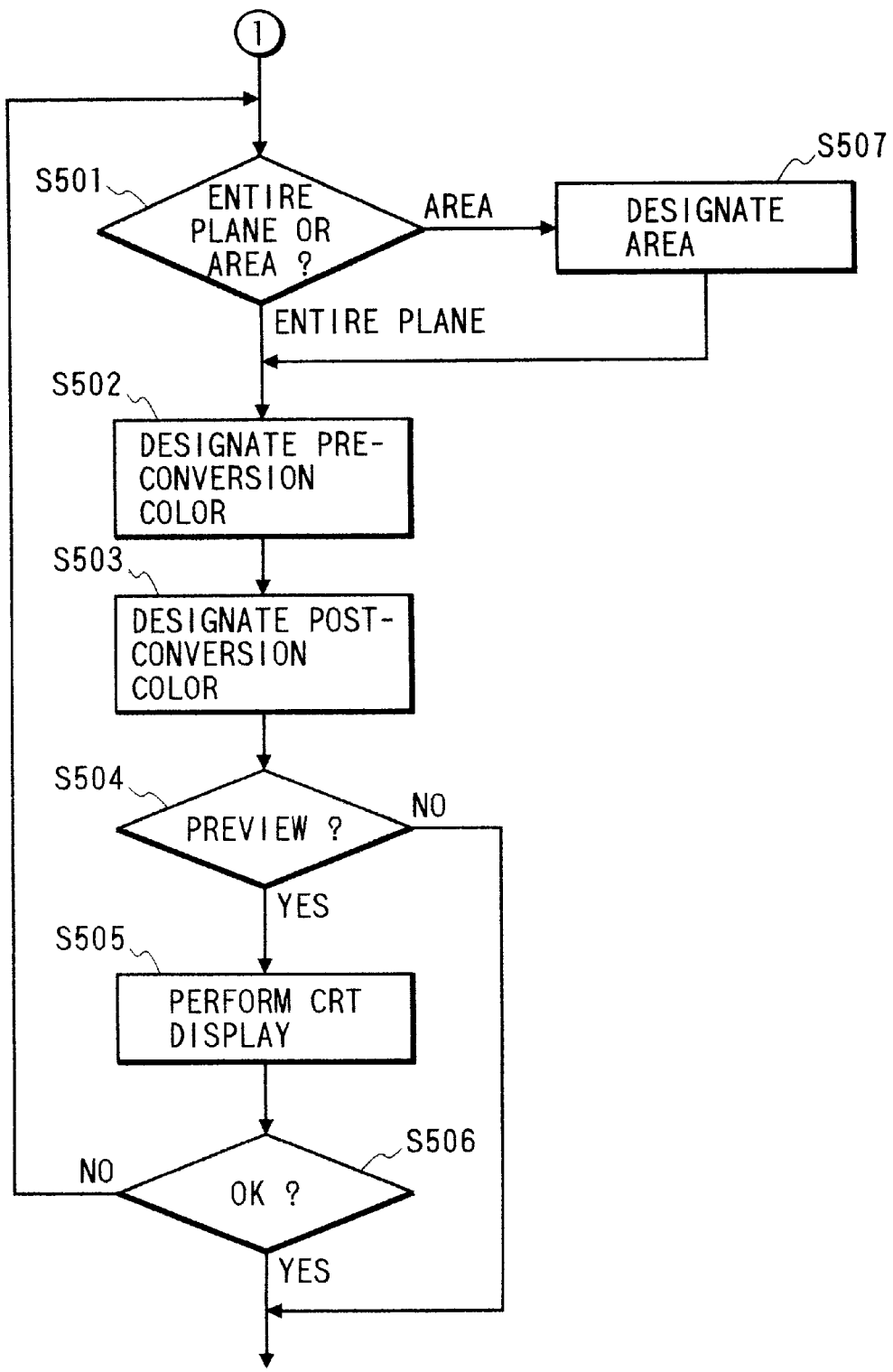
FIG. 4 is a flow chart illustrating an example of the operation of a color conversion process of the first embodiment.

The color conversion process will be described with reference to the flow chart of FIG. 4. For the color conversion process, either an entire surface color conversion or an area color conversion is selected (S501). If the area color conversion, an area is set, for example, by using an unrepresented digitizer (S507). Next, a pre-conversion color is designated (S502) and a post-conversion color is designated (S503) to determine data necessary for the color conversion. When a preview function is selected at S504 (e.g., by depressing a preview button 50105), a reflection original placed on the original support is read and the read data is processed in the order described with the above paragraph (Display of RGB Editing Process (Color Conversion) Result on CRT) to display it on CRT at S505. If an operator is satisfied with the displayed result, another editing process is set or the displayed result is printed out, whereas if not satisfied, the setting is repeated until the operator is satisfied (S506).

(2) Paint Process

Figure 5:
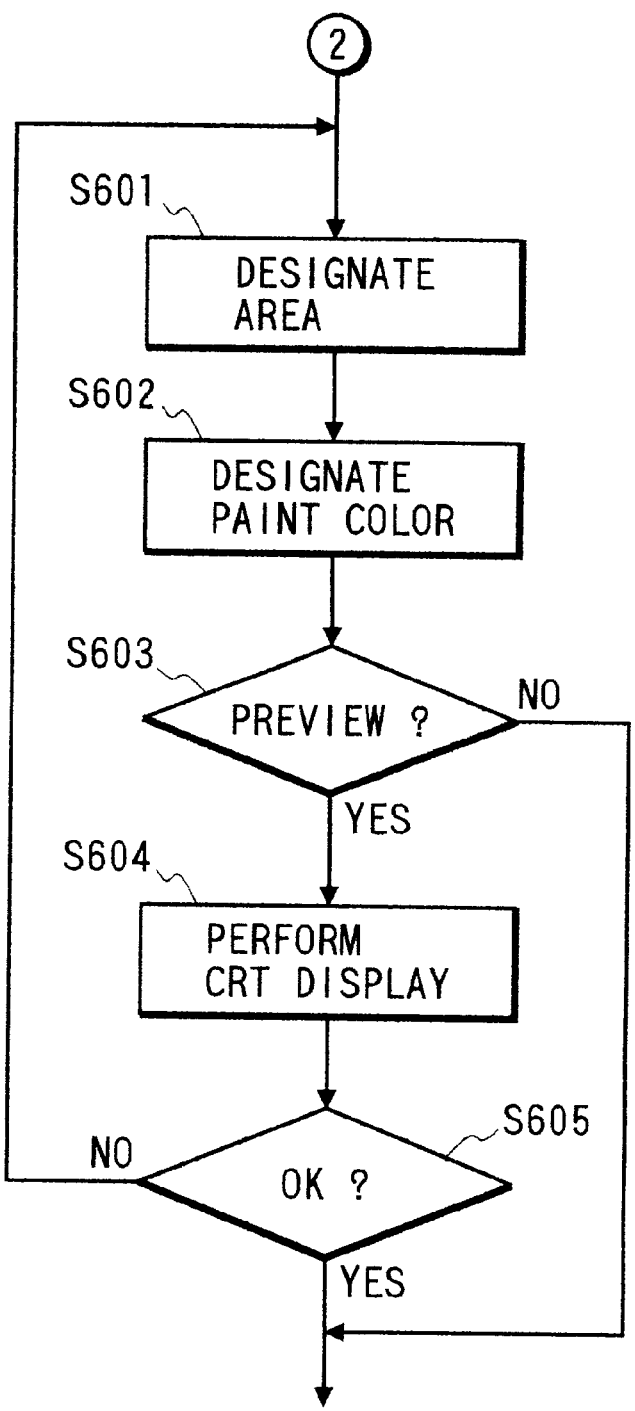
FIG. 5 is a flow chart illustrating an example of the operation of a paint process of the first embodiment.

The paint process will be described with reference to the flow chart of FIG. 5. For the paint process, an area is set, for example, by using an unrepresented digitizer (S601). Next, a paint color is designated at S602. When a preview function is selected at S603, a reflection original placed on the original support is read and the read data is processed in the order described with the above paragraph (Display of CMYK Editing Process (Paint, Free Color) Result on CRT) to display it on CRT at S604. If an operator is satisfied with the displayed result, another editing process is set, final parameters are set, or the displayed result is printed, whereas if not satisfied, the setting is repeated until the operator is satisfied (S605).

(3) Free Color Process

Figure 6:
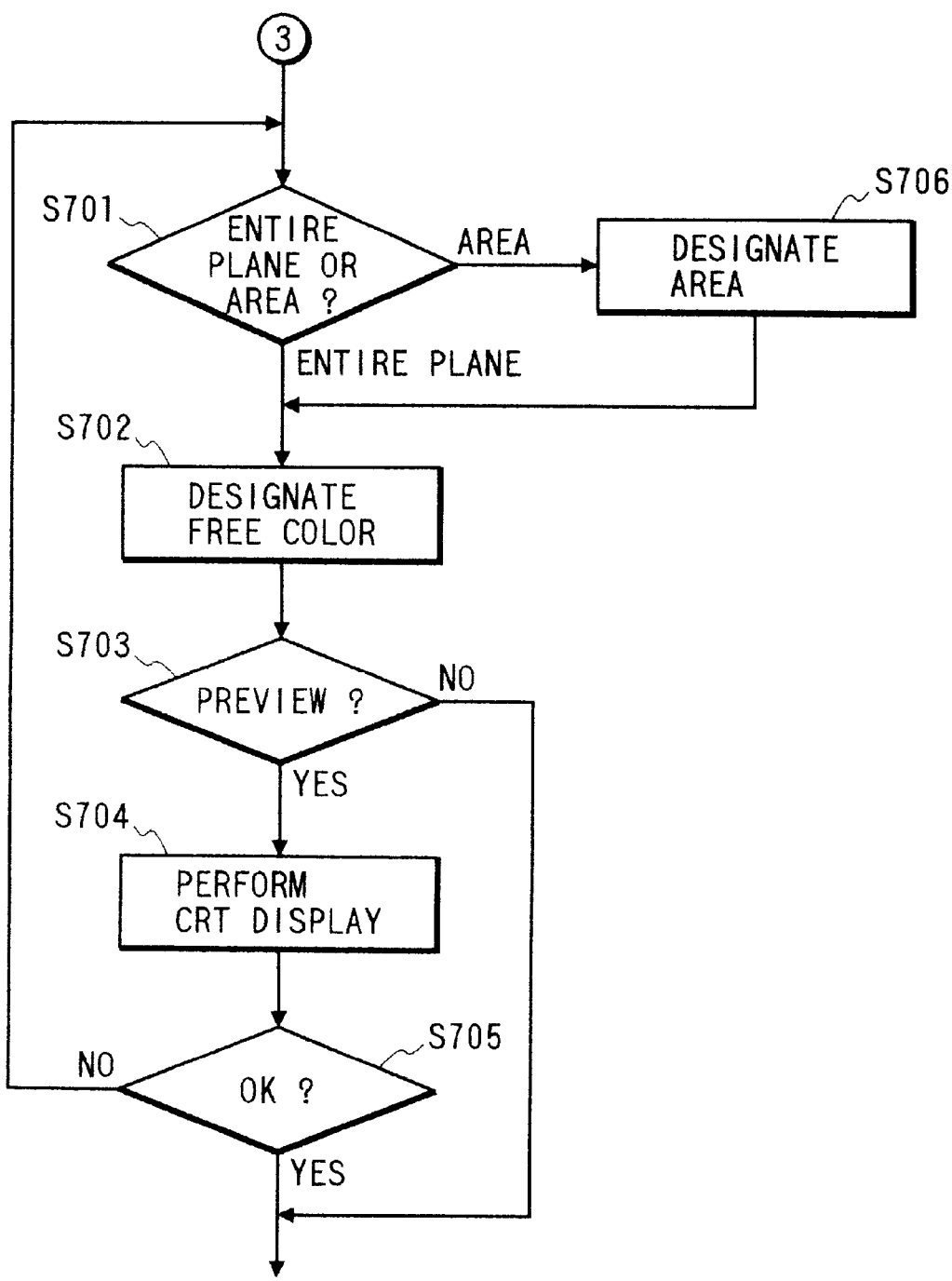
FIG. 6 is a flow chart illustrating an example of the operation of a free color process of the first embodiment.

The free color process will be described with reference to the flow chart of FIG. 6. For the free color process, either an entire surface mode or an area mode is selected (S701). If the area mode, an area is set, for example, by using an unrepresented digitizer (S706). At S702, a color for the free color process is designated. When a preview function is selected at S703, a reflection original placed on the original support is read and the read data is processed in the order described with the above paragraph (Display of RGB Editing Process (Color Conversion) Result on CRT) to display it on CRT at S704. If an operator is satisfied with the displayed result, another editing process is set or the displayed result is printed out, whereas if not satisfied, the setting is repeated until the operator is satisfied (S705).

Description of Color Conversion Circuit

Figure 9:
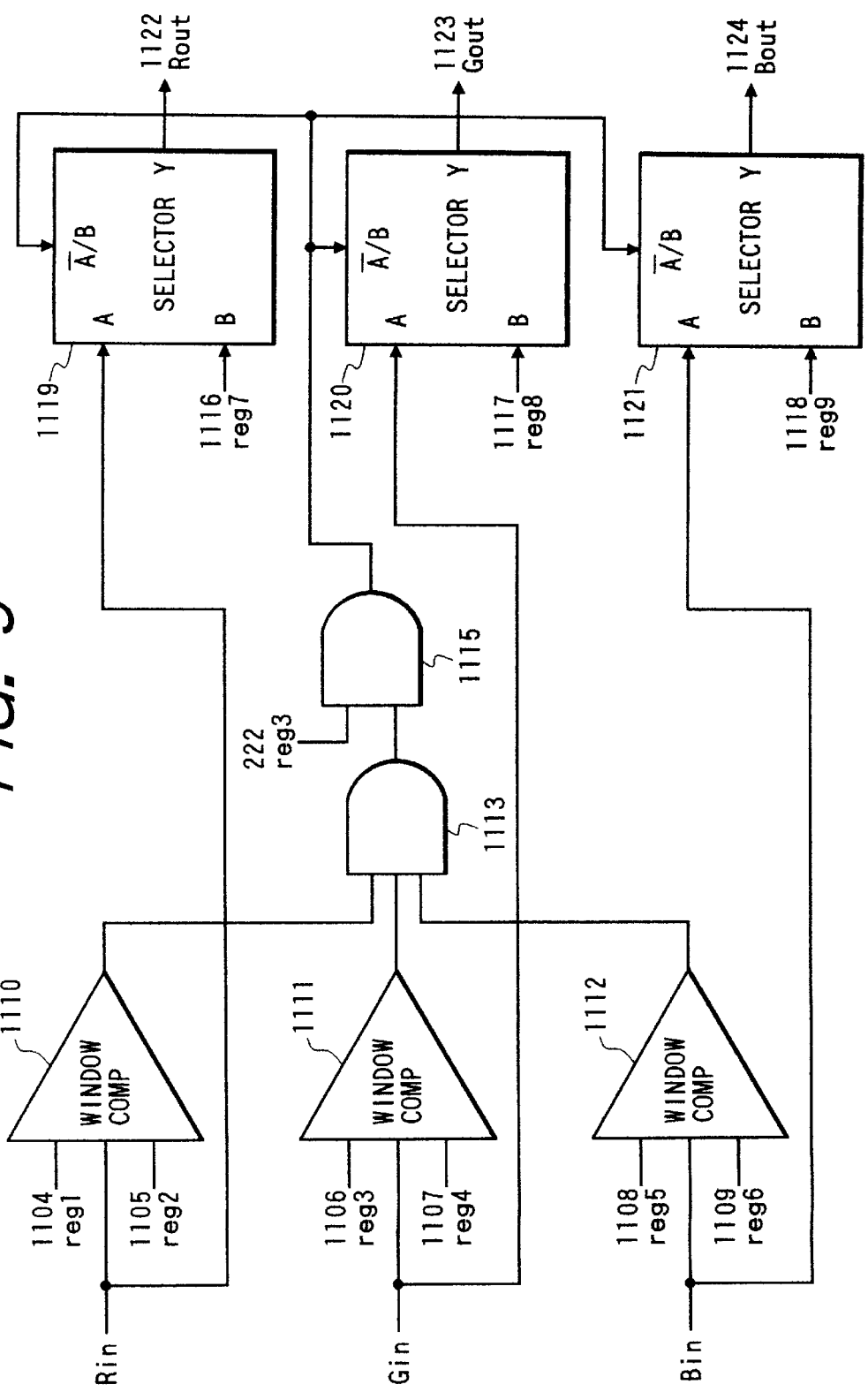
FIG. 9 is a diagram showing an example of the structure of a color conversion circuit of the first embodiment.

FIG. 9 is a diagram illustrating a color conversion process.

The color conversion process unit is divided in a detection unit and a conversion unit.

The detection unit is constituted by three window comparators 1110, 1111, and 1112, two AND gates 1113 and 1115, and registers 1104 to 1109 set by CPU 240 for controlling the comparators and gates. In operation, under the conditions that:

$reg1 \leq$ input video R (1101)$\leq reg2$ $reg3 \leq$ input video G (1102)$\leq reg4$ $reg5 \leq$ input video B (1103)$\leq reg6$, the three window comparators 1110 to 1112 and two AND gates 1113 and 1115 output "1" and a certain characteristic color only is detected (where the area signal 212 is "1").

The conversion unit is constituted by three selectors 1119, 1120, and 1121 and registers 1116 to 1118. If an output of the AND gate 1115 is "1", the contents of the registers 1116 to 1118 set by CPU 240, i.e., converted colors are output as signals 1122 to 1124, whereas if the output is "0", the video signals themselves (1101 to 1103) are directly output.

Description of Paint, Free Color circuit

Figure 10:
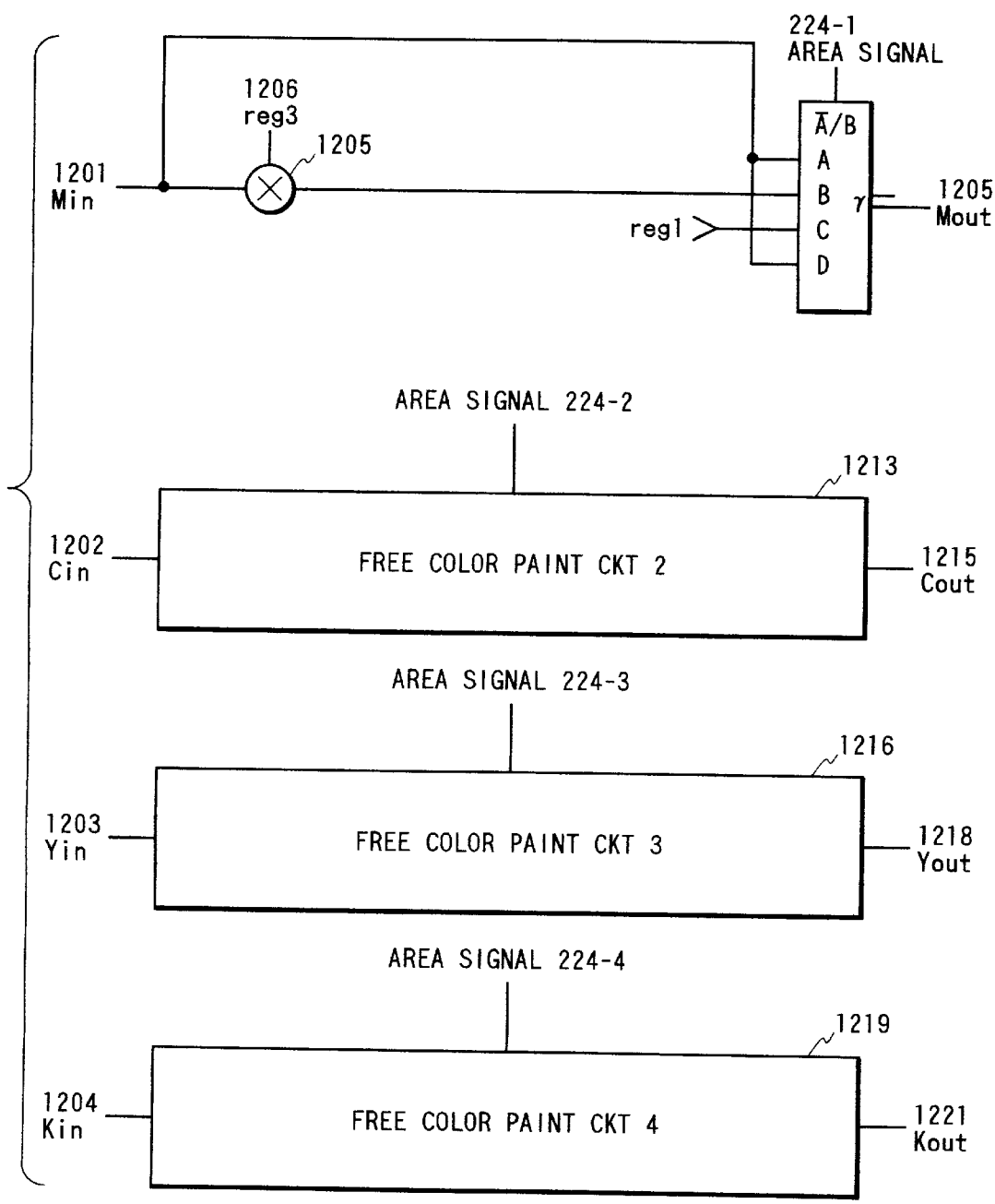
FIG. 10 is a diagram showing an example of the structure of a free color paint circuit of the first embodiment.

FIG. 10 is a block diagram illustrating a free color paint process.

The free color paint circuit is constituted for each color video signal by a multiplier 1205, a selector 1210, and registers 1206 and 1207 set by CPU 240.

In operation, for the free color process, an ND signal (M/3+C/3+Y/3) generated by the masking UCR circuit and data in the register reg3 1206 which is determined by a color designated by a user are multiplied by the multiplier 1205. An output of the multiplier is selected by the selector 1210 and output (1212). If the free color process is to be performed for part of an original, the area signal 224-1 is set to "1" only for the processed area (in this case, the signal 224-2 is set to "0"). In this case, the masking UCR circuit is controlled in accordance with the signal 226 so that the ND signal is output only for this area signal.

For the paint process, the selector 1210 is controlled to set the area signal 224-2 to "1" so that the register reg1 1207 set by CPU 240 is set (in this case, the signal 224-1 is set to "0").

Reference numeral 1213 represents a free color paint circuit for cyan (C), reference numeral 1216 represents a free color paint circuit for yellow (Y), and reference numeral 1219 represents a free color paint circuit for black (B). The inputs of these circuits are Cin 1202, Yin 1203, and Kin 1204, and the outputs thereof are Cout 1215, Yout 1218, and Kout 1221. These circuits are controlled by a second area signal 224-2, a third area signal 224-3, and a fourth area signal 224-4.

When the preview image is displayed on CRT, the signals 224-1 to 224-3 are controlled to be enabled at the same time.

Description of Preview Processing Unit

Figure 7:
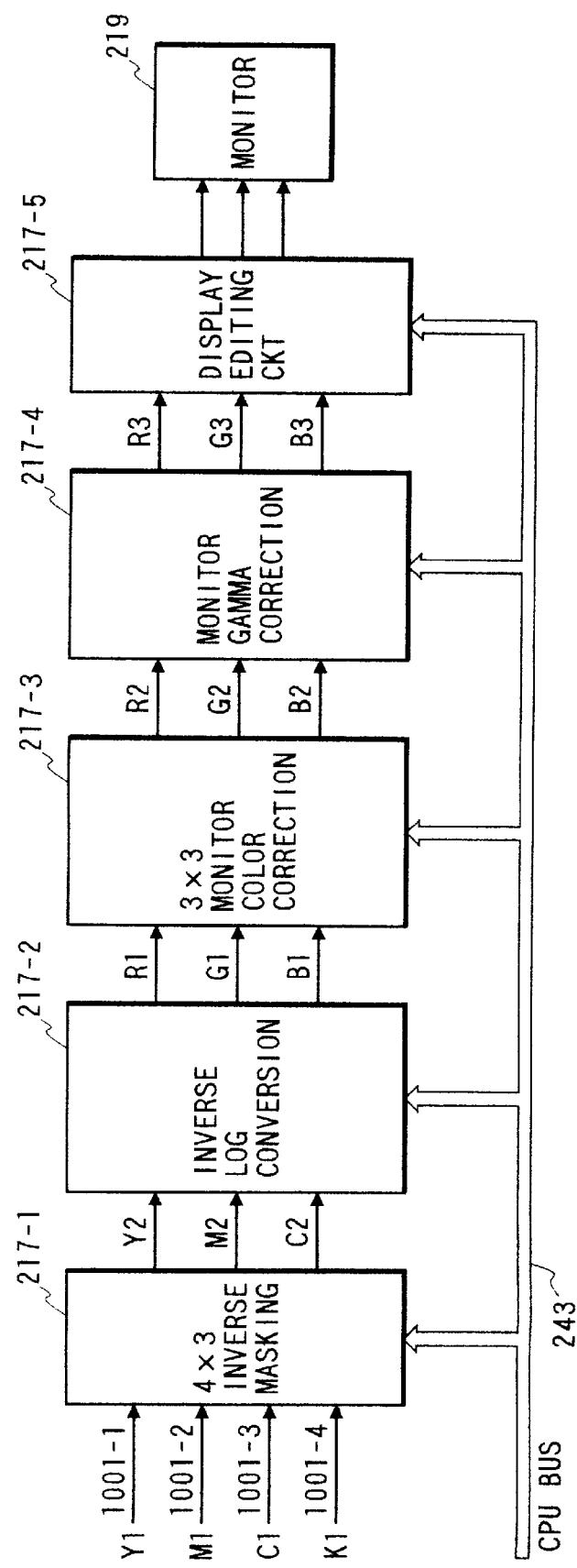
FIG. 7 is a diagram showing an example of the structure of a preview processing unit of the first embodiment.

FIG. 7 is a block diagram of a preview processing circuit for processing read image data at all the processing circuits and displaying the final image on CRT 219.

Figure 2B:
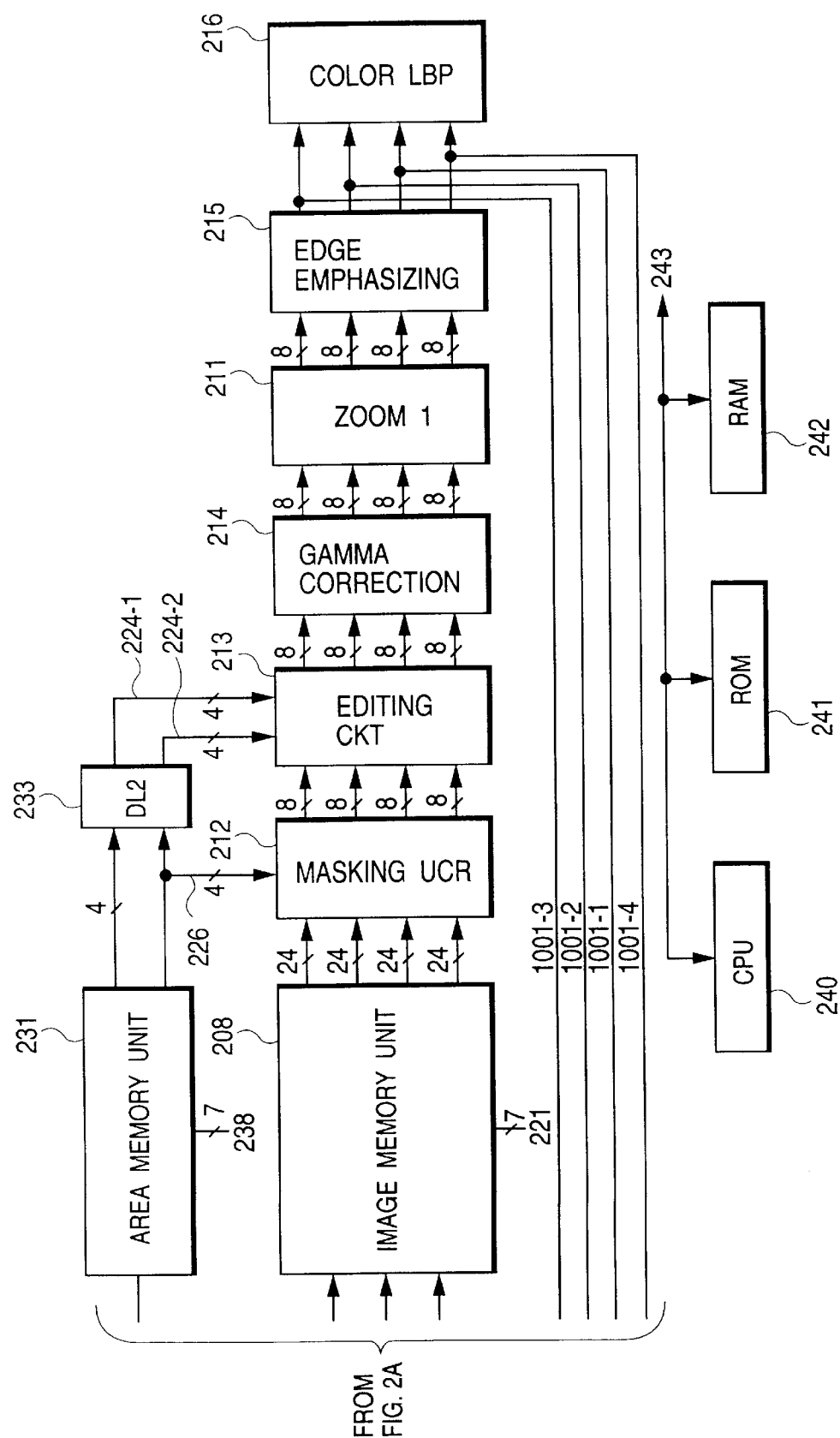
FIG. 2 which is composed of FIGS. 2A and 2B is a diagram showing an example of the structure of an image processing apparatus of the first embodiment.

Final image data (8-bit data for each YMCK) Y1, M1, C1, and K1 1001-1 to 1001-4 output from the edge emphasis circuit 215 are input first to a 3×4 inverse masking correction circuit 217-1 to execute the following calculations which are inverse calculations of the masking UCR circuit 212 shown in FIGS. 2A and 2B.

Y2=a11 * Y1+a12 * M1+a13 * C1+a14 * K1

M2=a21 * Y1+a22 * M1+a23 * C1+a24 * K1

C2=a31 * Y1+a32 * M1+a33 * C1+a34 * K1

Arbitrary coefficients a11 to a34 can be set by CPU 240 via the CPU bus 243. The four-color information Y1, M1, C1, and K1 is converted into three-color information Y2, M2, and C2 by the 3×4 inverse masking correction of the masking UCR circuit 212.

Next, an inverse logarithm conversion correction circuit 217-2 performs an inverse calculation of the LOG process 207 for the three-color density information Y2, M2, and C2 to obtain the luminance information on a predetermined color space based on the three-color CCD 201, R1, G1, and B1. The LOG process 207 is performed by using an LUT. Similar to the above, arbitrary correction data can be set by CPU. With these calculations, the YMCK density data is converted into luminance data reflecting the color processing for allowing to display it on CRT. There are many types of CRTs having various color reproduction characteristics. Therefore, means for matching the characteristics of CRT 219 with the output image on the color LBP 216 is necessary. Namely, it is necessary to correct the luminance information R1, G1, and B1 in accordance with the display characteristics of CRT 219 and the observation conditions.

A 3×3 monitor color correction circuit 217-3 corrects the luminance data to match the monitor color characteristics and make the hues of the image on the monitor and the image printed out on a recording sheet, and executes the following calculations.

R2=b11 * R1+b12 * G1+b13 * B1

G2=b21 * R1+b22 * G1+b23 * B1

B2=b31 * R1+b32 * G1+b33 * B1

There are many types of CRTs having various color reproduction characteristics and also there are various illumination conditions. Therefore, the following factors are required to be taken into consideration in order to match the hue of the image on the monitor with the hue of the image printed out on a recording sheet.

a) color temperature of the monitor, b) coloring characteristics of the monitor, and c) illumination light.

In this embodiment, the color temperature of the monitor was limited to a range from 6500 K to 5000 K. The coloring characteristics of monitors manufactured by typical makers were studied. Since a fluorescent lamp is generally used for illumination light, the color temperatures of typical five types of fluorescent lamps were measured, including daylight (6500 K), cool white (5000 K), white (4150 K), warm white (3500 K), and incandescent lamp color (3000 K).

In this embodiment, a 3×3 matrix corresponding to a combination of the above three factors is prepared.

The factors a) and b) depend on the monitor characteristics, and the factor c) depends on the observation conditions.

Figure 19:
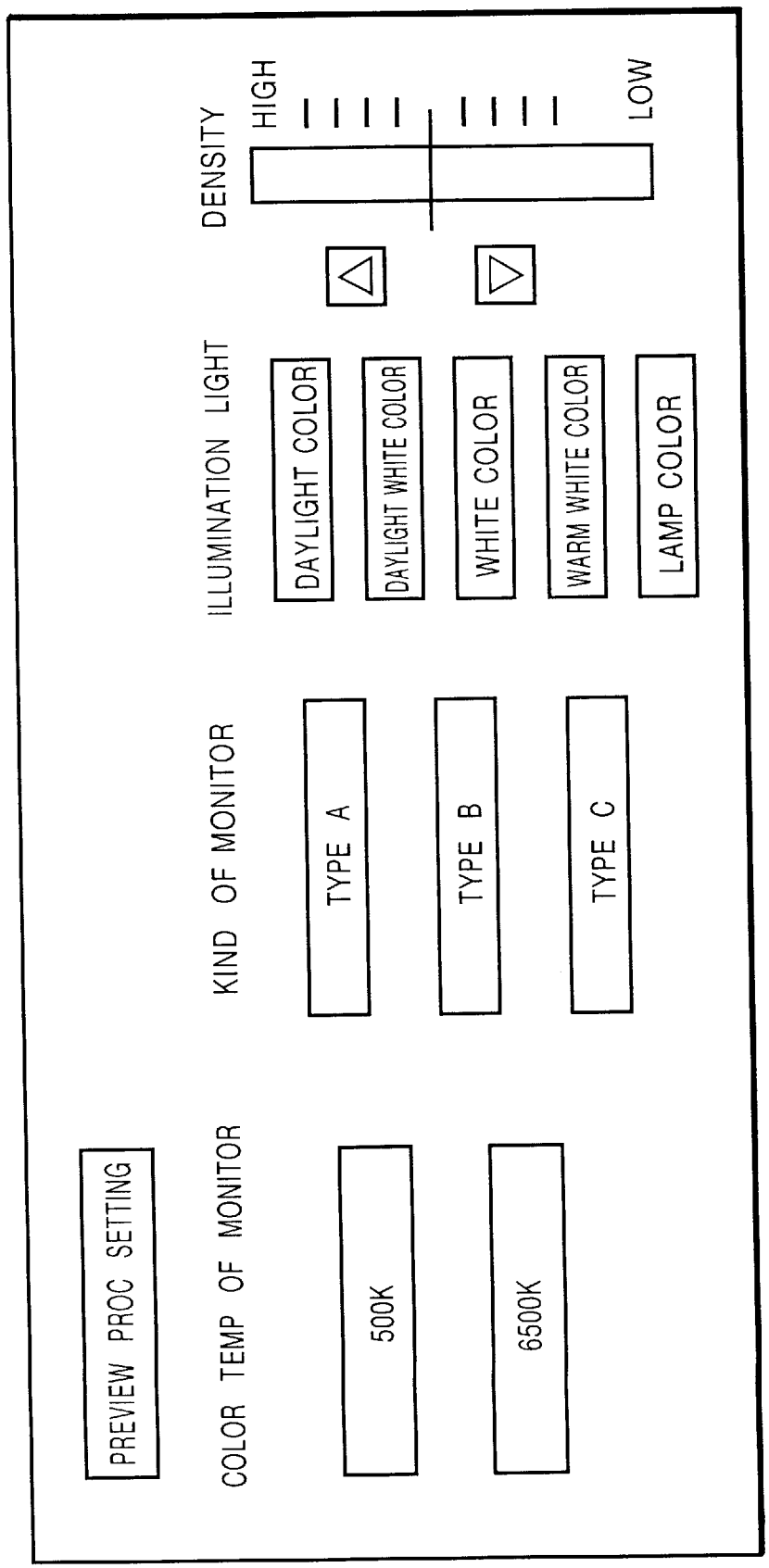
FIG. 19 is a diagram showing an example of a display on an operation screen of the first embodiment.

The 3×3 matrix color correction is performed by using the 3×3 matrix, in accordance with the monitor color temperature a), monitor coloring characteristics b), and the type of illumination light c) set by an operator from the operation unit shown in FIG. 19.

The method of calculating a 3×3 matrix will be described.

The xy chromaticity coordinates and luminance Y of each of three primaries [R], [G], and [B] of CRT monitors are measured. The xyz chromaticity coordinates of the measured [R] are represented by (xr, yr, zr) and a sum of XYZ tristimulus values of the unit value of [R] is represented by Sr, where zr=1−xr−yr, and Sr is an unknown value. The similar notation is applied to [G] and [B]. Then, the following equation stands where [ ] is a symbol representing color stimulus.

$$\begin{bmatrix} X \\ Y \\ Z \end{bmatrix} = \begin{bmatrix} xr & xg & xb \\ yr & yg & yb \\ zr & zg & zb \end{bmatrix} \begin{bmatrix} Sr & 0 & 0 \\ 0 & Sg & 0 \\ 0 & 0 & Sb \end{bmatrix} \begin{bmatrix} R \\ G \\ B \end{bmatrix} = M \begin{bmatrix} R \\ G \\ B \end{bmatrix}$$

This equation is solved to obtain Sr, Sg, and Sb under the conditions that when R=G=B=1, white illumination light (W) (xy chromaticity coordinates=(xw, yw)) is realized (X=xw/yw, Y=1, Z=(1−xw−yw)/yw). The final conversion matrix M can therefore be obtained.

The spectral characteristics of each RGB color separation filter of the scanner are measured to obtain a matrix for converting a scanner color specification system into an XYZ color specification system. The 3×3 matrix can be obtained through matrix calculation ($M^{-1} \times S$). If the color temperature of illumination light is different from that of the monitor, a chromatic adaptation prediction equation of Von Kriese is used to correct the 3×3 matrix so as to generally match the hue of the image on the monitor with that of the image printed out on a recording sheet.

A monitor gamma correction circuit 217-4 corrects monitor non-linearity called the gamma characteristics, and performs the following calculations by using a LUT.

R3=255*((R2−Roffset)/255)*(1/γ)

G3=255*((G2−Goffset)/255)*(1/γ)

B3=255*((G2−Boffset)/255)*(1/γ)

where Roffset, Goffset, and Boffset are offset components of R, G, and B (light emission amount at a luminance set value of 0 and components of illumination light reflected from the monitor and entering eyes).

The gamma characteristics change with the luminance of a monitor, and the gamma characteristics sensed by a user depend on the environments such as illumination. Therefore, a gamma value is not preferable if it is fixed to a certain value. A plurality of conversion tables having gamma values set in the range from 1 to 3 at an interval of 0.1 are stored in advance in ROM. By selecting correction data at a desired gamma value, a user can set an optimum gamma value while viewing the monitor.

In the above manner, a user can finely adjust the R2, G2, and B2 corrected by the 3×3 monitor color correction 217-3 in accordance with the characteristics and environment conditions of the monitor 219, through the monitor gamma correction.

In FIG. 19, the density value corresponds to the gamma value.

In this embodiment, parameters for the preview process can be set from the operation unit of the copier.

A display editing circuit 217-5 performs various editing processes for the image data displayed on the monitor and controls the monitor.

Figure 8:
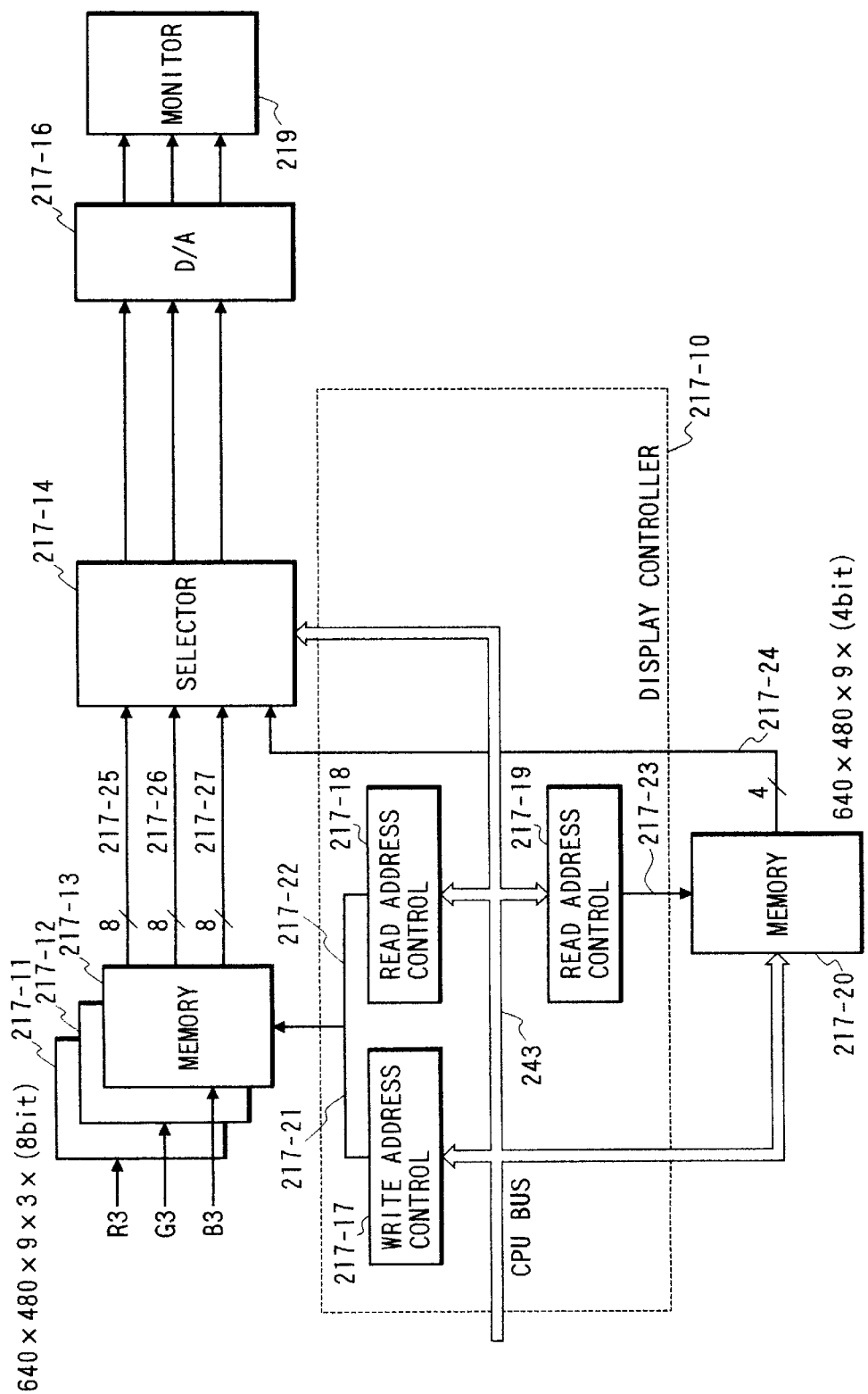
FIG. 8 is a diagram showing an example of the structure of a display editing circuit of the first embodiment.

FIG. 8 shows the details of the display editing circuit which is roughly divided into a read image processing section and an additional information adding section for adding a frame, character, or the like to the image.

R3, G3, and B3 data after the monitor gamma correction by the monitor gamma correction circuit 217-4 are supplied to memories 217-11, 217-12, and 217-13. Start and end addresses in X and Y directions can be set via the CPU bus 243 to a writing address control circuit 217-17 of a display controller 217-10 which supplies an address signal 217-21 so that data can be written starting from a desired location of each memory. In this embodiment, the memory size of each color is 640×480×9×(8 bits).

The original image size can be reduced when the image data is stored in the memory, the magnification factor being set by CPU 240. In accordance with whether the image is horizontally or vertically long, the writing address control circuit 217-17 can operate to rotate the image as desired. In this case, the area outside of the start and end addresses, i.e., the area where an image is not written, has the previous image or the fixed display color. Therefore, in this embodiment, CPU 240 can control to display the area other than the writing area with a desired color.

The CPU can set arbitrary coordinate values to a reading address control circuit 217-18 to read the image data in the memory at desired locations and display it on the monitor. This designation can be performed in real time, by using a touch panel key of the operation unit to be described later. Since the image size of the monitor of this embodiment is 640×480 dots, it is necessary to thin the image in order to display the whole image stored in the memory. A thinning factor can be set by CPU. In this embodiment, as will be later described, an operator can select one of a full mode of displaying the whole image stored in the memory, a twofold mode of displaying ⅙ the image stored in the memory, and a threefold mode of displaying ⅑ the image stored in the memory.

A memory 217-20 is used for adding information such as figures and characters to the image and has a size of 640×480×9×(4 bits) which allows to independently develop figures and characters of four frames.

In this embodiment, although the data is developed directly on the memory by CPU 240, it may be developed by a dedicated controller capable of developing data at high speed, such as AGDC. The reading address control circuit 217-19 can set a reading start location and a thinning factor, similar to the reading address control circuit 217-18.

The data read from the memories is input to a selector 217-14. If a signal 217-24 read from the memory 217-20 is "L", the selector outputs the image data itself 217-25 to 217-27, and if the signal is "H", it outputs R, G, and B (8 bits) data of four frames. These R, G, and B data can be set by CPU 240 and a desired color is given to the figures and characters in each of the four fields.

The signal output from the selector 217-14 is converted into an analog signal by a D/A converter 217-16 to display a final image on a monitor 219.

Operation Unit

Figure 11:
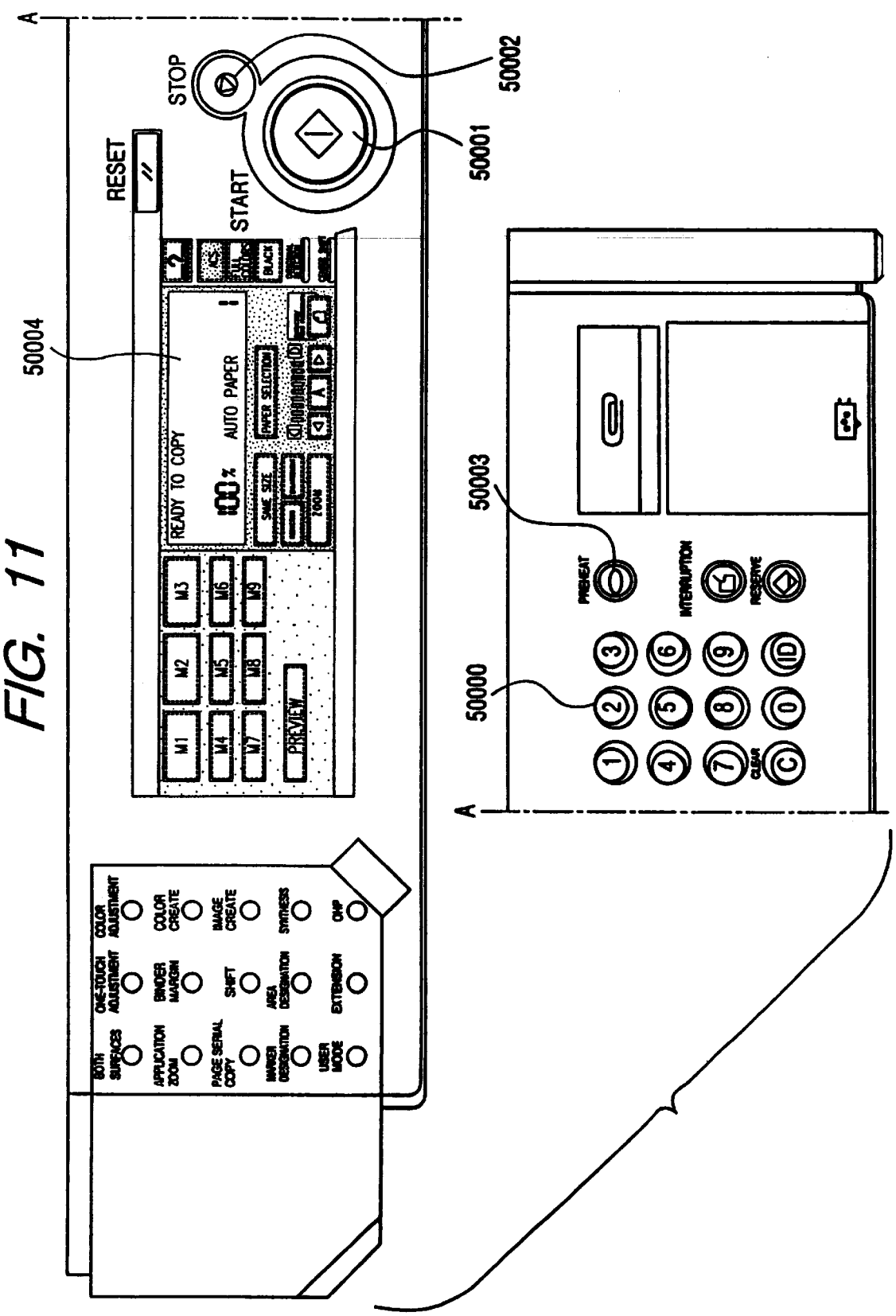
FIG. 11 is a diagram showing an example of the whole of an operation unit of the first embodiment.

FIG. 11 shows an outer appearance of the operation unit. Reference numeral 50000 represents numerical keys, reference numeral 50001 represents a copy start key, reference numeral 50002 represents a stop key, reference numeral 50003 represents a remaining heat key, and reference numeral 50004 represents a display unit constituted by a liquid crystal display and a touch panel.

Figure 12:
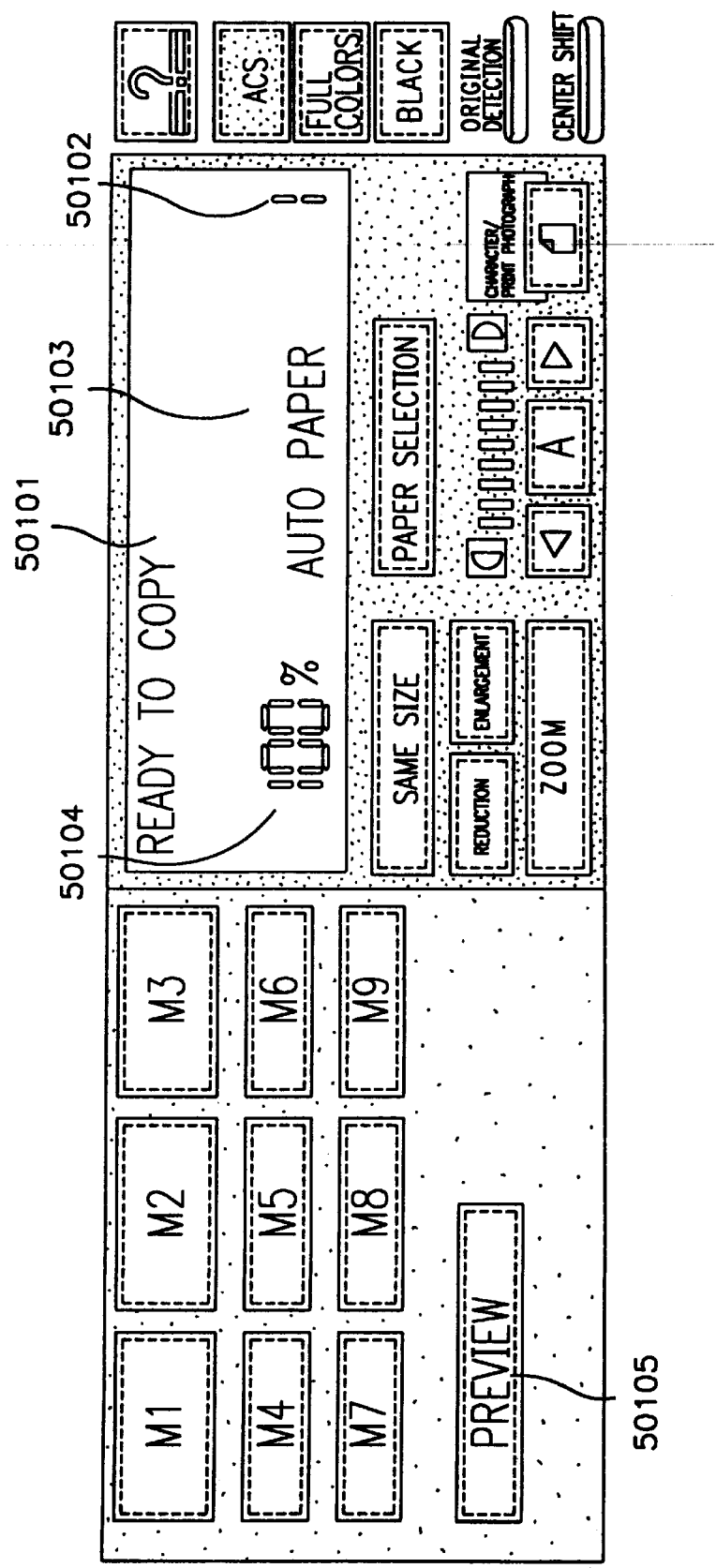
FIG. 12 is a diagram showing an example of a display on an operation screen of the first embodiment.

A standard screen on the display unit 50004 is shown in FIG. 12.

In the standard screen shown in FIG. 12, reference numeral 50101 represents a display of whether or not a copy is ready. Reference numeral 50102 represents a display of the set number of copies, reference numeral 50103 represents a display of a selected paper size, and reference numeral 50104 represents a display of a copy magnification. Reference numeral 50105 represents a touch key for designating a preview mode.

Prior to starting the preview mode, an operator designates from the operation unit, an image magnification, a paper size, and an editing process, and depresses a preview mode key 50105. The screen on the display unit changes from the standard screen to a preview operation screen.

Figure 13:
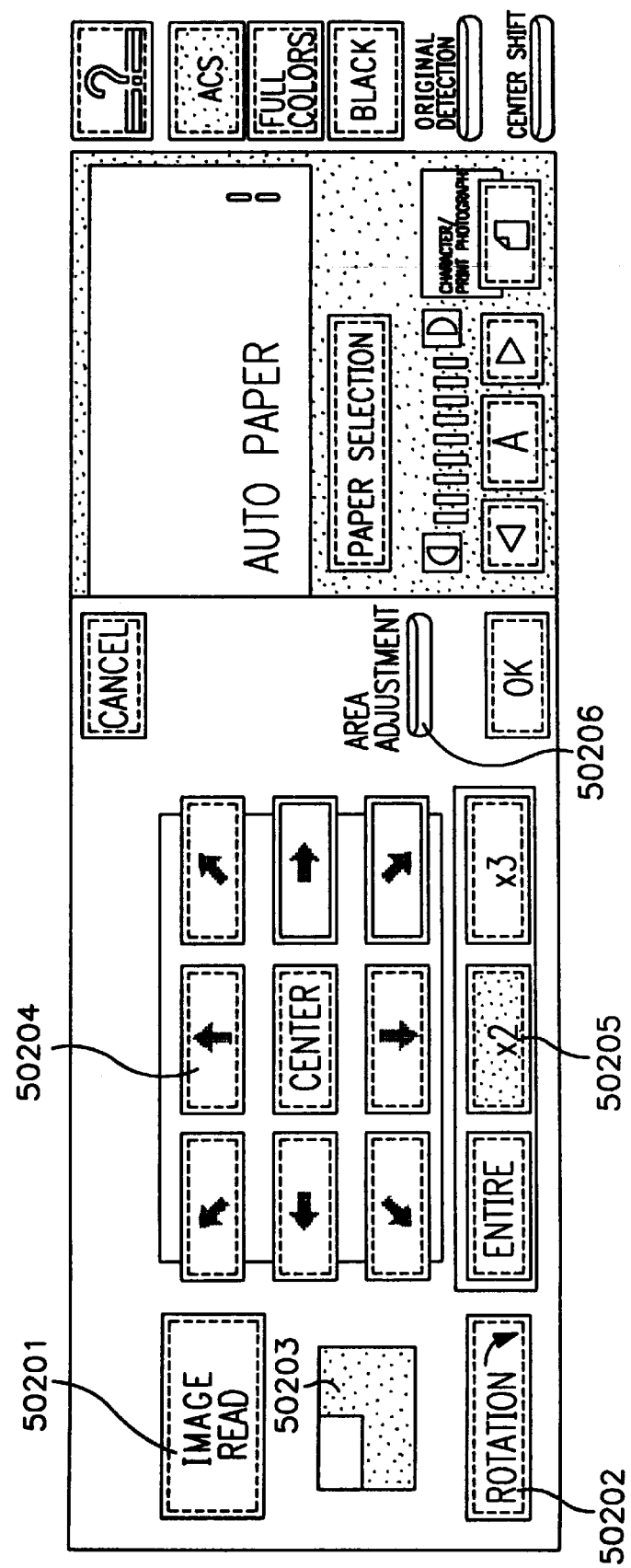
FIG. 13 is a diagram showing an example of a display on an operation screen of the first embodiment.

FIG. 13 shows an example of the preview operation screen. Reference numeral 50201 represents a preview start key (image read key) for previewing an original, reference numeral 50202 represents display direction setting keys for setting the direction of an image on CRT 219, reference numeral 50203 represents an area monitor for displaying the area of the displayed image, reference numeral 50204 represents display position setting keys for setting the area of the image to be displayed, reference numeral 50205 represents display magnification setting keys, and reference numeral 50206 represents an area adjusting key.

An operator first sets an original on an original support or feeder 11 and the display direction (vertical or horizontal) of the original is set with the display direction setting key 50202. With the ordinary display direction, the original image starting from the original abutting position of the original support is displayed at the upper right of CRT 219. As the display direction setting key 50202 is depressed, the display of the display direction setting key is changed between white and black, and the image rotated by 90 degrees is written in the display memories 217-11 to 217-13. Therefore, the original image rotated by 90 degrees relative to the original abutting position of the original support is displayed on CRT 219.

When the operator depresses the preview start key 50201, the original is transported from the feeder to the original support if the original is set to the feeder, and a pre-scan is performed to detect the original size and position on the original support if the original detecting mode is set. Thereafter, a scan operation starts reading the original. The read image is subjected to various editing processes and supplied to the preview processing unit 217 whereat it is converted into RGB signals and written in the image memories 217-11 to 217-13 by calculating the most efficient size allowing the whole image to be stored therein, in accordance with the set display direction, display magnification, original size, and the like. The data in the image memories 217-11 to 217-13 is corrected by LUT 217-4 in accordance with the CRT characteristics and transferred to the display controller 217-10 to display a preview image on the CRT.

The capacity of each image memory 217-11 to 217-13 is 1920×1440 pixels which is nine times as large as the size of 640×480 pixels of the CRT. Therefore, when the data is transferred from the image memories to the CRT, it is necessary for the display controller 217-10 to change the size of the data in the image memories 217-11 to 217-13 in accordance with the display size of the CRT and the display magnification set with the display magnification setting key 50205.

Figure 17:
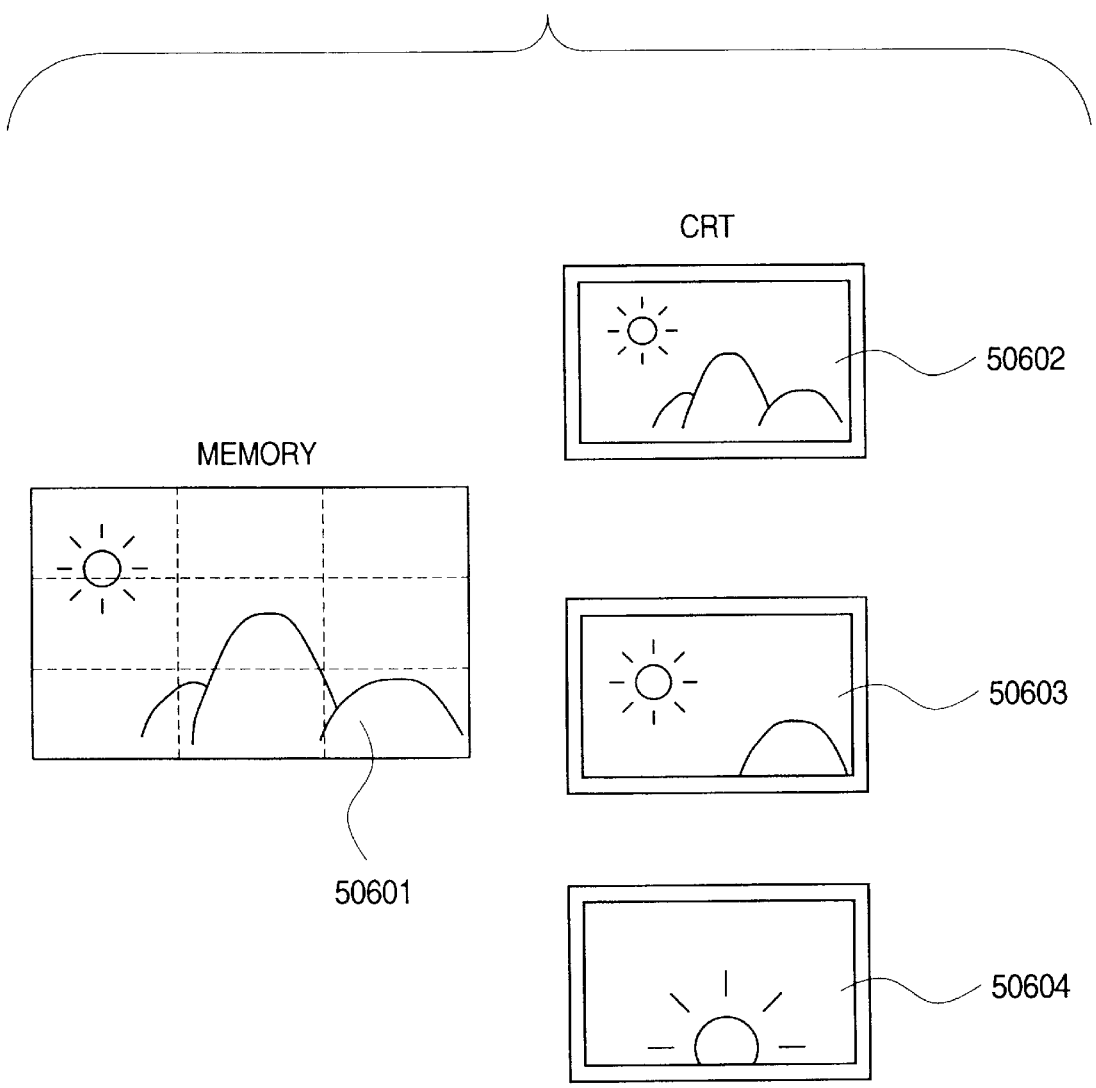
FIG. 17 is a diagram showing an example of a display of a preview image of the first embodiment.

Specific examples are shown in FIG. 17. Data indicated at 50601 is being stored in the image memories 217-11 to 217-13. If the "whole" key among the display magnification keys is set, the whole data area in the image memories 217-11 to 217-13 is reduced by ⅑ by the display controller 217-10 and displayed on CRT as indicated at 50602. If the "two times (twofold)" key is depressed, the data in a 4/9 area of the whole area in the image memories 217-11 to 217-13 is reduced by ¼ by the display controller 217-10 and displayed on CRT as indicated at 50603. Namely, the data in a partial area in the image memories 217-11 to 217-13 is enlarged by two times as compared to the display of the whole area. Similarly, if the "three times (threefold)" key is depressed, the data in a ⅑ area of the whole area in the image memories 217-11 to 217-13 is directly transferred to display it on CRT as indicated at 50604, this image in the ⅑ area being enlarged by three times as compared to the display of the whole area.

If the twofold or threefold is set with the display magnification setting key, part of the data in the image memories 217-11 to 217-13 is displayed on the CRT. In this case, if the reading address is changed and the data is transferred to the CRT, the area not displayed before can be displayed. Specifically, in the case of the twofold set with the display magnification setting key, an arbitrary image corresponding to the ¼ area in the image memories is displayed on the CRT. In this case, each time the downward arrow key among the display position setting keys 50304 is depressed, the reading start position of the image memories move downward by four dots and the image in the ¼ area from the reading start position is transferred to the CRT. Therefore, the image at the lower area of the screen not displayed before can be displayed. If the image read from the memories contains one side edge of the whole image and the reading start position is moved to this side edge at the next time, the image is outside of the image memories. Therefore, in order to notify the operator of that the image cannot be moved to this side, the display position setting key toward this side is displayed with cross hatching. In order to notify the operator of the partial area displayed on CRT, this area is displayed on the area monitor 50302.

Area Correction in Preview

If the operator sets the area designation mode, a preview image with the area designated is displayed. If the position and size of the designated area are different from those intended by the operator, or if the processed color of the image in the designated area is something different from that intended by the operator, the position and size of the designated area or the processed color can be finely adjusted and corrected on the preview screen.

As the operator depresses the area adjustment key 50206 after the preview, the display unit selects the area selecting screen. When the area selecting screen (FIG. 14) is selected, the size and position of the outer frame of the whole area are calculated from the copy magnification, display magnification, display direction, and the like. The area generating unit 220 generates an image of the outer frame which is developed on an area screen memory 1 (hereinafter called a plane memory 1) and transferred to an area display memory 1 (hereinafter called a plane memory 1') to display it on CRT. This area outer frame is displayed on the currently displayed preview image. The area outer frame is displayed in the color set to the plane memory 1. The plane memories are formed in a divided field of the memory 217-20.

The plane memory 1 has a capacity several times larger than the display size of the CRT. In accordance with a magnification set with the image magnification setting key and the display position set with the display area setting key, the transfer area and magnification of the plane memory 1 are calculated and transferred to the plane memory 1'. Therefore, each time the image display magnification setting and display area setting are changed, the area outer frame is displayed in correspondence with the changed preview screen.

Figure 18:
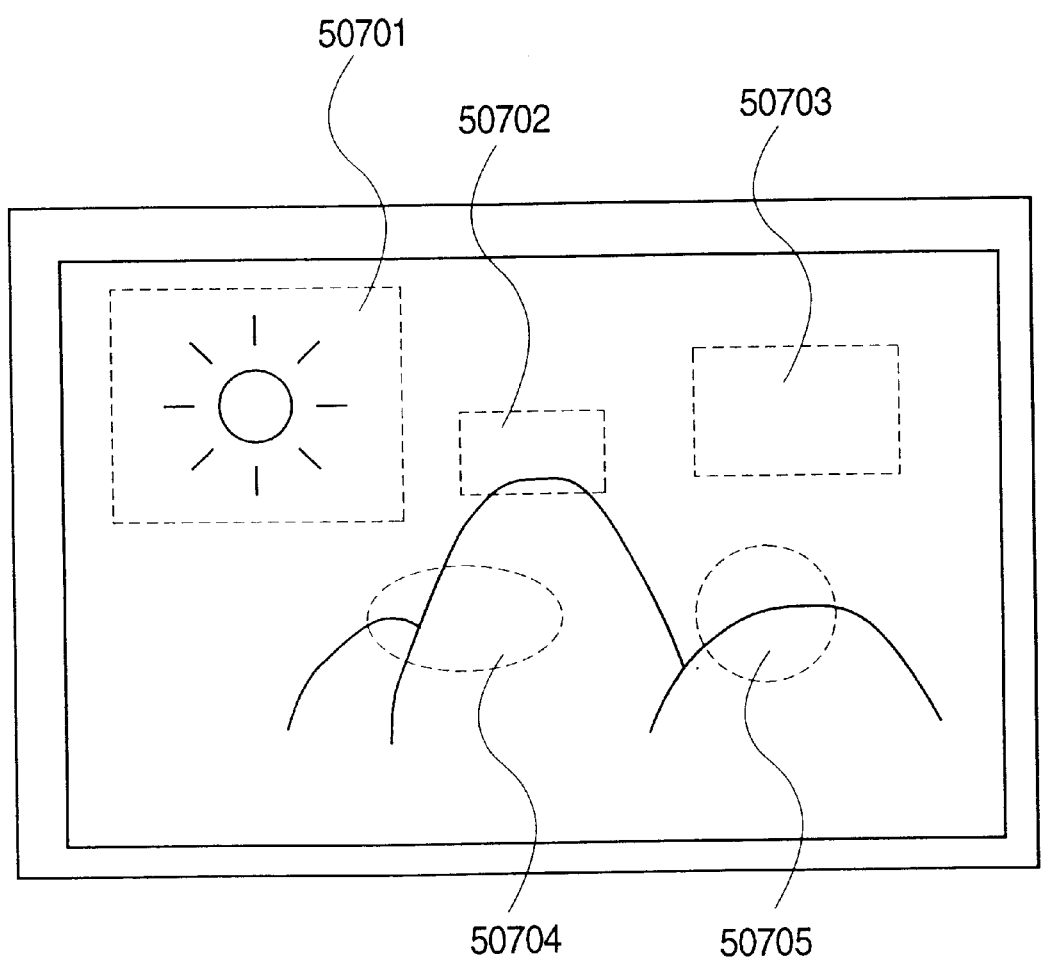
FIG. 18 is a diagram showing an example of a display of a preview image of the first embodiment.

In this area process, the process contents of thirty types at a maximum can be set. Fifteen areas at a maximum can be set per each process. For example, in FIG. 18 showing an example of the preview image with a plurality of designated areas, the first area process performs a paint process for three areas including a first area 50701, a second area 50702, and a third area 50703, and the second area process performs a color conversion process for two areas including a fourth area 50704, and a fifth area 50705.

In the case where a plurality of areas are designated, an operator is required to identify each area by an area process number setting key and an area number setting key.

Figure 14:
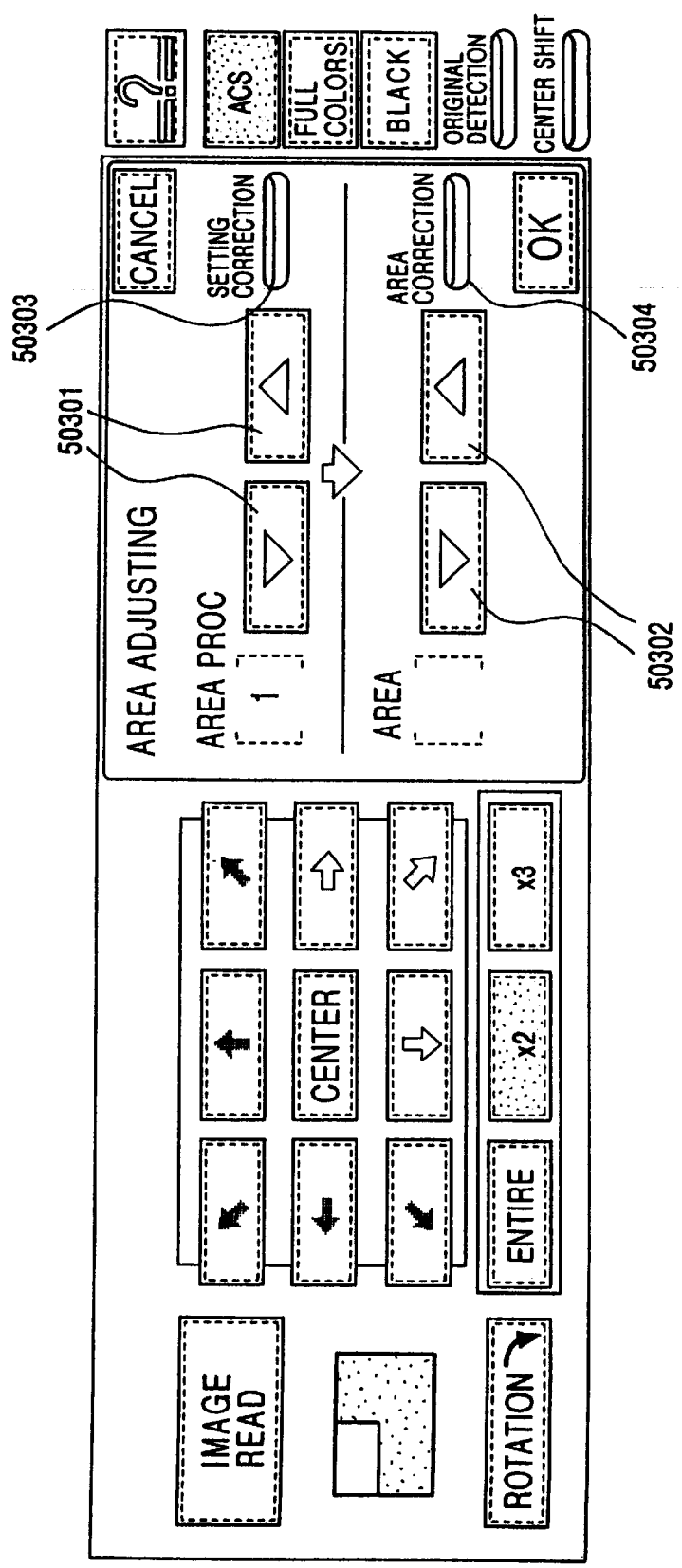
FIG. 14 is a diagram showing an example of a display on an operation screen of the first embodiment.

As the area adjustment key 50206 shown in FIG. 13 is depressed, the screen shown in FIG. 14 is displayed. A desired area process number is selected by depressing an up-key and a down-key of the area process number setting keys 50301. Assuming that the first area process is selected, the outer frames (60701, 50702, 50703) of the areas of the first area process are calculated in the manner described above, and the area generating unit 220 forms the outer frame image on an area image memory 2 (hereinafter called a plane memory 2). This outer frame image is enlarged or reduced by the magnification designated by the display magnification setting key and transferred to an area display memory 2 (hereinafter called a plane memory 2') to display it on the CRT in a color different from that set to the plane memory 1'. Since the display colors set to the plane memories 1' and 2' are different, the area process designated from a plurality of area processes can be identified basing upon a different color display on the CRT. As the area process number 2 is designated by depressing the up-key of the area process number setting key 50301, the outer frame image of the first area process written in the plane memory 2 is deleted, and the outer frame image of the second area process is written and displayed on the CRT.

Figure 15:
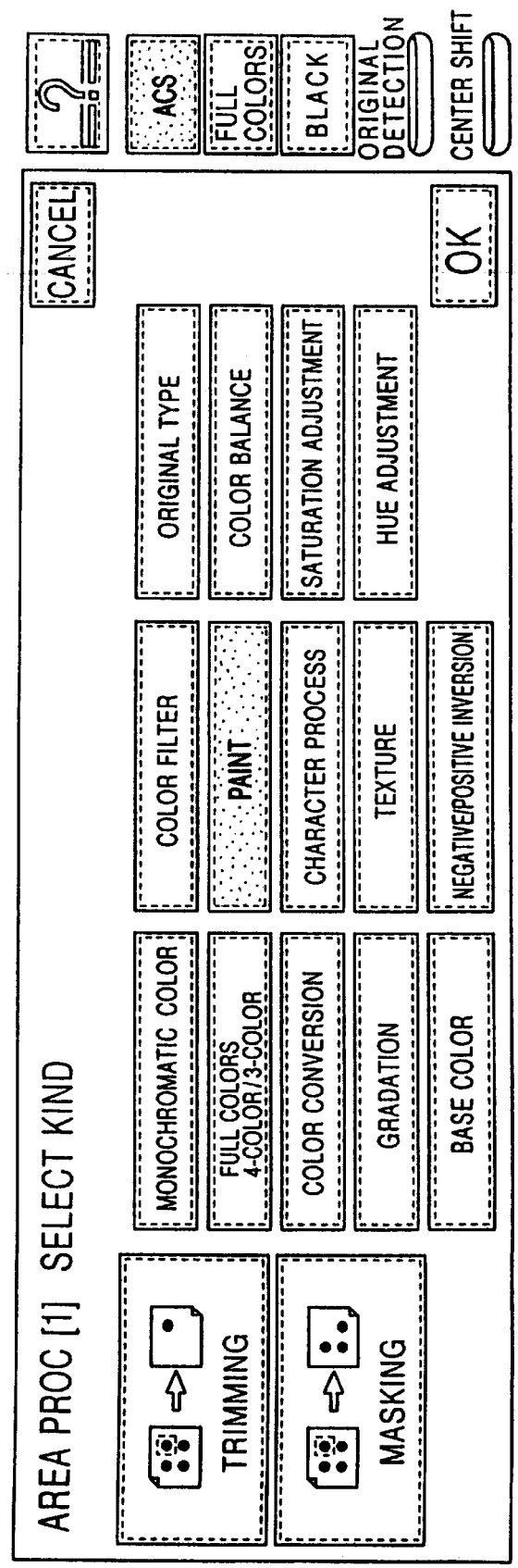
FIG. 15 is a diagram showing an example of a display on an operation screen of the first embodiment.

As the operator depresses a setting correction key 50303 after the area process whose process contents are to be changed, is identified in the above manner, the screen shown in FIG. 15 is displayed. The process contents can be changed by selecting a desired process on this screen.

If the size of an area is to be changed, the number of the area process containing an area to be changed is selected with the area process number setting key 50301 and the area to be changed is selected with the area number selecting key 50302, in the manner described above. For example, if the fifth area 50705 of the second area process is to be moved left by 1 cm, the second area process is selected by the area process number setting key. Next, as the area number setting key is depressed, the fourth area 50704 of the second area process is selected. At this time, the area generating unit 220 develops the outer frame image of the fourth area on the area image memory (hereinafter called a plane memory 3). The outer frame image developed on the plane memory 3 is transferred to an area display memory 3 (hereinafter called a plane memory 3') to display it on CRT. The color displayed on the CRT is different from the colors set to the plane memories 1' and 2'. The priority order of each area display memory is plane memory 1'<plane memory 2'<plane memory 3'. Therefore, even if the operator does not memorize the number of the area process to be changed, the area process designated among all the area processes can be identified and the area to be changed can be identified.

If the fifth area 50705 is selected by the area number setting key, the outer frame image of the fourth area 50704 on the plane memory 3' is deleted and the outer frame image of the fifth area is written therein to display it on CRT.

As the operator depresses the area correction key 50304 after the area whose size is to be changed, is designated, the area size correction screen is displayed.

Figure 16:
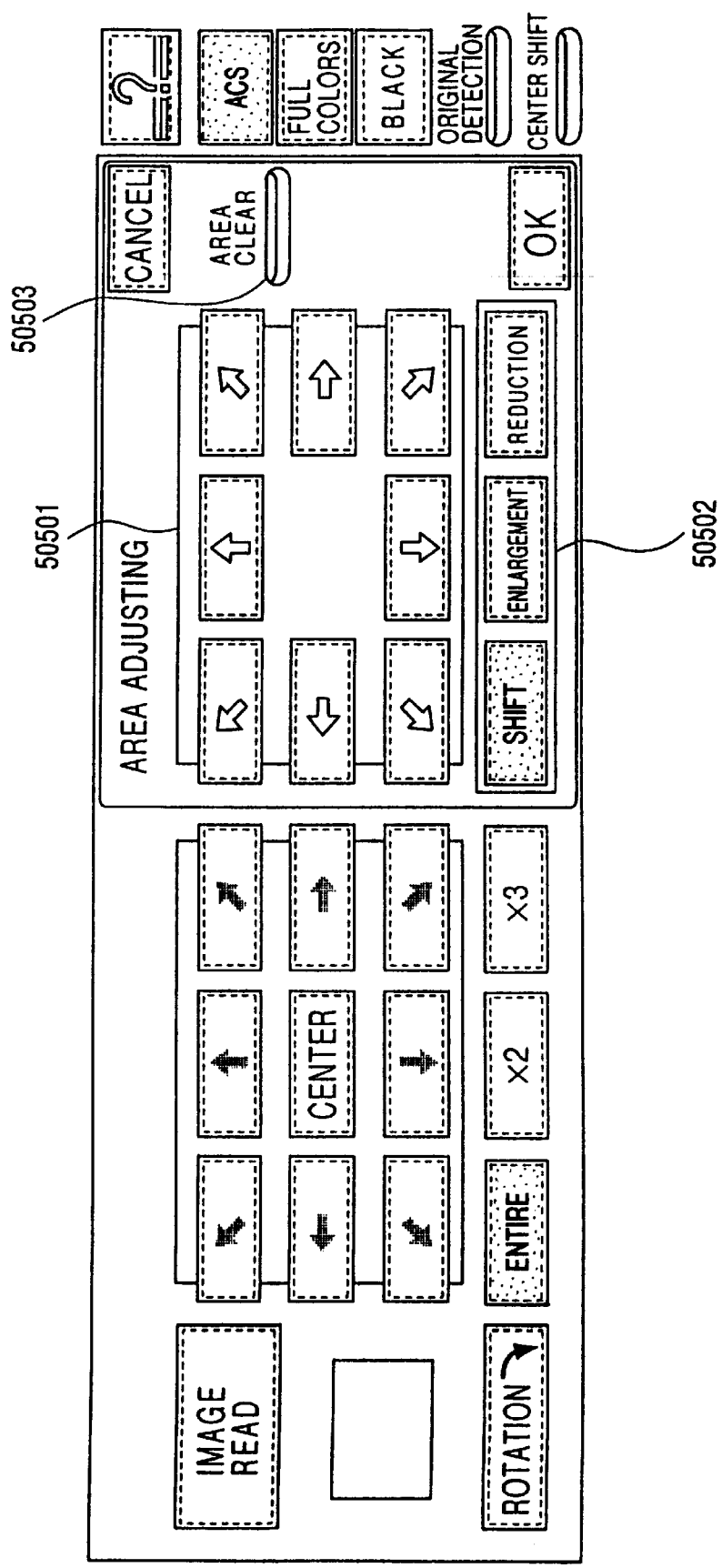
FIG. 16 is a diagram showing an example of a display on an operation screen of the first embodiment.

FIG. 16 shows the area size correction screen. Reference numeral 50501 represents area correction keys for designating the direction of moving an area, reference numeral 50502 represents area correction setting keys for setting the type of area correction, and reference numeral 50503 represents an area clear key.

For example, if the fifth area is to be moved left, the operator first designates a move key among the area correction setting keys 50502. Then, the left arrow key among the area correction keys 50501 is depressed. At this time, the outer frame image of the fifth area stored in the plane memory 3 is cleared and the outer frame image moved left by four pixels is formed on the plane memory 3 and transferred to the plane memory 3' to display it on CRT. In this manner, the designated area moves on the preview display screen. The motion amount is fed back to CPU so that when the image read key is again depressed to perform the preview, the image is processed in accordance with the changed area position. In this manner, the area can be moved while viewing the designated area on the preview display screen. Similar to the above, if the area size is to be changed, the operator selects an enlargement key or reduction key among the area correction setting keys 50502 and depresses the arrow key among the area correction keys 50501, and so the area is enlarged or reduced in the direction of the depressed key.

After the size, position, or contents of an area is corrected while viewing the preview display screen and an image desired by the operator can be displayed on CRT, the start key 50001 is depressed to print out the image.

Modification of first Embodiment

A modification of the first embodiment will be described with reference to FIG. 20.

In this modification, a user manually selects an image processing mode from the operation unit. The image processing mode includes, for example, the following modes.
1) Modes associated with the type of image
  (i) Character mode: in this mode, only characters are processed and black color is reproduced with high fidelity.
  (ii) Print photograph mode: in this mode, an original having many half tone images such as a photograph is processed and half tone is reproduced with high fidelity.
2) Modes associated with user customization
  (iii) Background removal mode: in this mode, a background of an original is removed.

Figure 20:
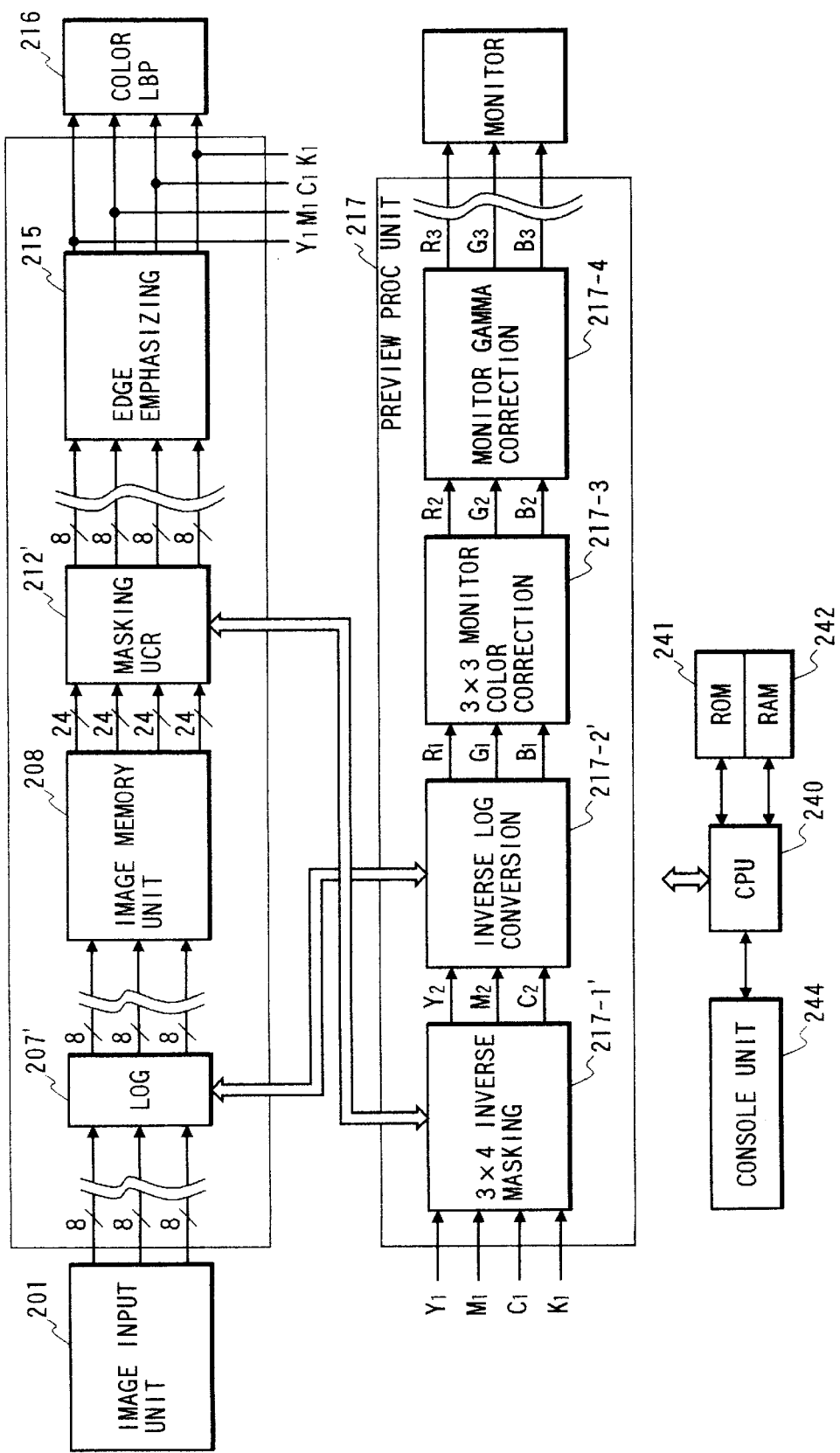
FIG. 20 is a diagram showing an example of the structure of an image processing apparatus according to a modification of the first embodiment.

In the image processing apparatus shown in FIG. 20, the modes associated with the type of image, the character mode (i) and print photograph mode (ii), are performed by a masking UCR 212' whose coefficients are set by CPU 240.

The background removal mode (iii) is performed by a LOG 207' whose LUT is changed by CPU 240.

Specifically, in the image processing apparatus shown in FIG. 20, the process to be executed by the LOG 207' and masking UCR 212' changes with the image processing mode designated by the operation unit 244.

Therefore, the process to be executed by a 3×4 inverse masking 217-1' and an inverse LOG 217-2' for matching the hues of an output image and a display image change with the process to be executed by the masking UCR 212' and LOG 207' which changes with the image processing mode.

As described above, in this modification, the hues of an output image and a display image can be matched at any image processing mode. Namely, a final image processed by a designated image processing mode can be confirmed from the preview image.

In the above embodiment, the color temperature and coloring conditions of the monitor and illumination light set by the operation unit are reflected upon the matrix coefficients of the 3×3 monitor color correction unit 217-3. The invention is not limited to only this arrangement. For example, a correction circuit for each factor may be independently provided and its coefficients are changed in accordance with each setting condition.

Second Embodiment

Figure 21:
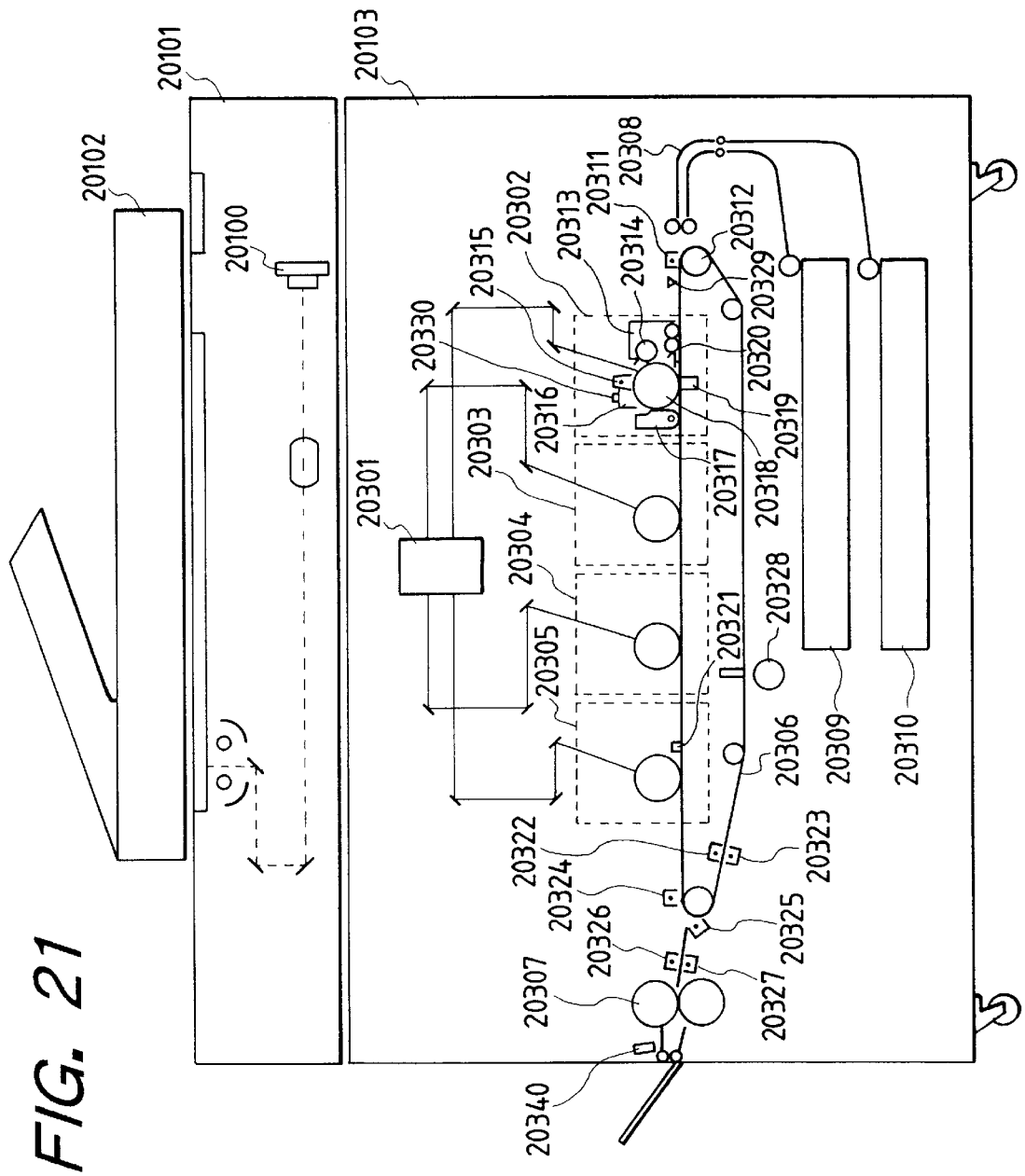
FIG. 21 is a schematic diagram showing an example of an image processing apparatus according to a second embodiment of the invention.

FIG. 21 is a schematic diagram showing a digital copier constituting an image processing apparatus. The digital copier is mainly divided into two parts. Reference numeral 20101 represents a reader unit for reading a color original image and executing a digital editing process and the like. Reference numeral 20103 represents a printer unit 352 which has different recording sheets and produces a color image in accordance with a digital image signal for each color sent from the reader unit 20101. An original feeder 20102 mounted on the reader unit 20101 is an optional known device which automatically transports an original to an original read area of the reader unit 20101.

Although not shown in FIG. 21, a preview monitor such as CRT, LCD, and FLCD is connected via a predetermined interface.

Structure of Printer Unit

Figure 22:
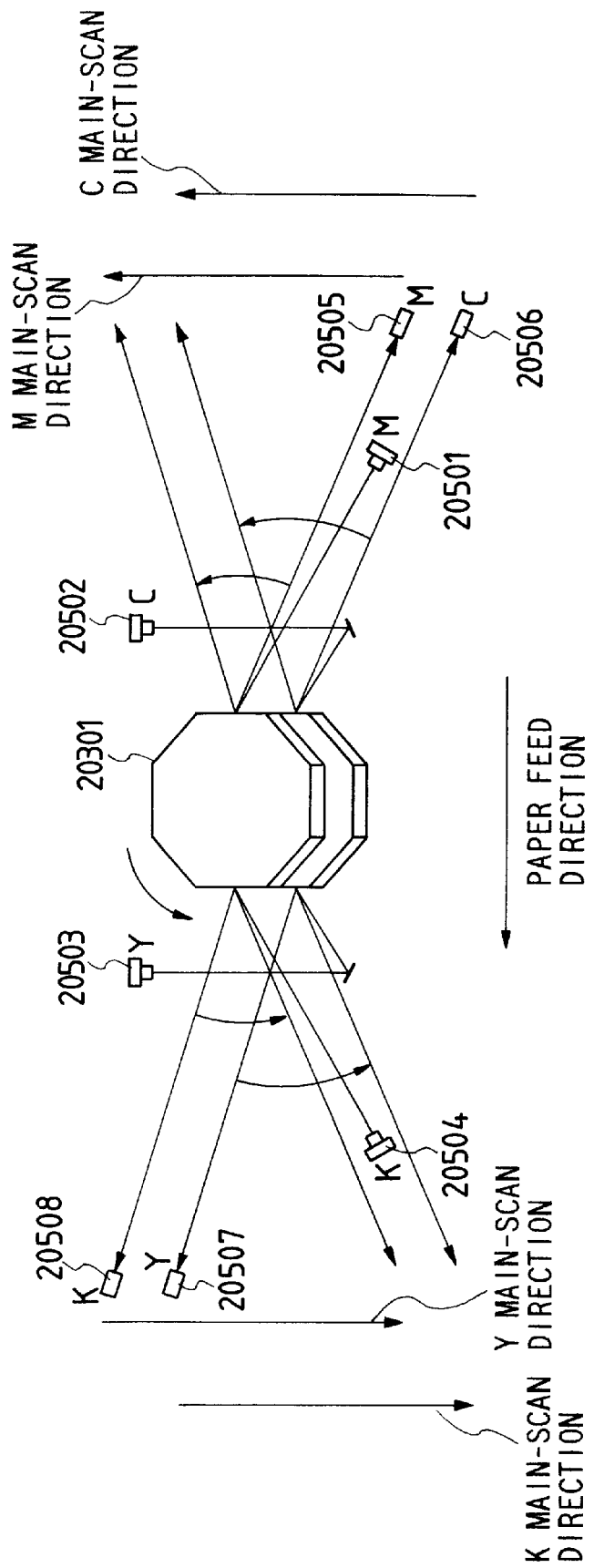
FIG. 22 is a diagram showing an example of a laser controller of the second embodiment.

Referring to FIG. 21, reference numeral 20301 represents a polygon scanner for scanning a laser beam output from an unrepresented laser controller to expose at predetermined positions of photosensitive drums of image forming units 20302 to 20305 to be described later. As shown in FIG. 22, the polygon scanner 20301 scans a laser beam radiated from each of laser elements 20501 to 20504 which are independently driven for MCYK by the laser controller, on each photosensitive drum of the image forming unit for each color. Reference numerals 20505 to 20508 represents a beam detecting sensor (hereinafter called a BD sensor) which detects a scanned laser beam and outputs a BD signal by which a main scan synchronization signal is generated. Two polygon mirrors are concentrically disposed and rotated by one motor. In this case, for example, laser beams M and C and laser beams Y and K have opposite main scan directions. Therefore, image data of the M and C images is an mirror image of the image data of the Y and K images relative to the main scan direction.

Reference numeral 20302 represents a magenta (M) image forming unit, and reference numerals 20303, 20304, and 20305 represent cyan (C), yellow (Y), and black (K) image forming units having the same structure as the magenta image forming unit 20302. In the following, the details of the M image forming unit 20301 will be described and the description of the other image forming units is omitted.

In the M image forming unit 20302, the polygon scanner 20301 scans the photosensitive drum 20318 with a laser beam and forms a latent image on the surface thereof. Reference numeral 20315 represents a primary charger for charging the surface of the photosensitive drum 20318 to a desired potential for the preparation of latent image forming. A developing unit 31320 develops the latent image into a toner image on the photosensitive drum 318. In the developing unit 20313, a sleeve 20314 performs toner development by applying a developing bias. Reference numeral 20319 represents a transfer charger for discharging the drum from the back surface side of a transfer belt 20306 to transfer the toner image on the drum 20318 to a recording sheet. The photosensitive drum 20318 after the image transfer is cleaned with a cleaner 20317, and discharged by an auxiliary charger 20316. The residual charge is eliminated by a pre-exposure lamp 20330, and the drum 20318 is again charged by the primary charger 20315.

Next, the procedure of forming an image on a recording sheet or the like will be described.

Reference numeral 20308 represents a paper feeder for feeding a recording sheet one after another from cassettes 20309 and 20310 onto the transfer belt 20306. The recording sheet supplied from the paper feeder 20308 is charged by a suction charger 20311. Reference numeral 20312 represents a transfer belt roller for rotating the transfer belt 20306 and for sucking and attaching a recording sheet to the transfer belt 20306 together with the suction charger 20311. Reference numeral 20329 represents a paper front end sensor for sensing the front end of a recording sheet on the transfer belt 20306. A detection signal of the paper front end sensor 20329 is supplied from the printer unit 20103 to the reader unit 20101 and used for generating a sub scan synchronization signal which is used for the transmission of a video signal from the reader unit 20101 to the printer unit 20103.

Thereafter, the recording sheet is transported by the transfer belt 20306 to the image forming units 20302 to 20305 whereat a toner image is formed on the surface of the recording sheet in the order of MCYK. The recording sheet passed through the K image forming unit 20305 is discharged by a discharger 20324 to be easily separated from the transfer belt 20306. Reference numeral 20325 represents a charger used for eliminating an image disturbance to be caused by discharge when a recording sheet is separated from the transfer belt 20306. The separated recording sheet is charged by pre-fixation chargers 20326 and 20327 to eliminate an image disturbance by supplementing a suction force of the toner. Thereafter, the toner image is thermally fixed by a fixer 20307 and the recording sheet is ejected out. Reference numeral 20340 represents a paper discharge sensor for detecting an ejection of a recording sheet.

Figure 23:
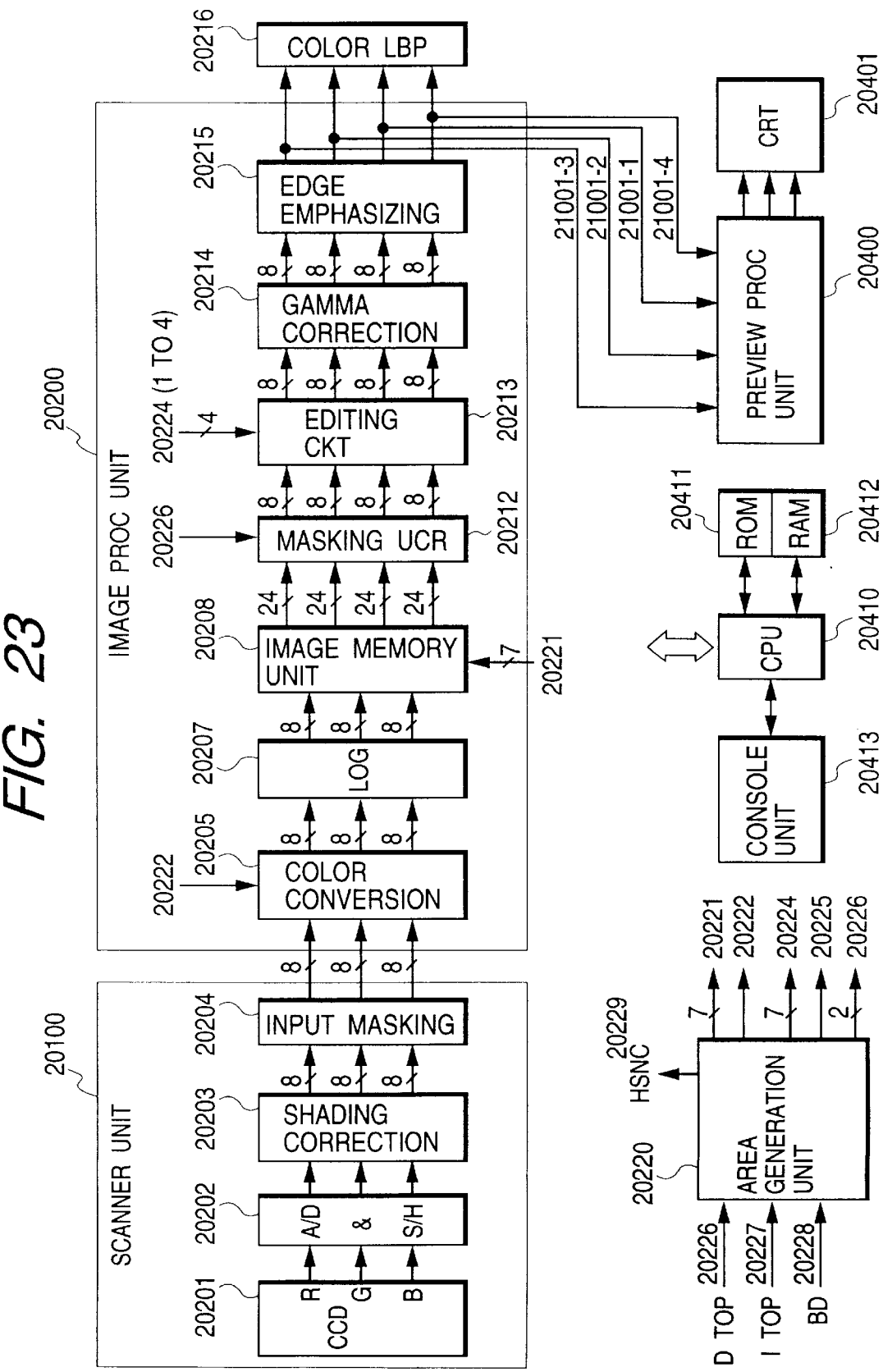
FIG. 23 is a diagram showing an example of the structure of the image processing apparatus of the second embodiment.

FIG. 23 is a block diagram showing an example of the structure of an image processing apparatus.

The image processing apparatus is mainly constituted by a scanner unit 20100, an image processing unit 20200, a color LBP 20216 as an image forming unit, and a preview processing unit 20400.

Reference numeral 20410 represents a controller which is constituted by a CPU, a program ROM, a working RAM, and the like. The controller 20410 controls each unit in accordance with programs stored in the program ROM to execute a copy operation and a preview operation. Reference numeral 20413 represents an operation unit which is constituted by a display unit such as an LCD for displaying the apparatus operation state and condition under the control of a control unit 20251, and by a keyboard and a touch panel for entering an instruction of an operator.

(i) Scanner unit

A color original placed on the original support reflects light from a halogen lamp. The reflected light is applied to a CCD 20201 constituting a 3-line sensor and converted into an electrical signal. Output electrical signals (analog image signals) from CCD 20201 are sampled and held and thereafter converted by an A/D and S/H circuit 20202 into digital signals, for example, 8-bit RGB digital signals. These RGB signals are subjected to a shading and black correction by a shading correction circuit 20203, converted into an NTSC signal by an input masking circuit 20204.

(ii) Image processing unit

The image data of 8-bit NTSC RGB signals output from the scanner unit 20100 is subjected to color conversion designated by the operation unit 20413. This color conversion is executed by a color conversion unit 20205. A LOG conversion unit 20207 converts the RGB luminance image data into CMY density image data.

An image memory unit 20208 converts the CMY density data into $L^*a^*b^*$ data which is vector quantized to be stored in a compressed state, and compressed and stored. Image data is read independently for each of four channels of CMYK, synchronously with the operation of the image forming units for CMYK in the color LBP unit 20216. Specifically, the four read channels are provided for compensating for the registration shift at the image forming units, and the compressed data at each channel is decoded and converted into CMY data (24 bits).

A masking UCR 20212, an editing circuit 20213, a gamma correction circuit 20214, and an edge emphasis circuit 20215 at the succeeding stages each independently process data for each channel.

The masking UCR 20212 generates K data from CMY data input for each channel to execute a UCR process. In accordance with CMYK data, a masking process for a correction by unnecessary absorption of a recording sheet is performed to generate data (8-bit) for each channel and the recording sheet.

The editing circuit 20213 executes various editing processes such as a free color process, a paint process, and the like to be described later.

The gamma correction circuit 20214 performs a gamma correction in accordance with the output characteristics of the color LBP 20216, and the edge emphasis circuit 20215 performs an edge emphasis process.

The YMCK data processed by the image processing unit 20200 is output to the color LBP 20216 when an image is printed, and to the preview processing unit 20400 when a preview image is formed.

Reference numeral 20220 represents an area generating unit. This area generating unit 20220 generates a main scan synchronization signal HSNC and following signals in accordance with BD, DTOP, and ITOP signals generated in the color LBP 20216. A signal 20221 is a signal for controlling the image memory 20208 and is constituted by 7 bits including two bits of write enable signals (each one bit for main scan and sub scan) and five bits of read enable signals (one bit for main scan and four bits for sub scan). A signal 20222 is an enable signal (area signal) for the color conversion unit 20205, a signal 20223 is an enable signal for a synthesizing unit 20206, a signal 20224 is an enable signal (four bits) for the editing circuit 20213, and a signal 20225 is an enable signal (one bit for main scan and sub scan) for the image memory unit 20208. A signal 20226 is a switching signal of the masking UCR unit 20212 for selecting either executing a normal masking UCR process or outputting the ND signal. The controller 20226 changes the signal 20226 at the area designated with a free color process to output the ND signal.

Each of the four bits of the sub scan enable signals is synchronized with each color drum to allow the color LBP 20216 to form a color image.

For the preview display, the sub scan enable signals of four bits are set or reset at the same time to allow the preview processing unit 20400 to generate the preview image data.

Although not shown in FIG. 23, in this embodiment, image data can be supplied via a predetermined interface to the color conversion unit 20205 or the image memory unit 20208, and this image data can be processed in the similar manner to processing read original image data.

Figure 24:
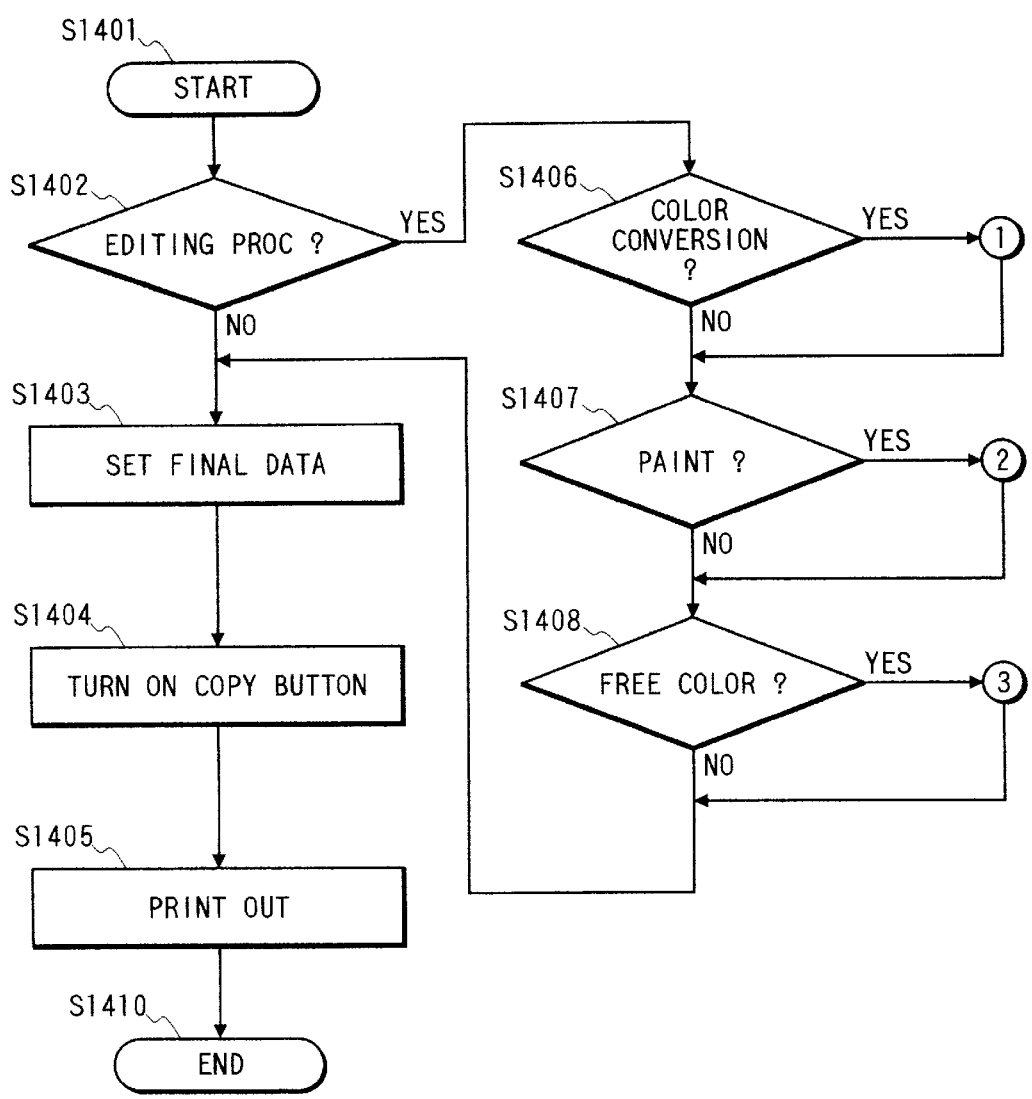
FIG. 24 is a flow chart illustrating an example of the overall operation of an editing process of the second embodiment.

First, the editing process to be performed by the editing circuit 20213 will be described. The whole process flow is shown in FIG. 24.

First, an editing process is selected from the operation unit 20413 (S1402), next, at least one of a color conversion process (S1406), a paint process (S1407), and a free color process (S1408) is selected, and final parameters are determined using the preview function and the like (S1403). The final image is printed out (S1404, S1405).

The procedure of each image process mode will be described.

(1) Color Conversion Process

Figure 25:
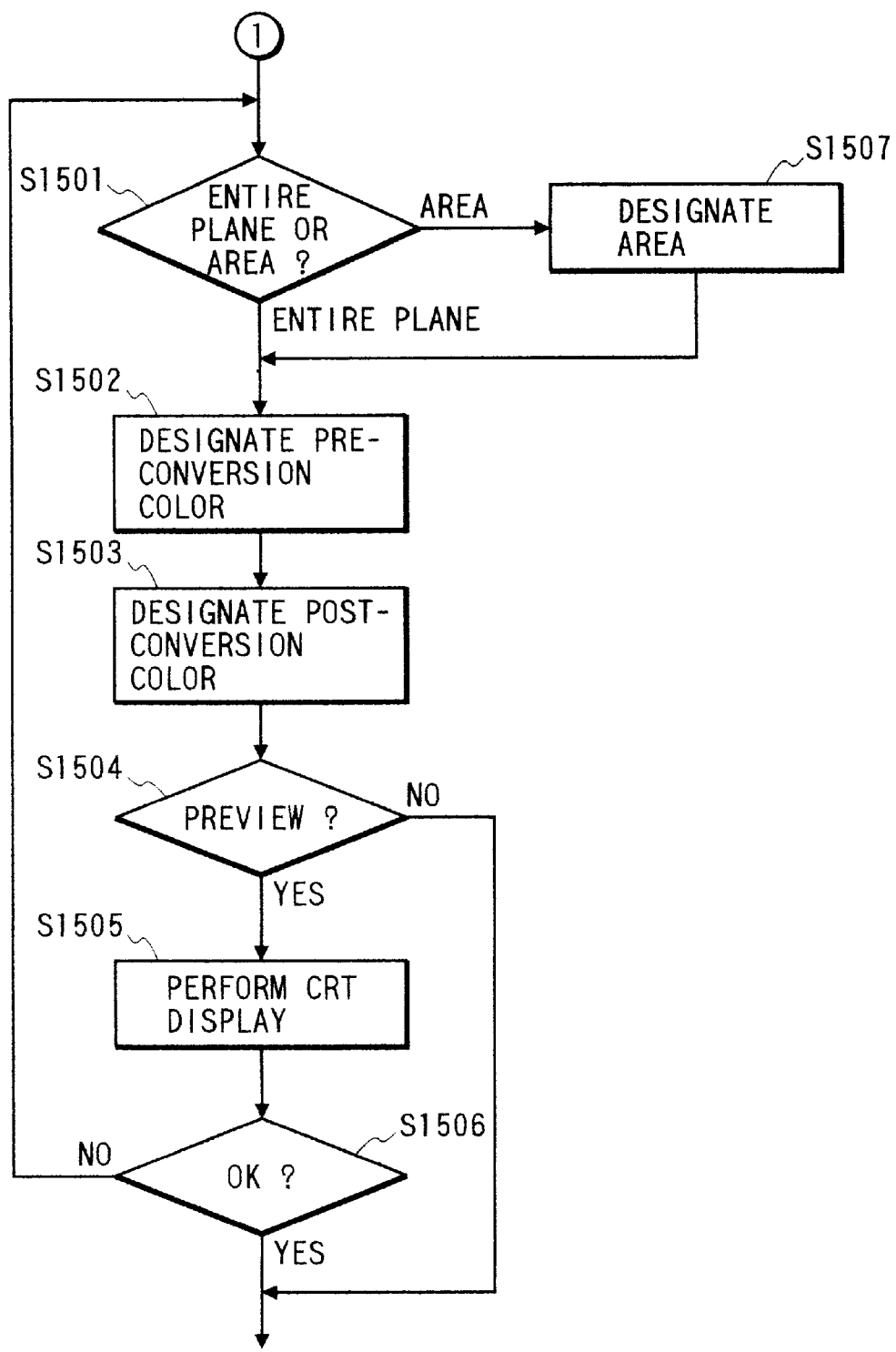
FIG. 25 is a flow chart illustrating an example of the operation of a color conversion process of the second embodiment.

The color conversion process will be described with reference to the flow chart of FIG. 25. For the color conversion process, either an entire surface color conversion or an area color conversion is selected (S1501). If the area color conversion, an area is set, for example, by using an unrepresented digitizer (S1507). Next, a pre-conversion color is designated (S1502) and a post-conversion color is designated (S1503) to determine data necessary for the color conversion. When a preview function is selected at S1504 (e.g., by depressing an unrepresented preview button), a reflection original placed on the original support is read and the read data is processed in the order described with the above paragraph (Display of RGB Editing Process (Color Conversion) Result on CRT) to display it on CRT at S1505. If an operator is satisfied with the displayed result, another editing process is set or the displayed result is printed out, whereas if not satisfied, the setting is repeated until the operator is satisfied.

(2) Paint Process

Figure 26:
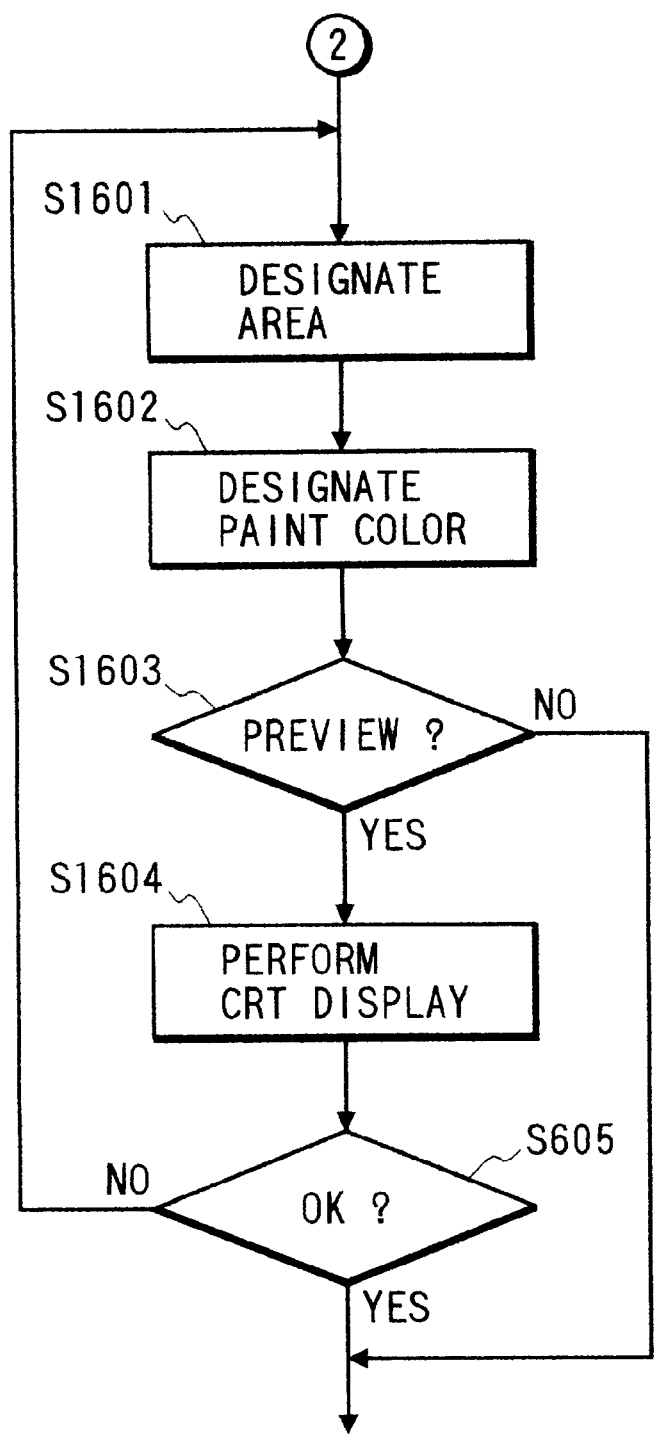
FIG. 26 is a flow chart illustrating an example of the operation of a paint process of the second embodiment.

The paint process will be described with reference to the flow chart of FIG. 26. For the paint process, an area is set, for example, by using an unrepresented digitizer (S1601). Next, a paint color is designated at S1602. When a preview function is selected at S1603, a reflection original placed on the original support is read and the read data is processed in the order described with the above paragraph (Display of CMYK Editing Process (Paint, Free Color) Result on CRT) to display it on CRT at S1604. If an operator is satisfied with the displayed result, another editing process is set, final parameters are set, or the displayed result is printed out, whereas if not satisfied, the setting is repeated until the operator is satisfied.

(3) Free Color Process

Figure 27:
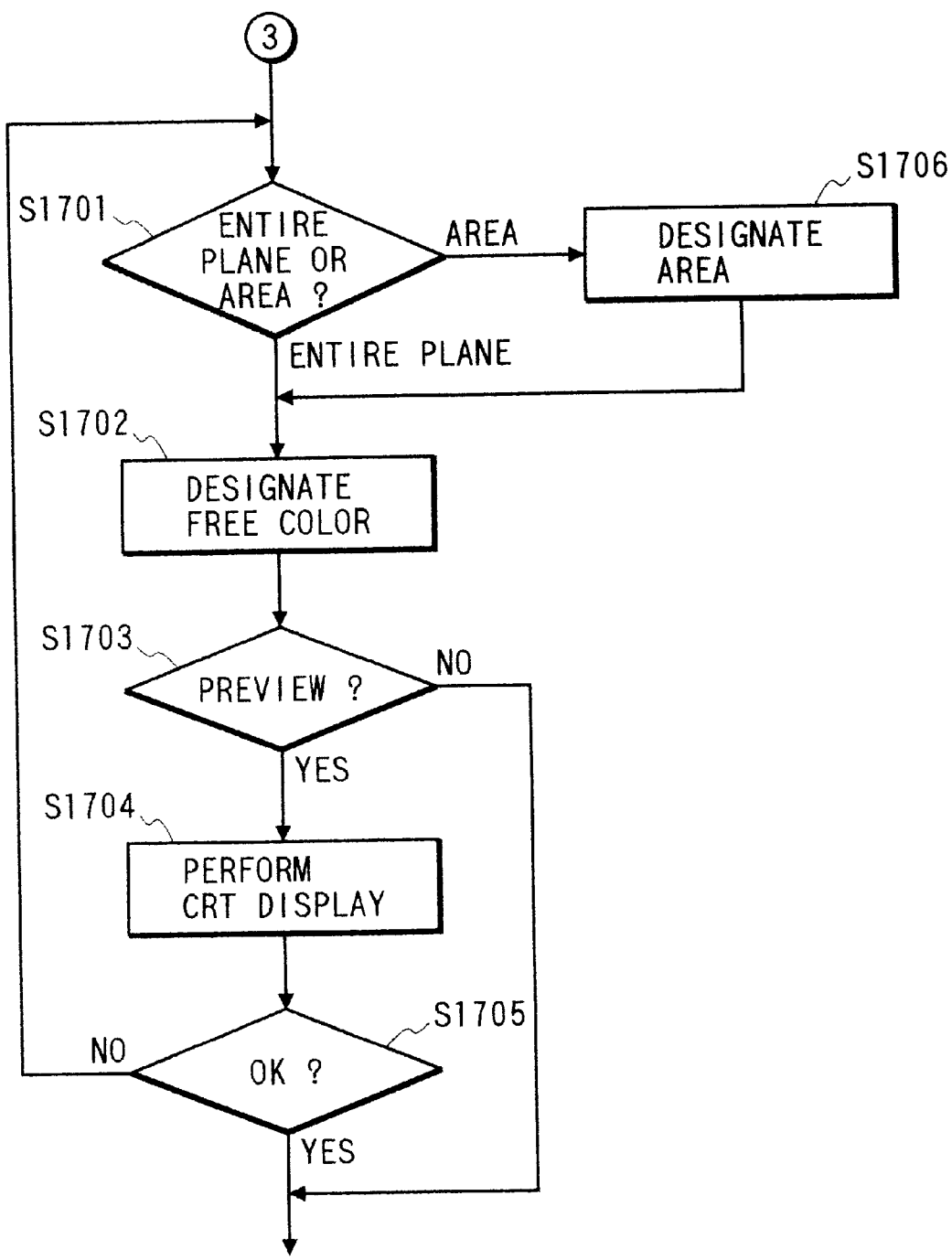
FIG. 27 is a flow chart illustrating an example of the operation of a full color process of the second embodiment.

The free color process will be described with reference to the flow chart of FIG. 27. For the free color process, either an entire surface mode or an area mode is selected (S1701). If the area mode, an area is set, for example, by using an unrepresented digitizer (S1706). At S1702, a color for the free color process is designated. When a preview function is selected at S1703, a reflection original placed on the original support is read and the read data is processed in the order described with the above paragraph (Display of RGB Editing Process (Color Conversion) Result on CRT) to display it on CRT at S1704. If an operator is satisfied with the displayed result, another editing process is set or the displayed result is printed out, whereas if not satisfied, the setting is repeated until the operator is satisfied.

Description of Color Conversion Circuit

Figure 31:
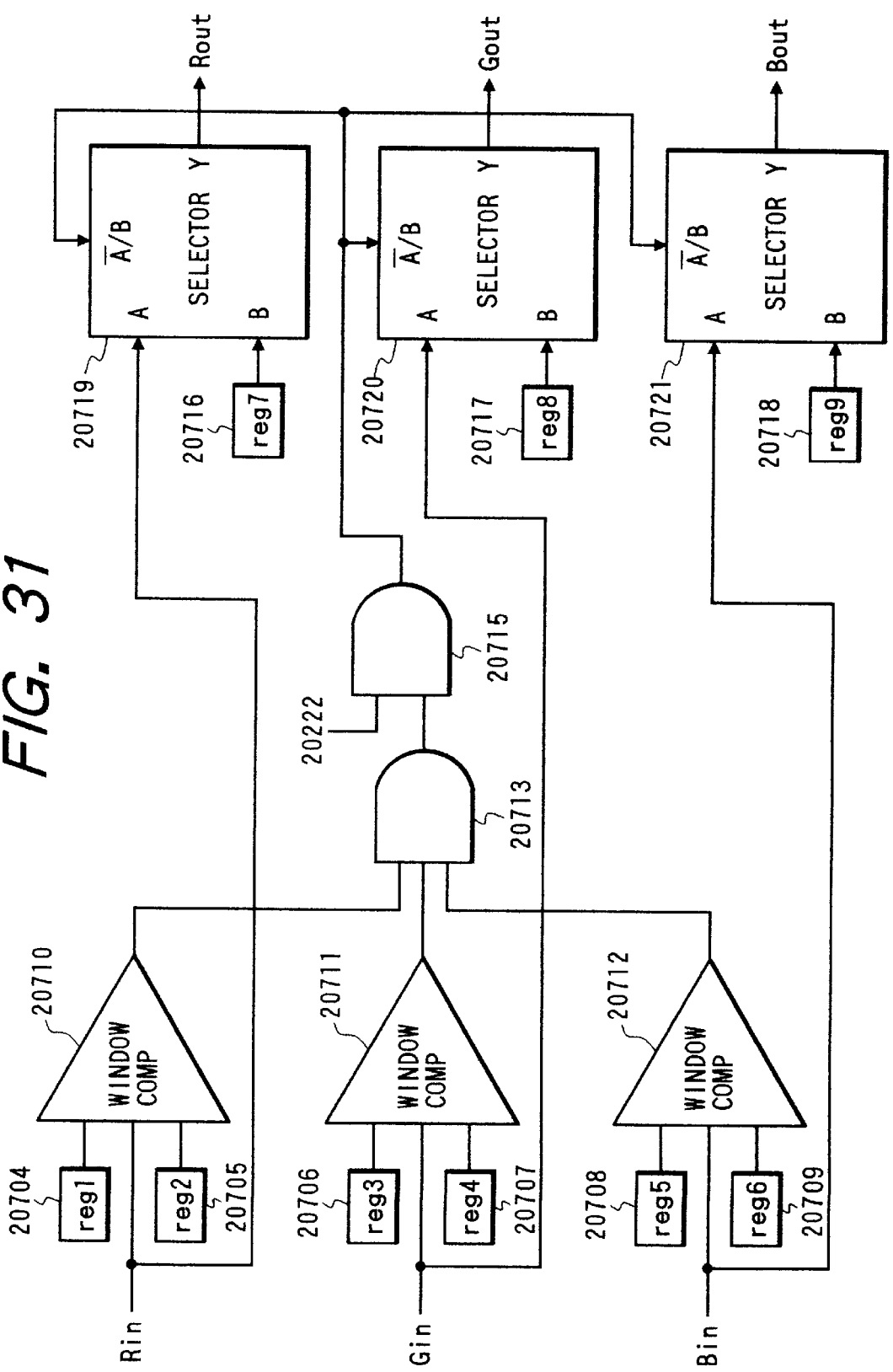
FIG. 31 is a diagram showing an example of the structure of a color conversion circuit of the second embodiment.

FIG. 31 is a diagram illustrating a color conversion process. The color conversion process unit is divided into a detection unit and a conversion unit.

The detection unit is constituted by three window comparators 20710, 20711, and 20712, two AND gates 20713 and 20715, and registers 20704 to 20709. In operation, under the conditions that:

reg1≦input video R (20701)≦reg2
reg3≦input video G (20702)≦reg4
reg5≦input video B (20703)≦reg6, the three window comparators and two AND gates output "1" and a certain characteristic color only is detected (where the area signal 212 is "1"). The conversion unit is constituted by three selectors 20719, 20720, and 20721 and registers 20716 to 20718. If an output of the AND gate 20715 is "1", the contents of the registers 20716 to 20718 set by CPU, i.e., converted colors, are output as signals 20722 to 20724, whereas if the output is "0", the video signals themselves (20701 to 20703) are directly output.

Description of Paint, Free Color circuit

Figure 32:
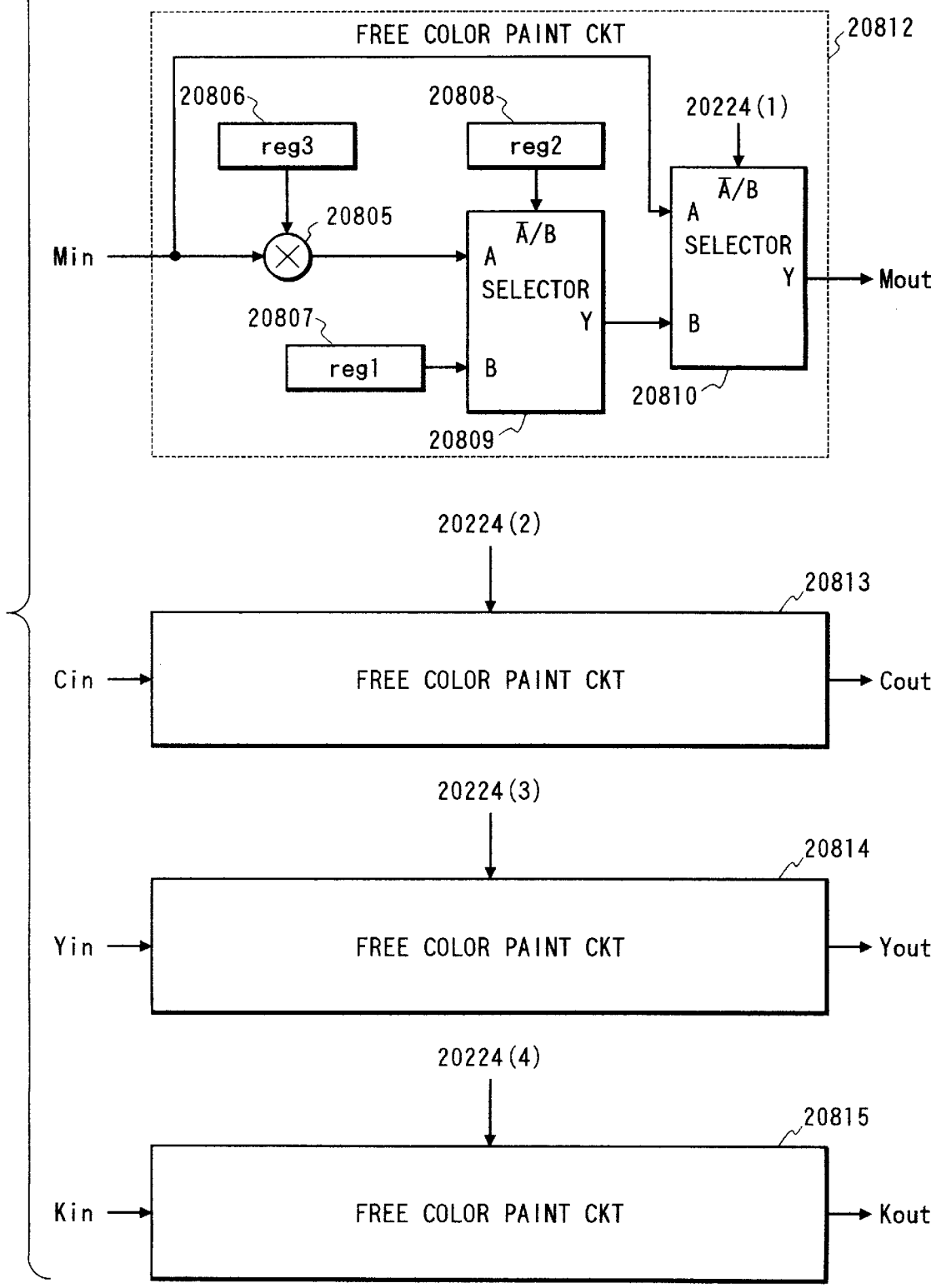
FIG. 32 is a diagram showing an example of the structure of a free color paint circuit of the second embodiment.

FIG. 32 is a block diagram illustrating a free color paint process.

The free color paint circuit is constituted for each color video signal by a multiplier 20805, two selectors 20809 and 20810, and registers 20806, 20807, and 20808 set by an unrepresented CPU.

In operation, for the free color process, an ND signal (M/3+C/3+Y/3) generated by the masking UCR circuit and data in the register reg3 20806 which is determined by a color designated by a user are multiplied by the multiplier 20805. An output of the multiplier is selected by the two selectors and output as a signal 20812. If the free color process is to be performed for part of an original, the area signal 20224-1 is set to "1" only for the processed area. In this case, the masking UCR circuit is controlled so that the ND signal is output only for this area signal.

For the paint process, the selector 20809 selects the register reg1 20807 set by an unrepresented CPU so that the register reg2 20808 is selected ("1" is set), and the selector 20810 is controlled so that it selects an output of the paint process only at the area signal 20808 of "1".

Reference numeral 20813 represents a free color paint circuit for cyan (C), reference numeral 20814 represents a free color paint circuit for yellow (Y), and reference numeral 20815 represents a free color paint circuit for black (B). The inputs of these circuits are Cin 20802, Yin 20803, and Kin 20804, and the outputs thereof are Cout 20815, Yout 20816, and Kout 20817. These circuits are controlled by a second area signal 20224-2, a third area signal 20224-3, and a fourth area signal 20224-4.

When the preview image is displayed on the CRT, the signals 20224-1 to 20224-3 are controlled to be enabled at the same time.

Structure of Image Memory Unit

Figure 33:
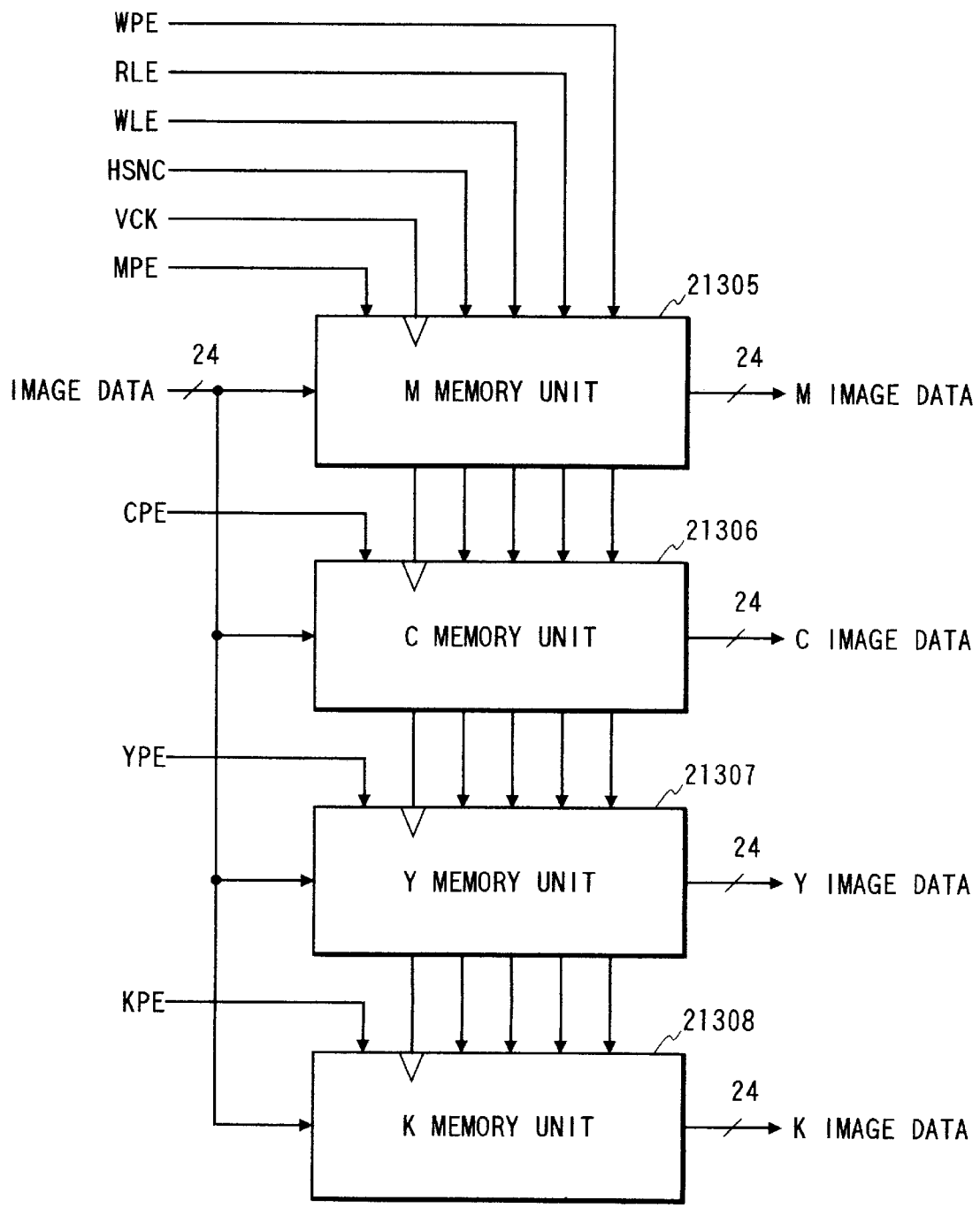
FIG. 33 is a diagram showing an example of the structure of a memory unit of the second embodiment.

FIG. 33 is a block diagram showing an example of the structure of the image memory unit 20208. The image memory unit 20208 is constituted by an M memory unit 21305, a C memory unit 21306, a Y memory unit 21307, and a K memory unit 21308 each having a control unit and the same structure.

The common image data is supplied to each memory unit. Input to each memory unit are a main scan synchronization signal HSNC and an image clock VCK, and as the common control signals, a main scan write enable signal WLE, a main scan read enable signal RLE, and a sub scan write enable signal WPE. A magenta sub scan read enable signal MPE is input to the M memory unit 21305, a cyan sub scan read enable signal CPR is input to the C memory unit 21306, a yellow sub scan read enable signal YPE is input to the Y memory unit 21307, and a black sub scan read enable signal BPR is input to the B memory unit 21308.

Figure 34:
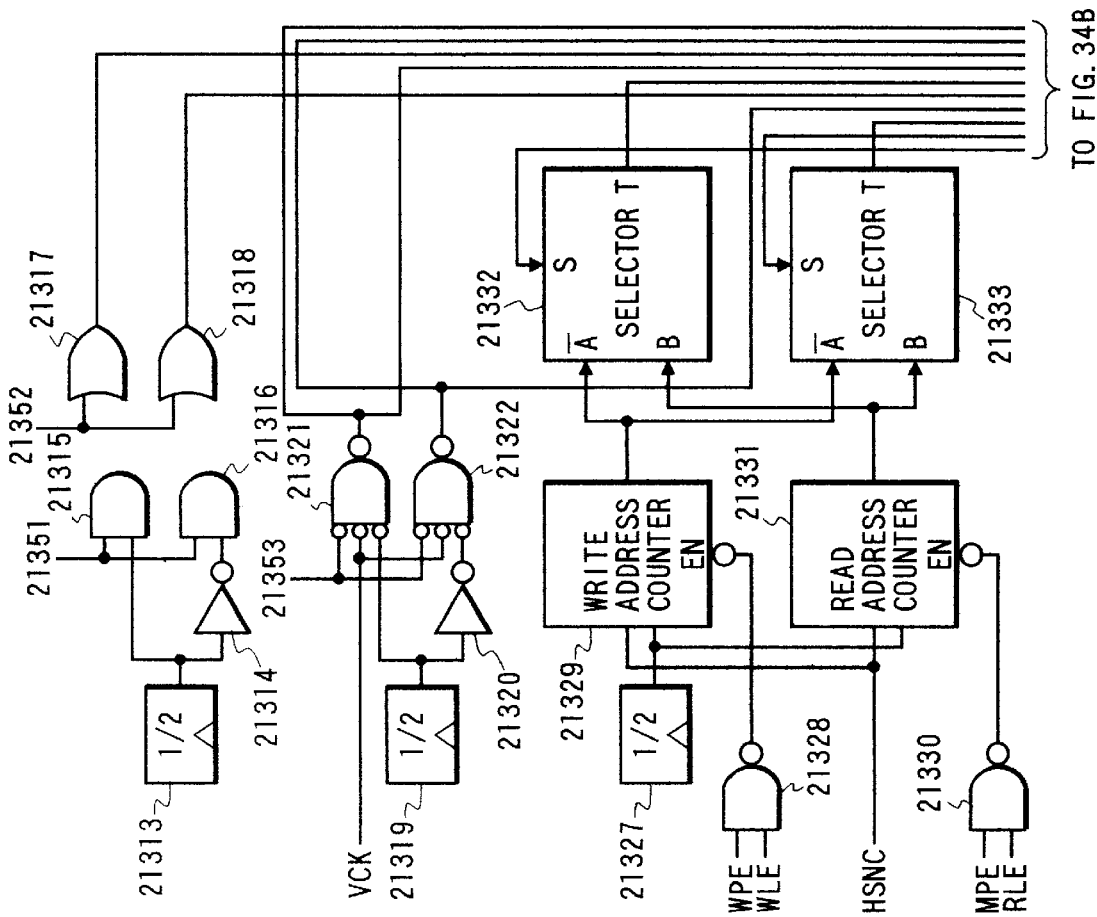
FIG. 34 which is composed of FIGS. 34A and 34B is a diagram showing an example of the structure of a memory unit of each color of the second embodiment.
Figure 34B:
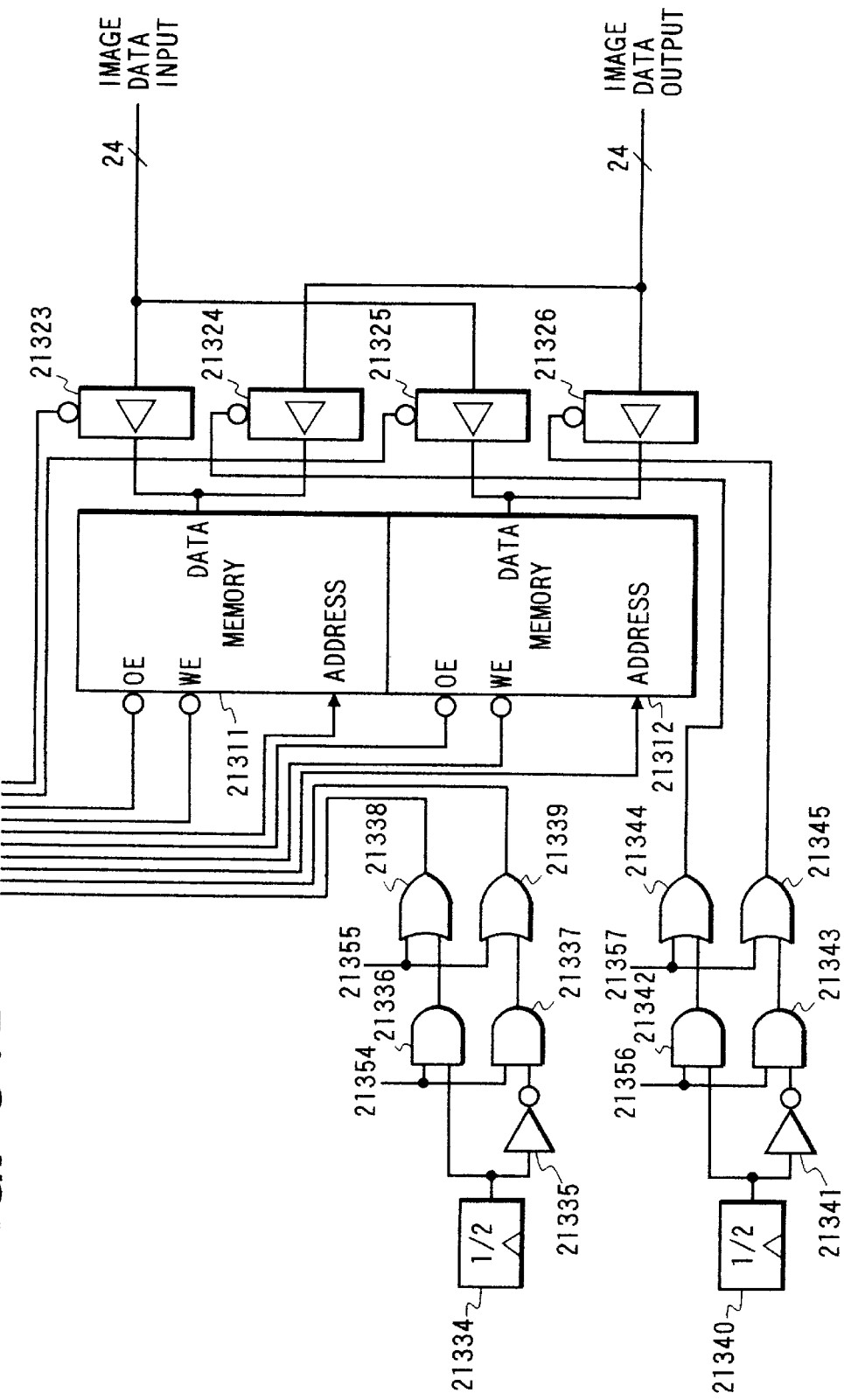

FIG. 34 is a block diagram showing an example of the internal structure of the color memory units 21305 to 21308 each including two memories 21311 and 21312 which execute a toggle operation for each pixel both in the read and write operations to be detailed later.

The control unit is constituted by the following blocks. Each frequency divider divides the image clock VCK by 2.

A block for controlling an enable signal OE, the block being constituted by a frequency divider 21313, an inverter 21314, AND gates 21315 and 21316, and OR gates 21317 and 21318.

A block for controlling a write enable WE and input drivers 21323 and 21325 of the two memories 21311 and 21312, the block being constituted by a frequency divider 21319, an inverter 21320, and OR gates 21321 and 21322.

A write address counter 21329 for counting the main scan synchronization signal HSNC and an output of a frequency divider 21327, an output of the write address counter being enabled by an output of a NAND gate 21328 supplied with the signals WPE and WLE.

A read address counter 21331 for counting the main scan synchronization signal HSNC and an output of the frequency divider 21327, an output of the read address counter being enabled by an output of a NAND gate 21330 supplied with the signals MPE (or CPE, YPE, KPE) and RLE.

A block constituted by selectors 21332 and 21333 for selecting one of the counters 21329 and 21331 for obtaining addresses of the memories 21311 and 21312, and the components for controlling this selection, including a frequency divider 21334, an inverter 21335, AND gates 21336 and 21337, and OR gates 21338 and 21339.

A block for controlling output drivers 21324 and 21326 of the two memories 21311 and 21312, the block being constituted by a frequency divider 21340, an inverter 21341, AND gates 21342 and 21343, and OR gates 21344 and 21345.

The read and write operations of the first image memory will be divisionally described.

Write Operation of First Image Memory

Figure 35:
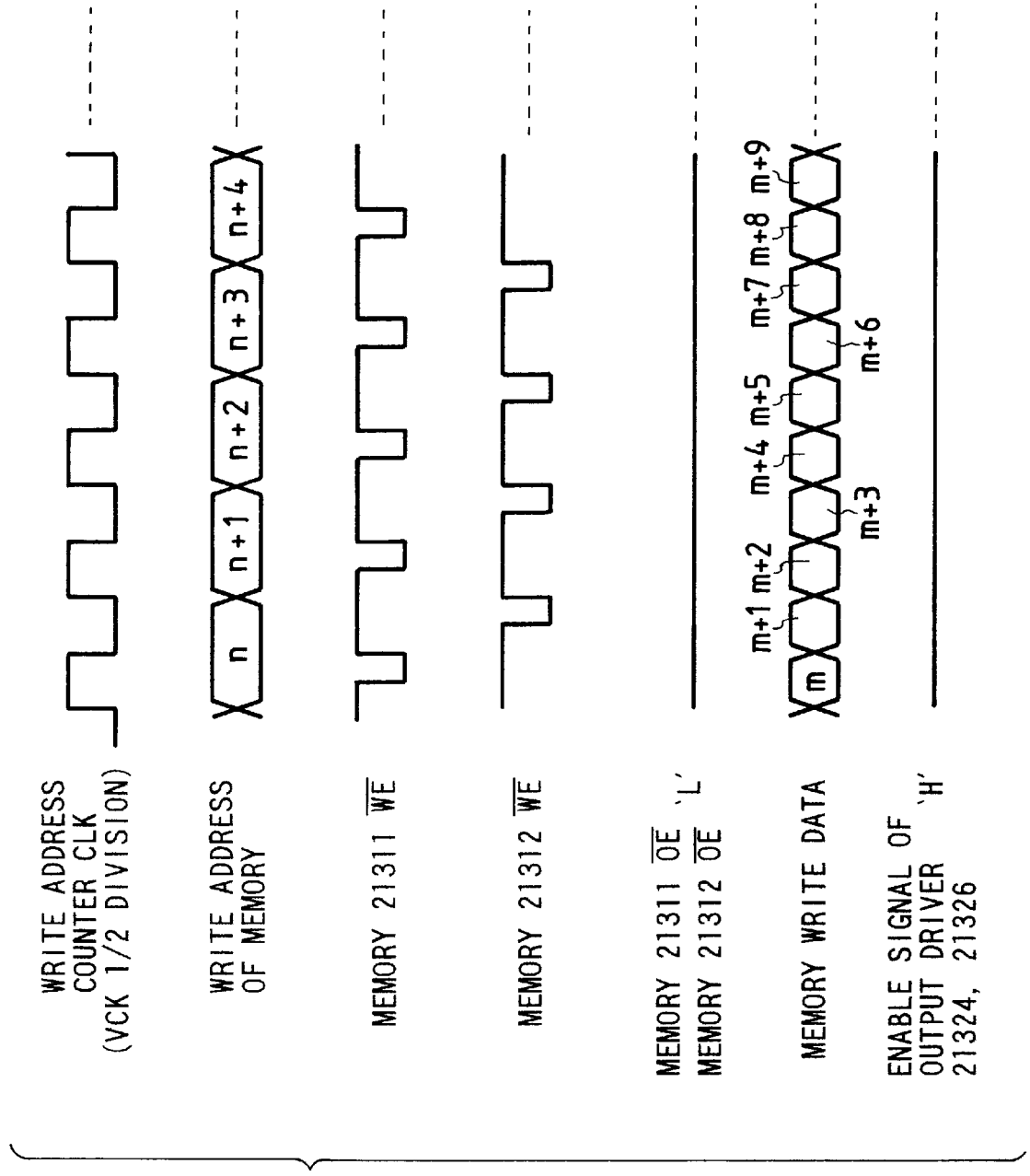
FIG. 35 is a diagram illustrating a memory address control of the second embodiment.

A first color original is read by the reader unit and written in the memory. In this operation, the I/O ports 21403b to 21403g are set as 21403b="L", 21403c="L", 21403d="L", 21403e="L", 21403f="X", 21403g="H". Therefore, as shown in FIG. 35, as the address of the memory, an output of the write address counter 21414 is selected, and the write into the memories 1—1 and 21431 and the memories 1-2 and 21432 is performed in a toggle manner at each pixel.

Read Operation of First Image Memory

Figure 36:
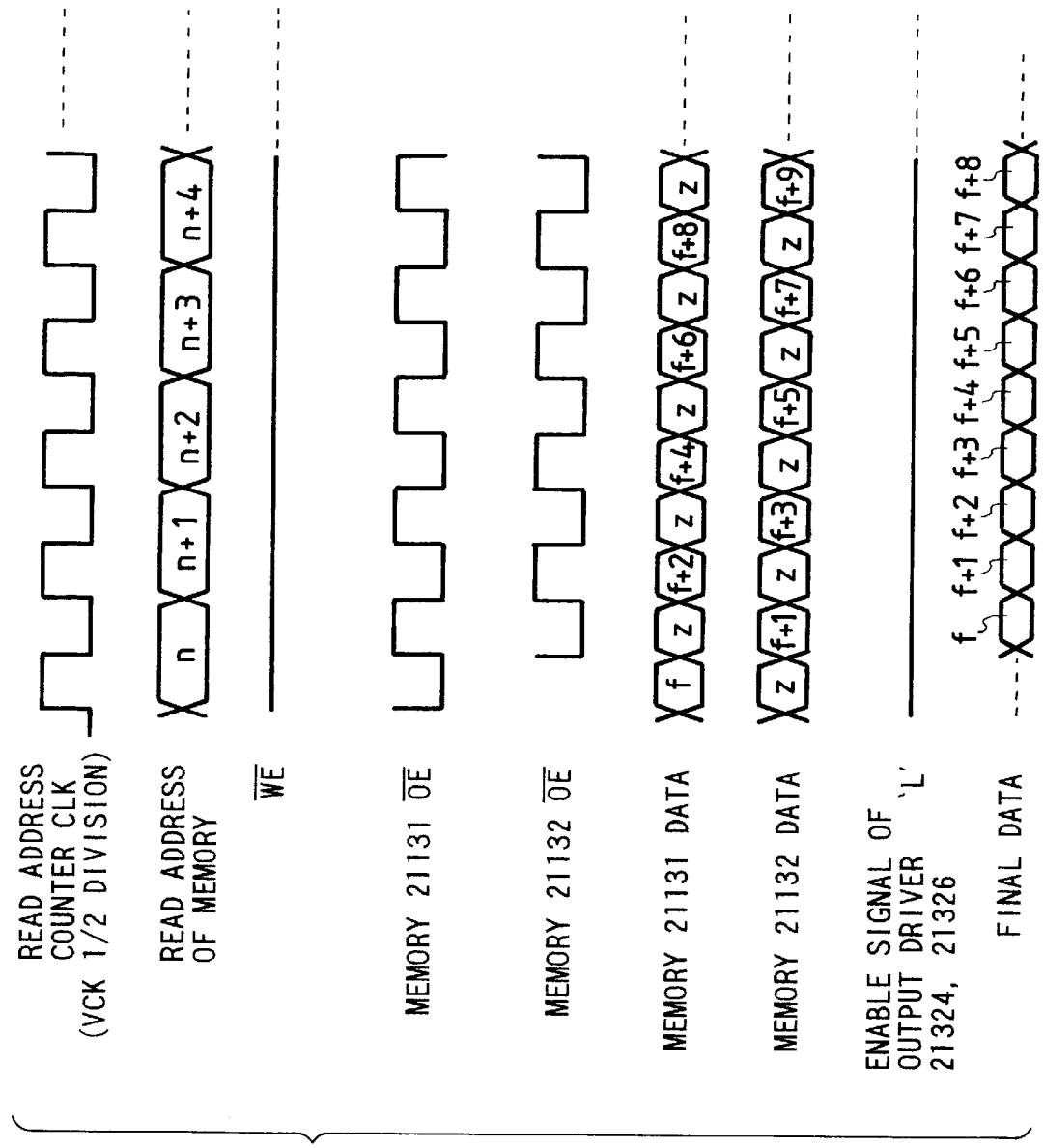
FIG. 36 is a diagram illustrating a read timing of the memory unit of the second embodiment.

A final synthesis result is output. In this operation, the I/O ports 21403b to 21403g are set as 21403b="L", 21403c="H", 21403d="X", 21403e="H", 21403f="L", 21403g="L". Therefore, as shown in FIG. 36, as the address of the memory, an output of the read address counter 21416 is selected, and as the addresses of the two memories, an output of the read address counter 21416 is selected. By controlling OE of the two memories, data is read one pixel after another in a toggle manner.

When an image is output to the printer, each color read enable signal is enabled synchronously with the drum operation, and during the preview mode, CMYK read enable signals are enabled at the same time.

(iii) Image forming unit

An image is formed by using the printer unit 20103 of an electrophotography type shown in FIG. 21.

(iv) Preview processing unit

Figure 28:
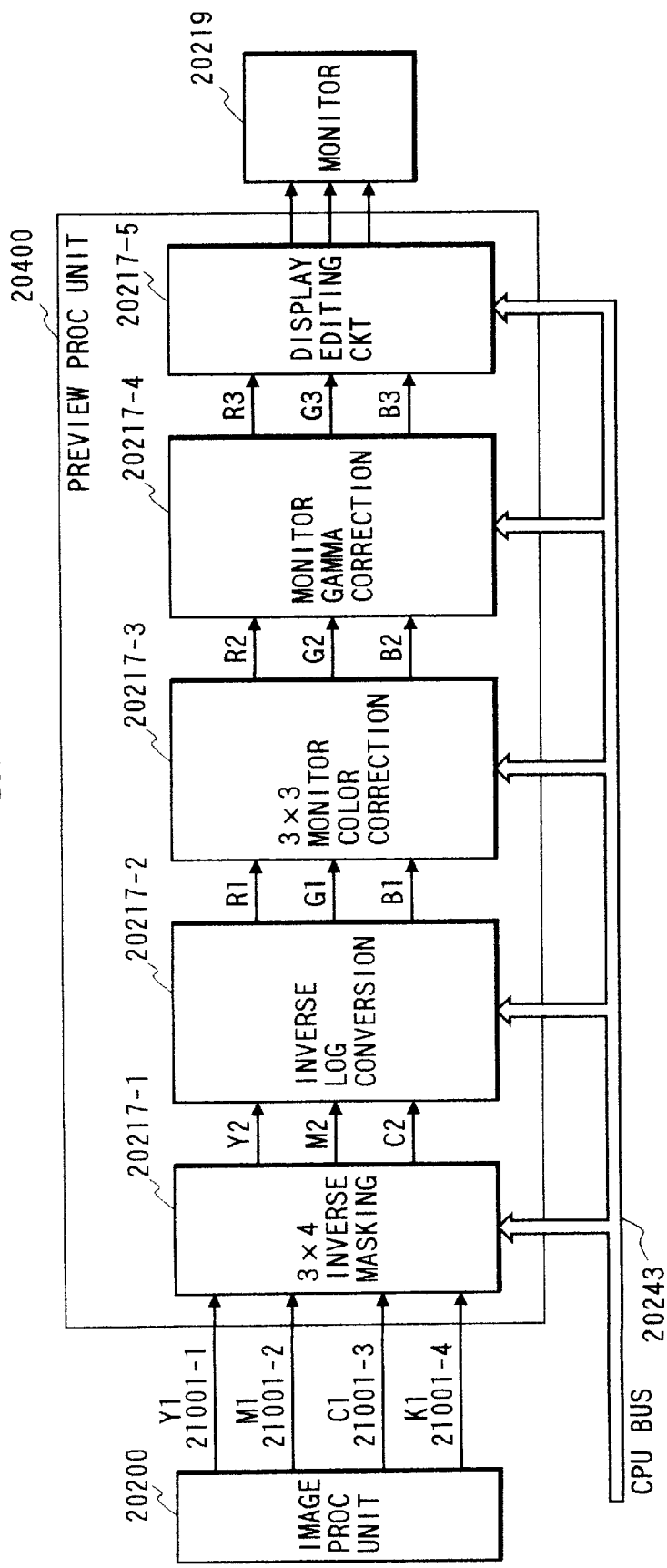
FIG. 28 is a diagram showing an example of the structure of a preview processing unit of the second embodiment.
Figure 29:
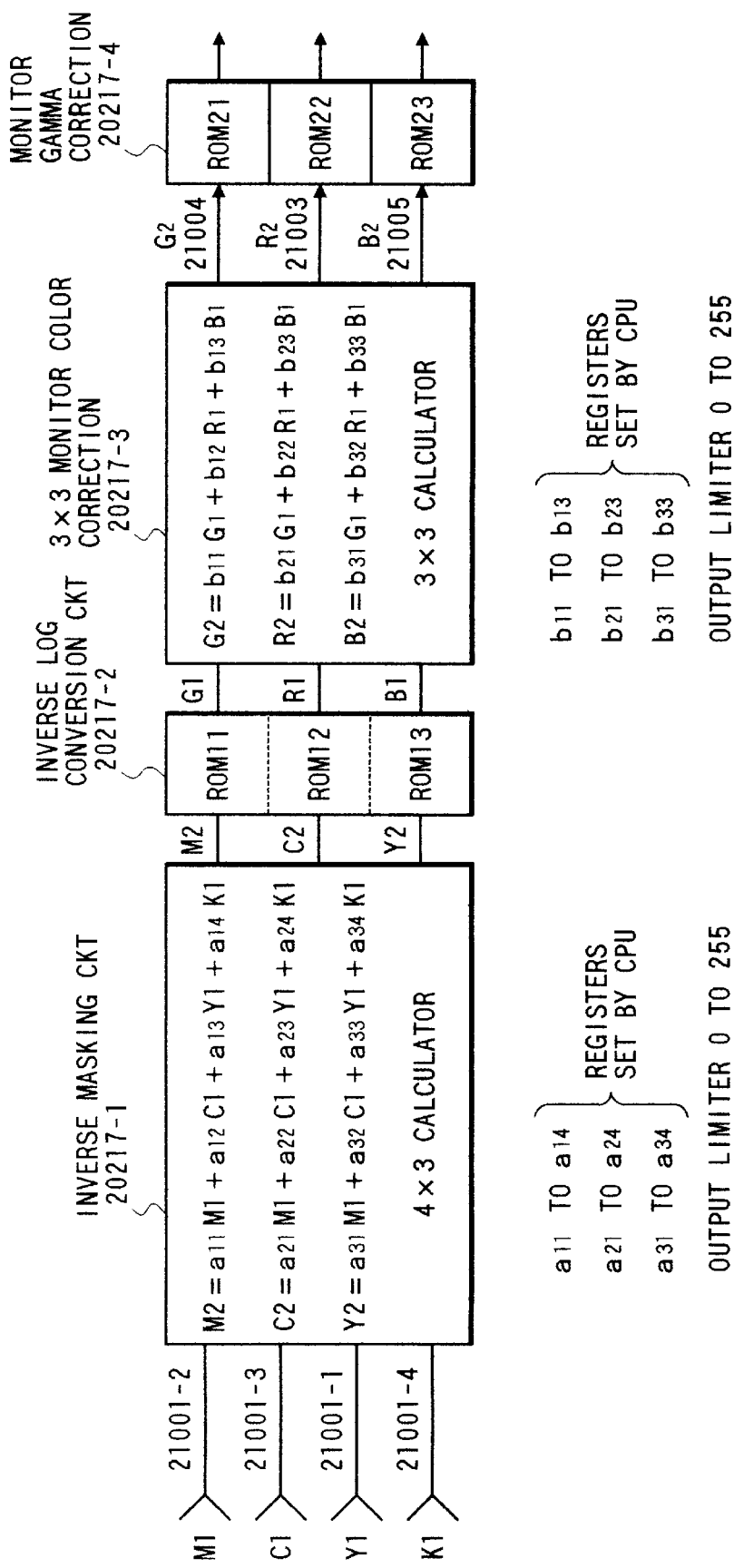
FIG. 29 is a diagram showing an example of the circuit arrangement of the preview processing unit of the second embodiment.

FIG. 28 is a block diagram of a preview processing unit 204000 for displaying a preview image on a CRT 20219 in accordance with final density data Y1, M1, C1, and K1 output from the image processing unit 20200. FIG. 29 is a diagram showing the structure of circuits of the preview processing unit.

Final image data (8-bit data for each YMCK) Y1, M1, C1, and K1 1001-1 to 1001-4 are input first to a 3×4 inverse masking correction circuit 20217-1 to execute the following calculations which are inverse calculations of the masking UCR circuit 20226 shown in FIG. 23.

Y2=a11 * Y1+a12 * M1+a13 * C1+a14 * K1
M2=a21 * Y1+a22 * M1+a23 * C1+a24 * K1
C2=a31 * Y1+a32 * M1+a33 * C1+a34 * K1

Arbitrary coefficients a11 to a34 can be set by CPU 20240 via a CPU bus 20243. The four-color information Y1, M1, C1, and K1 is converted into three-color information Y2, M2, and C2 which is then supplied to an inverse logarithm conversion correction circuit 20217-2. This circuit is constituted by an LUT for inverse calculations of the LOG 20207 shown in FIG. 23. Similar to the above, arbitrary correction data can be set by CPU.

The inverse masking circuit 20217-1 calculates a matrix of 3 rows and 4 columns, and the row and column values are calculated in the following manner. First, it is assumed that the masking UCR 20226 calculates the following matrix of 4 rows and 4 columns.

$$\begin{bmatrix} C' \\ M' \\ Y' \\ K' \end{bmatrix} = \begin{bmatrix} a11 & a12 & a13 & a14 \\ a21 & a22 & a23 & a24 \\ a31 & a32 & a33 & a34 \\ a41 & a42 & a43 & a44 \end{bmatrix} \begin{bmatrix} C \\ M \\ Y \\ K \end{bmatrix}$$

If the inverse matrix is represented by:

$$\begin{bmatrix} b11 & b12 & b13 & b14 \\ b21 & b22 & b23 & b24 \\ b31 & b32 & b33 & b34 \\ b41 & b42 & b43 & b44 \end{bmatrix} = \begin{bmatrix} a11 & a12 & a13 & a14 \\ a21 & a22 & a23 & a24 \\ a31 & a32 & a33 & a34 \\ a41 & a42 & a43 & a44 \end{bmatrix}^{-1}$$

then the matrix calculation of the inverse masking circuit is given by:

$$\begin{bmatrix} C'' \\ M'' \\ Y'' \end{bmatrix} = \begin{bmatrix} b11 & b12 & b13 & b14 \\ b21 & b22 & b23 & b24 \\ b31 & b32 & b33 & b34 \end{bmatrix} \begin{bmatrix} C' \\ M' \\ Y' \\ K' \end{bmatrix}$$

If the masking UCR 20226 calculates a matrix other than a square matrix, this matrix is approximated to a square matrix and the matrix calculation by the inverse masking circuit 20217-1 can be obtained in the similar manner as above.

With the above calculation, the density data of Y1, M1, C1, and K1 is converted into the luminance data of R1, G1, and B1 which can be displayed on the monitor.

In displaying a preview image on the monitor, the CMYK image signals output from the image processing unit 20200 are inversely converted into RGB signals. In this case, it is necessary to further correct the inversely converted RGB signals so as to make the hard copy image coincide with the preview image. The reason of this is as follows. Generally, even if RGB signals picked up by a scanner are displayed on the monitor, the original image cannot be correctly reproduced because of the coloring characteristics and non-linearity of the monitor. Therefore, after the CMYK image signals are inversely converted into RGB signals by the inverse masking circuit 20217-1 and an inverse logarithm conversion circuit 20217-2, the RGB signals are supplied to a 3×3 monitor color correction circuit 217-3 for improving the color reproduction based upon the color reproduction range of the monitor 20219 and to a monitor gamma correction circuit 20217-4 for correcting non-linearity of the monitor, to be thereafter output to the monitor 20219 (CRT monitor, liquid crystal monitor, plasma display monitor, LED display monitor, or the like).

Figure 30:
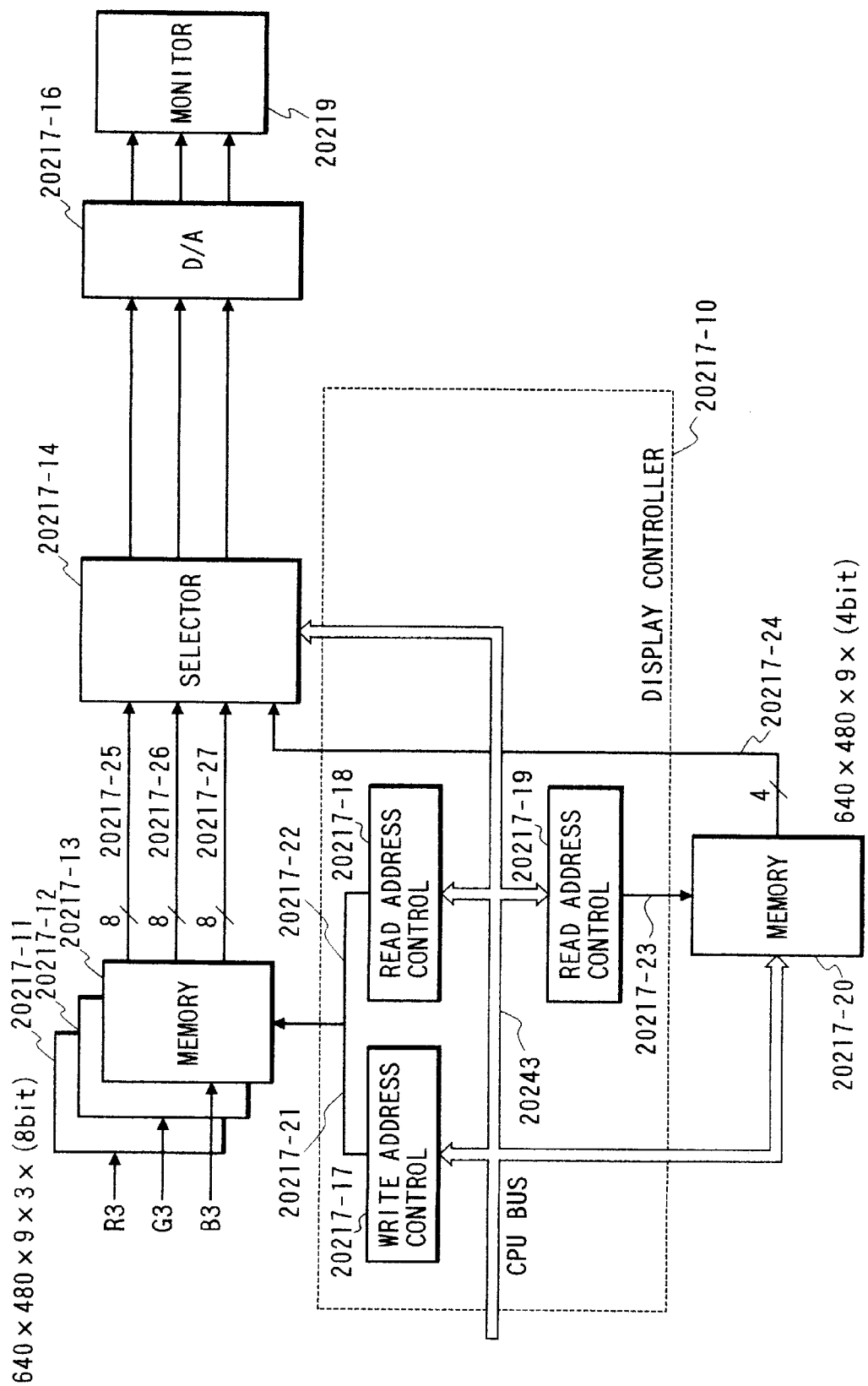
FIG. 30 is a diagram showing an example of the structure of a display editing circuit of the second embodiment.

A display editing circuit 20217-5 performs various editing processes for the image data displayed on the monitor and controls the monitor. FIG. 30 shows the details of the display editing circuit which is roughly divided into a read image processing section and an additional information adding section for adding a frame, character, or the like to the image.

R3, G3, and B3 data after the monitor gamma correction by the monitor gamma correction circuit 20217-4 are supplied to memories 20217-11, 20217-12, and 20217-13. Start and end addresses in X and Y directions can be set via the CPU bus 20243 to a writing address control circuit 20217-17 of a display controller 20217-10 which supplies an address signal 20217-21 so that data can be written starting from a desired location of each memory. In this embodiment, the memory size of each color is 640×480×9×(8 bits).

The original image size can be reduced when the image data is stored in the memory, the magnification factor being set by the CPU. In accordance with whether the image is horizontally or vertically long, the writing address control circuit can operate to rotate the image as desired. In this case, the area outside of the start and end addresses, i.e., the area where an image is not written, has the previous image or the fixed display color. Therefore, in this embodiment, the CPU can control to display the area other than the writing area with a desired color.

The CPU can set arbitrary coordinate values to a reading address control circuit 20217-18 to read the image data in the memory at desired locations and display it on the monitor. This designation can be performed in real time, by using a touch panel key of the operation unit to be described later. Since the image size of the monitor of this embodiment is 640×480 dots, it is necessary to thin the image in order to display the whole image stored in the memory. A thinning factor can be set by the CPU. In this embodiment, as will be later described, an operator can select one of a full mode of displaying the whole image stored in the memory, a twofold mode of displaying ⅘ the image stored in the memory, and a threefold mode of displaying ⅓ the image stored in the memory.

A memory 20217-20 is used for adding information such as figures and characters to the image and has a size of 640×480×9×(4 bits) which allows to independently develop figures and characters of four frames.

In this embodiment, although the data is developed directly on the memory by CPU 20240, it may be developed by a dedicated controller capable of developing data at high speed, such as AGDC. The reading address control circuit 20217-19 can set a reading start location and a thinning factor, similar to the reading address control circuit 20217-18.

The data read from the memories is input to a selector 20217-14. If a signal 20217-24 read from the memory 20217-20 is "L", the selector outputs the image data itself 20217-25 to 20217-27, and if the signal is "H", it outputs R, G, and B (8 bits) data of four frames. These R, G, and B data can be set by CPU 20240 and a desired color is given to the figures and characters in each of the four fields.

The signal output from the selector 20217-14 is converted into an analog signal by a D/A converter 25 20217-16 to display a final image on a monitor 20219.

Third Embodiment

In the first and second embodiments, if the coloring characteristics of a monitor change because the monitor is degraded or it is replaced by a new one, or if the color temperature of illumination light changes because the monitor is installed at a different position or an illumination apparatus is replaced by a new one, then a user is required to again set the parameters for the preview processing.

The color of the preview image is luminescence color and a monitor is generally coated with an anti-reflection material. Therefore, the monitor is relatively less influenced by illumination. However, the color of a hard copy is a surface color so that if illumination light changes, a problem (chromatic adaptation) of a change in the sensed color.

An object of the third embodiment resides in that even if a color temperature of white of a monitor changes or a color temperature of ambient light changes, both color temperatures can be easily made equal.

Figure 37:
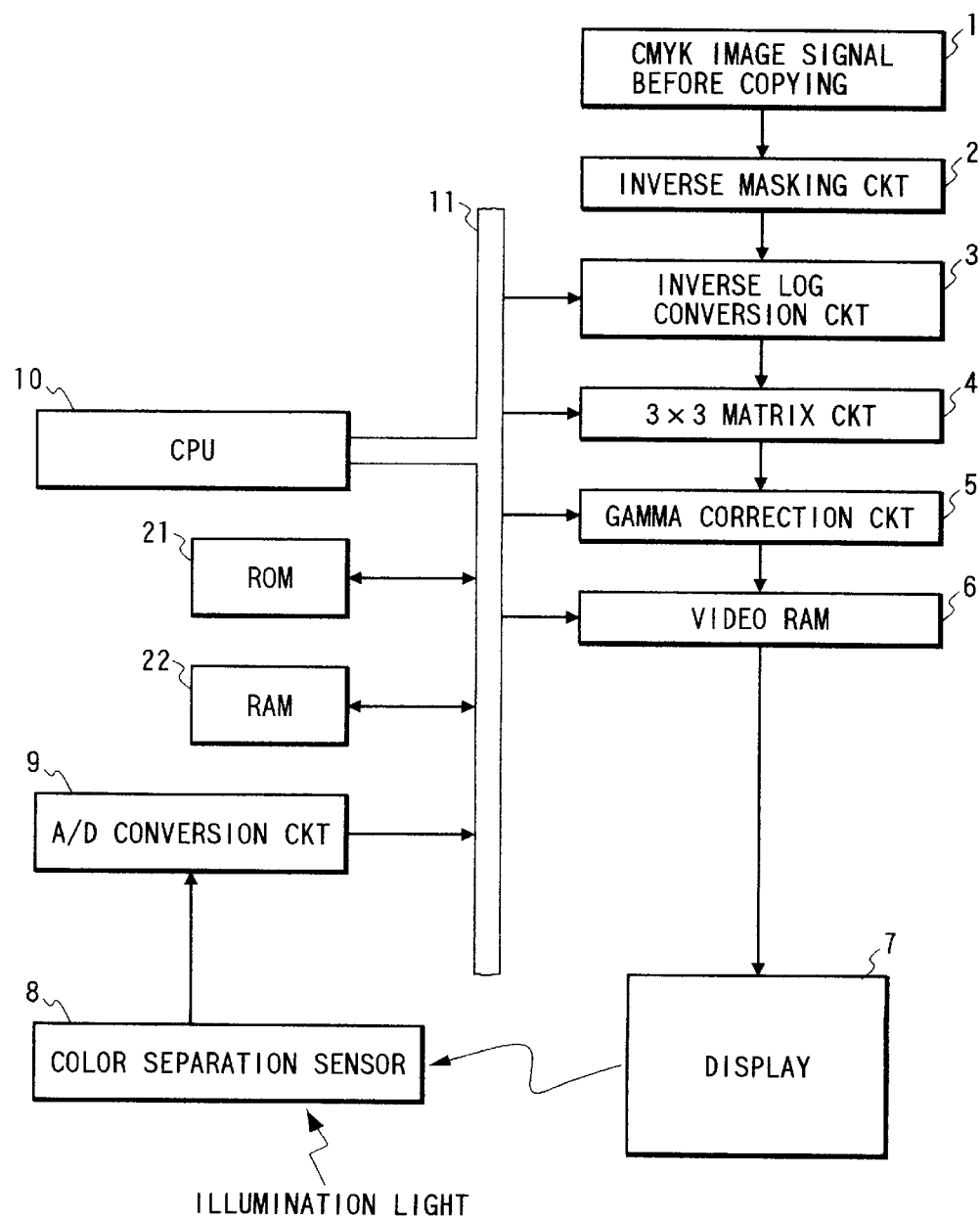
FIG. 37 is a block diagram showing an example of the structure of an image forming apparatus according to a third embodiment of the invention.

FIG. 37 is a block diagram showing an example of the structure of an image processing apparatus according to the third embodiment, particularly showing an example of the structure which realizes a preview function.

In FIG. 37, reference numeral 2 represents an inverse masking circuit, and reference numeral 3 represents an inverse logarithm conversion circuit. Reference numeral 4 represents a 3×3 matrix circuit for converting the color space of an image signal from a color space (color specification system) of an image scanner (not shown) into a color space (color specification system) of a monitor 7.

Reference numeral 5 represents a gamma correction circuit for correcting non-linearity of the monitor 7, reference numeral 6 represents a video RAM for temporarily storing image signals, reference numeral 8 represents a color separation sensor, and reference numeral 9 represents an A/D converter.

Reference numeral 10 represents a CPU which controls the whole of the image processing apparatus via a bus 11. A ROM 21 stores programs and the like which are executed by CPU 10. A RAM 22 is used as a working memory by CPU 10. CPU 10 can update the matrix calculation coefficients loaded in registers of the 3×3 matrix circuit 4 and a conversion table of the gamma correction circuit 5.

The monitor 7 may be any type of displays which can display a color image, for example, a color CRT monitor, a color liquid crystal display (LCD), a color plasma display, and an LED display. The color separation sensor 8 is made of XYZ color separation filters and corresponding three photodetectors and can execute photometry of incident light in an XYZ color specification system (CIE1931).

Preview Operation

For the preview operation of the image processing apparatus shown in FIG. 37, similar to the first and second embodiments, CMYK image signals immediately before a hard copy output are inversely converted into RGB image signals by the inverse masking circuit 2 and inverse logarithm conversion circuit 3, and the color space of the RGB image signals are converted by the 3×3 matrix circuit 4 from a color space of the image scanner into a color space of the monitor 7. After the non-linearity of the monitor 7 is corrected by the gamma correction circuit 5, the RGB signals are output via the video RAM 6 to the monitor 7.

Color Matching Adjustment

The image processing apparatus of this embodiment can perform, if necessary, color matching adjustment for making white color of the monitor 7 coincide with the color temperature of illumination light.

Figure 38:
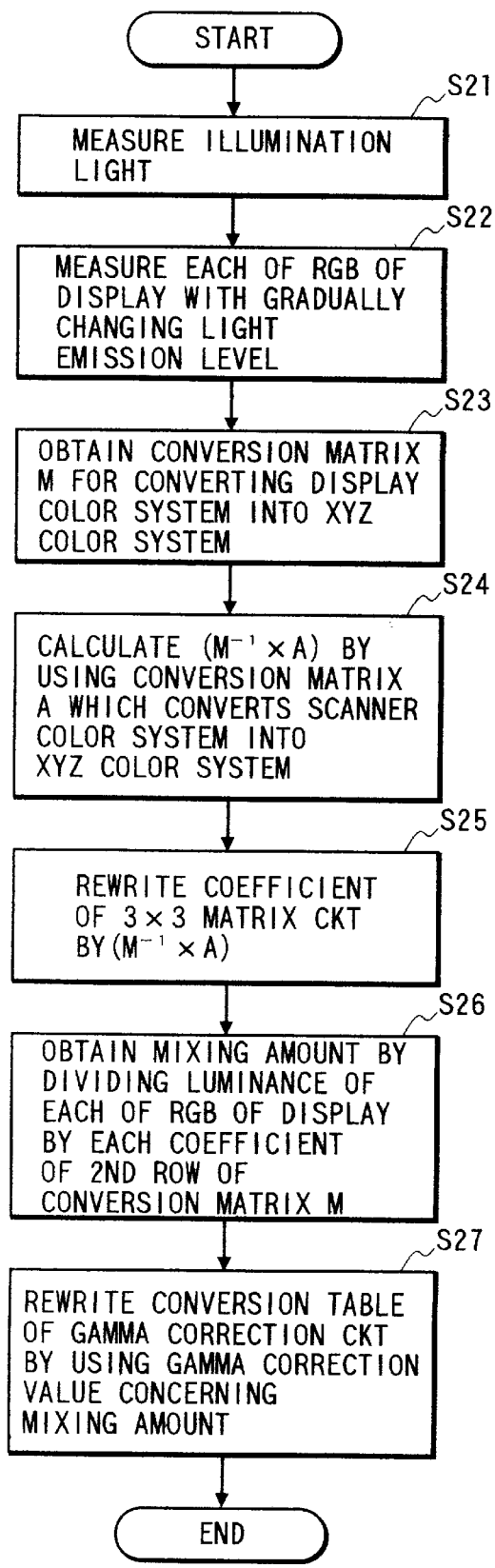
FIG. 38 is a flow chart illustrating an example of a color matching adjustment procedure of the third embodiment.

FIG. 38 is a flow chart illustrating an example of color matching adjustment which is executed by CPU 10 upon an instruction of color matching adjustment entered by an operator from an unrepresented operation unit.

First at step S21, the color separation sensor 8 measures the xy chromaticity coordinates (Xw, Yw) of white color [W] of illumination light. A symbol such as [W] surrounded by [ ] represents a stimulus value. The measured value is converted into a digital signal by the A/D converter and fetched by the CPU 10 via the bus 11.

Next, at step S22, for each of the three primaries [R], [G], and [B] of the monitor 7, the data is directly written from the CPU 10 into the video RAM 6. In this case, the emission level is stepwise changed to measure the xy chromaticity coordinates and luminance Y with the color separation sensor 8.

Next, at step S23, a conversion matrix M for converting the color specification system of the monitor 7 into the XYZ color specification system, is calculated. Specifically, the XYZ chromaticity coordinates of the measured [R] are represented by (Xr, Yr, Zr) and a sum of tristimulus values of a unit amount of [R] is represented by Sr (where Zr=1−Xr−Yr and Sr is an unknown value). Similar notifications are used for [G] and [B]. Then, the following equation is obtained:

$$\begin{bmatrix} X \\ Y \\ Z \end{bmatrix} = \begin{bmatrix} Xr & Xg & Xb \\ Yr & Yg & Yb \\ Zr & Zg & Zb \end{bmatrix} \begin{bmatrix} Sr & 0 & 0 \\ 0 & Sg & 0 \\ 0 & 0 & Sb \end{bmatrix} \begin{bmatrix} R \\ G \\ B \end{bmatrix} = M \begin{bmatrix} R \\ G \\ B \end{bmatrix} \quad (1)$$

Sr, Sg, and Sb can be obtained by solving the above equation under the conditions that the already measured white color [W] of illumination light can be realized at R=G=B=1. Accordingly, the conversion matrix M can be obtained. The conditions are summarized in the following equations (2) where they are normalized by Y=1.

R=G=B=1

X=Xw/Yw (2)

Z=(1−Xw−Yw)/Yw

Next, by using the spectral characteristics of each RGB color separation filter of the image scanner measured in advance, a matrix is obtained for converting the color specification system of the image scanner into the XYZ color specification system. This matrix is given by the following equation by representing the values of the three primaries of an image signal read with the image scanner by Rs, Gs, and Bs, respectively.

$$\begin{bmatrix} X \\ Y \\ Z \end{bmatrix} = \begin{bmatrix} a11 & a12 & a13 \\ a21 & a22 & a23 \\ a31 & a32 & a33 \end{bmatrix} \begin{bmatrix} Rs \\ Gs \\ Bs \end{bmatrix} \quad (3)$$

By representing the inverse matrix $M'(-1)$ of the conversion matrix M by the following equation (4), each element of the 3×3 matrix circuit 4 can be obtained from the matrix calculations of the following equation (5).

$$M^{\wedge}(-1) = \begin{bmatrix} b11 & b12 & b13 \\ b21 & b22 & b23 \\ b31 & b32 & b33 \end{bmatrix} \quad (4)$$

$$\begin{bmatrix} b11 & b12 & b13 \\ b21 & b22 & b23 \\ b31 & b32 & b33 \end{bmatrix} \times \begin{bmatrix} a11 & a12 & a13 \\ a21 & a22 & a23 \\ a31 & a32 & a33 \end{bmatrix} \quad (5)$$

The CPU 10 executes the above calculations at step S24 and writes at step S25 the coefficients obtained from the equation (5) into the 3×3 matrix circuit 4.

Next, since the second row of the conversion matrix M is a lightness coefficient, the luminance [Y] of each of [R], [G], and [B] already measured is divided by a corresponding lightness coefficient so that a mixed amount of [R], [G], and [B] of each input value of R, G, and B can be obtained. At step S26, the mixed amount of each input value is calculated in the form of a function by least square or the like. At step S27, the inverse function is used to update the conversion table of the gamma correction circuit 5. In this manner, if the input values of R, G, and B to the gamma correction circuit 5 are equal, the mixed amounts of [R], [G], and [B] become equal and the white color [W] of illumination light can be automatically set.

As above, in the image processing apparatus of this embodiment, the color temperatures of illumination light and the monitor 7 can be made coincident by using the color separation sensor 8 and A/D converter 9. Therefore, as described earlier, if the coloring characteristics of the monitor 7 change because the monitor is degraded or it is replaced by a new one, or if the color temperature of illumination light changes because the monitor is installed at a different position or an illumination apparatus is replaced by a new one, the color of a hard copy output and the color of a preview image become different. In such a case, the color matching adjustment can be easily performed for making the white color of the monitor 7 coincide with the color temperature of illumination light.

A modification of third Embodiment

Like elements to those of the third embodiment are represented by identical reference numerals, and the description thereof is omitted.

Figure 39:
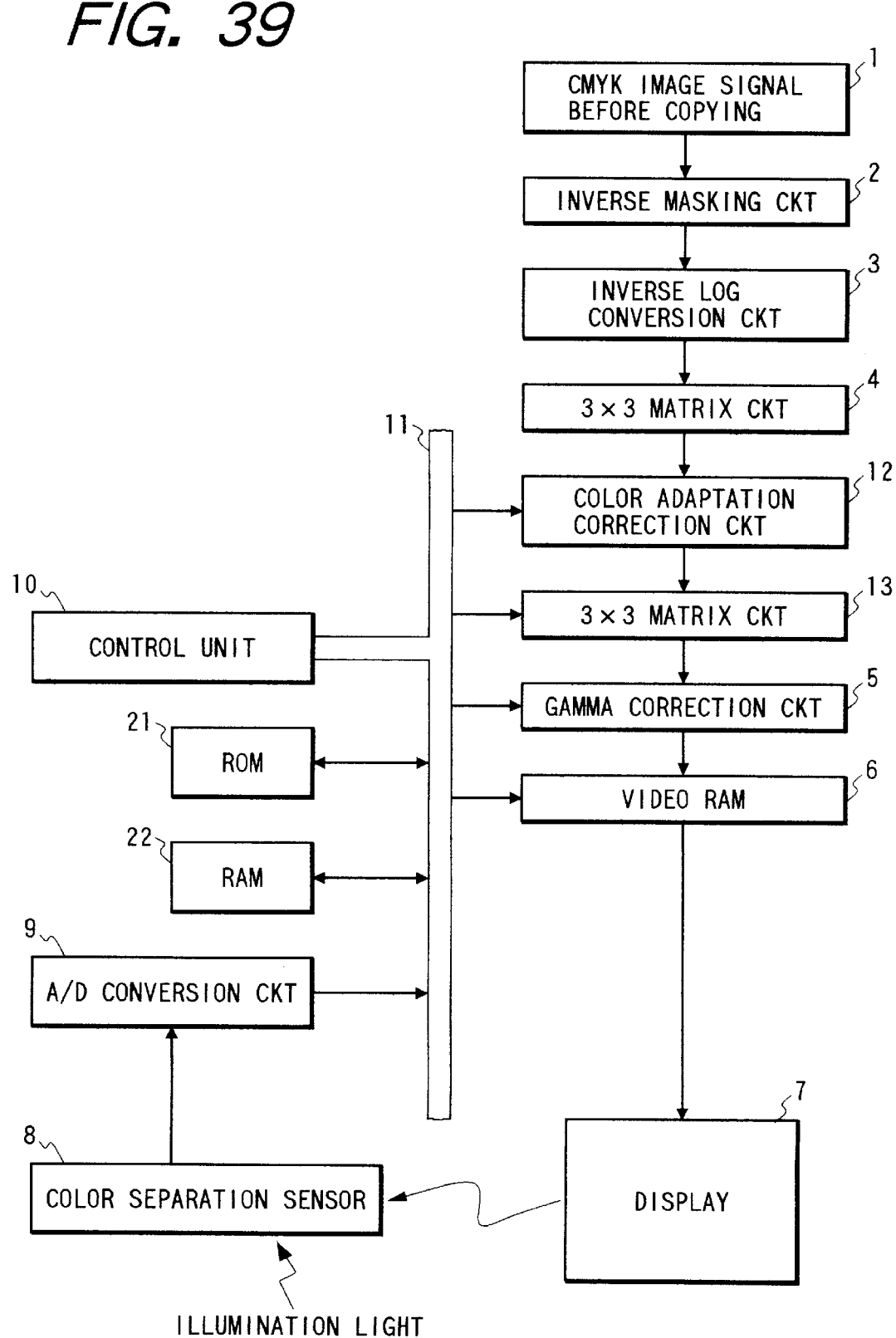
FIG. 39 is a block diagram showing an example of the structure of an image forming apparatus according to a modification of the third embodiment.

FIG. 39 is a block diagram showing an example of the structure of an image processing apparatus according to the modification of the third embodiment, particularly showing an example of the structure which realizes a preview function.

In FIG. 39, reference numeral 12 represents a chromatic adaptation correction circuit for performing an image processing corresponding to chromatic adaptation predicted from a variation in illumination light, relative to an image signal input from the 3×3 matrix circuit 4. Reference numeral 13 represents a 3×3 matrix circuit for converting an image signal input from the chromatic adaptation correction circuit 12 from the XYZ color specification system into a color specification system of the monitor 7. CPU 10 can update the matrix calculation coefficients loaded in registers of the 3×3 matrix circuit 13.

Preview Operation

For the preview operation of the image processing apparatus shown in FIG. 39, CMYK image signals immediately before a hard copy output are inversely converted into RGB image signals by the inverse masking circuit 2 and inverse logarithm conversion circuit 3, and the RGB image signals are converted by the 3×3 matrix circuit 4 into XYZ image signals. The chromatic adaptation correction circuit 12 processes the XYZ image signals for chromatic adaptation predicted from a variation in illumination light, and the 3×3 matrix circuit 13 converts the XYZ image signals into a color specification system of the monitor 7. After the non-linearity of the monitor 7 is corrected by the gamma correction circuit 5, the RGB signals are output via the video RAM 6 to the monitor 7.

Color Matching Adjustment

The image processing apparatus of this embodiment can perform, if necessary, color matching adjustment for the making white color of the monitor 7 coincide with the color temperature of illumination light, if the illumination light changes or the monitor 7 is changed.

Figure 40:
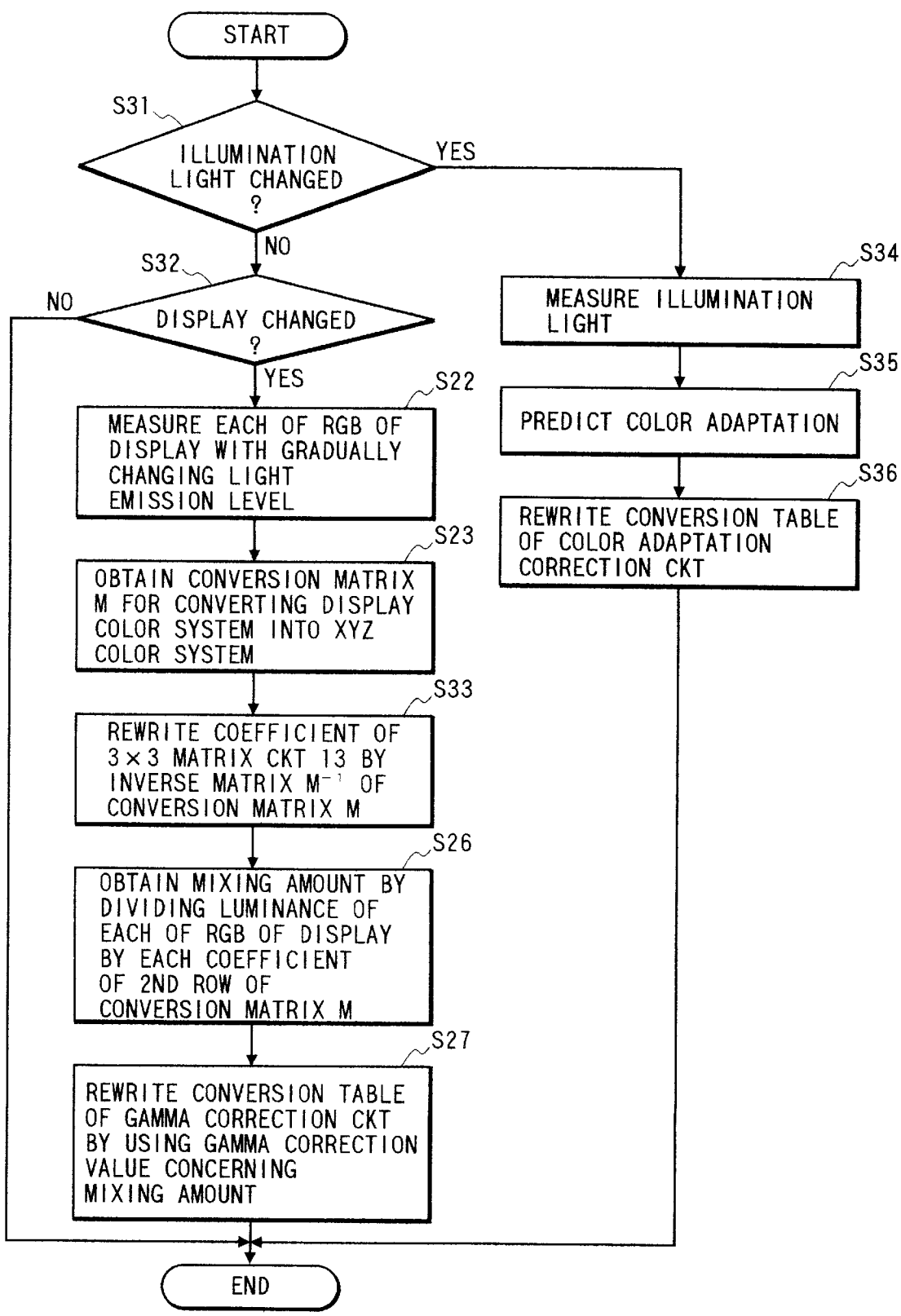
FIG. 40 is a flow chart illustrating an example of a color matching adjustment procedure of a modification of the third embodiment.
Figure 42:
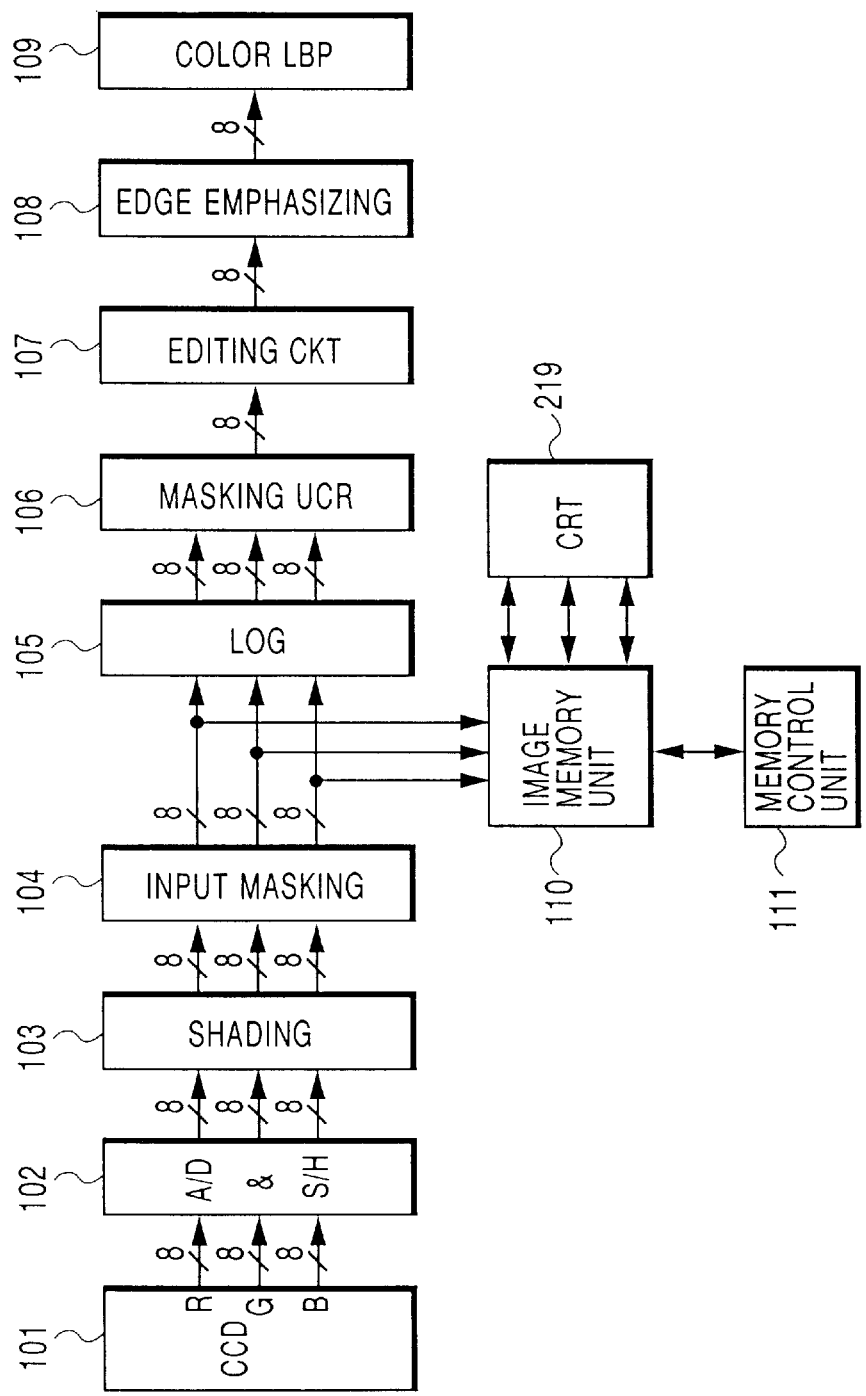
FIG. 42 is a diagram showing the structure of a conventional image processing apparatus.

FIG. 40 is a flow chart illustrating an example of a color matching adjustment which is executed by the CPU 10 upon an instruction of color matching adjustment entered by an operator from an unrepresented operation unit.

First at steps S31 and S32, it is judged from an operator instruction whether illumination light is changed (or illumination apparatus is replaced) or monitor light is changed (or monitor is replaced), and the flow branches in accordance with this judgement. A) In the case where monitor light is changed (or monitor is replaced).

Steps S22 and S23 are executed. In this case, the conditions of solving the equation (1) are different from the equations (2). As predetermined illumination light, light D65 of CIE standards is used and normalized by Y=1.

R=G=B=1

X=0.9504 (6)

Z=1.0889

Next, at step S33, the inverse matrix $M^{\wedge}(-1)$ of the conversion matrix M is calculated, the coefficients of the 3×3 matrix circuit 13 are updated by the calculated coefficients, and thereafter steps S26 and S27 are executed. In this manner, if the input values of R. G, and B to the gamma correction circuit 5 are equal, the mixed amounts of [R], [G], and [B] become equal and the white color [W] of illumination light can be automatically set.

B) In the case where illumination light is changed (or illumination apparatus is replaced)

First, at step S34 the xy chromaticity coordinates (Xw, Yw) of white color [W] of illumination light and the luminance E are measured with the color separation sensor 8. Next, at step S35, chromatic adaptation predicted from the measurement results is calculated, and at step S36 the conversion table of the chromatic adaptation correction circuit is updated.

Although several chromatic adaptation prediction equations have been proposed, it is preferable to use a CIE chromatic adaptation prediction equation. Sample light to be used may be light D65 of CIE standards.

With this chromatic adaptation predication equation, first, the matrix calculations of the following equation (7) are executed and the tristimulus values XYZ are converted into tristimulus values RGB basing upon the fundamental spectral sensitivity. As shown by the following equation (8), the respective stimulus values are converted into stimulus values R', G', and B' after the chromatic adaptation, by using non-linear functions fr, fg, and fb. Thereafter, as shown by the following equation (9), the original tristimulus values X', Y', and Z' are obtained.

$$\begin{bmatrix} R \\ G \\ B \end{bmatrix} = \begin{bmatrix} a11 & a12 & a13 \\ a21 & a22 & a23 \\ a31 & a32 & a33 \end{bmatrix} \begin{bmatrix} X \\ Y \\ Z \end{bmatrix} = A \begin{bmatrix} X \\ Y \\ Z \end{bmatrix} \quad (7)$$

$$R' = fr(R, Xw, Yw, E)$$
$$G' = fg(G, Xw, Yw, E) \quad (8)$$
$$B' = fb(B, Xw, Yw, E)$$

$$\begin{bmatrix} X' \\ Y' \\ Z' \end{bmatrix} = A^{\wedge}(-1) \begin{bmatrix} R' \\ G' \\ B' \end{bmatrix} \quad (9)$$

where $A^{\wedge}(-1)$ is an inverse matrix of a matrix A, and E is a luminance of illumination light.

In accordance with the relationship between (X, Y, Z) and (X', Y', Z') obtained from the equations (7) to (9), a three-dimensional conversion table is generated and the conversion table of the chromatic adaptation correction circuit 12 is updated to thereby realize predicted chromatic adaptation on the monitor 7.

As above, in the image processing apparatus of this embodiment, white color of illumination light can be realized on the monitor 7 by using the color separation sensor 8 and A/D converter 9. Therefore, as described earlier, if the coloring characteristics of the monitor 7 change because the monitor is degraded or it is replaced by a new one, or if the color temperature of illumination light changes because the monitor is installed at a different position or an illumination apparatus is replaced by a new one, the color of a hard copy output and the color of a preview image become different. In such a case, the white color of the monitor 7 can be easily made to coincide with the color temperature of illumination light.

Furthermore, a predicted chromatic adaptation can be realized on the monitor 7 so that the problem (chromatic adaptation) of a change in sensed color with a change in illumination light can be solved.

Obviously, the objects of the invention can be achieved also by storing program codes realizing the functions of the embodiments in a storage medium and reading and executing the program codes stored in the storage medium loaded in a system or an apparatus. In such a case, the program codes themselves read from a storage medium realize the novel functions of this invention, and the storage medium storing the program codes constitute the invention. The storage medium for storing program codes may be a floppy disk, a hard disk, an optical disk, a magnetooptical disk, a CD-ROM, a magnetic tape, a non-volatile memory card, or a ROM.

Figure 3:
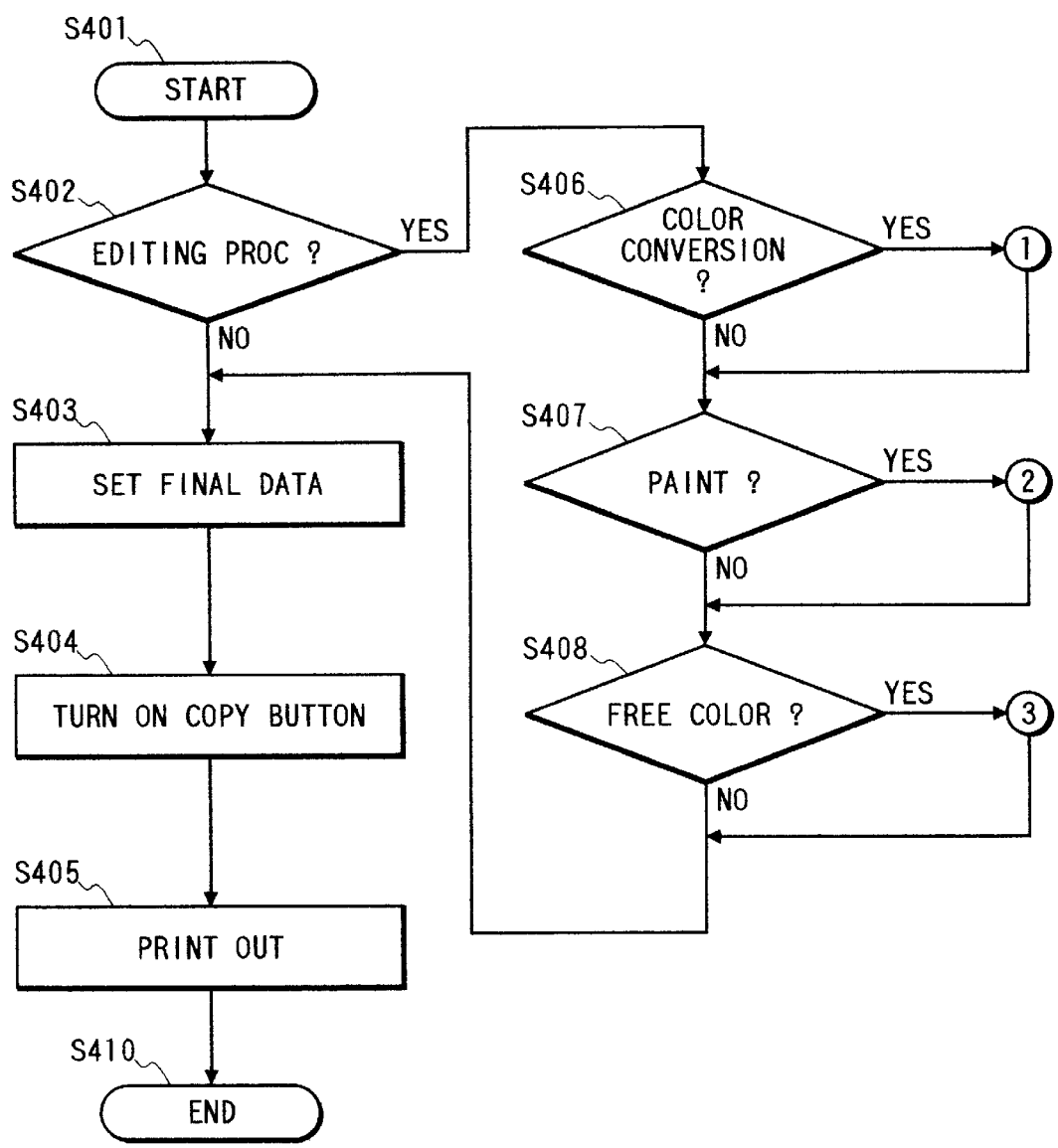
FIG. 3 is a flow chart illustrating an example of the overall operation of an editing process of the first embodiment.

FIGS. 41A and 41B are diagrams showing examples of memory maps of a storage medium storing the program codes for the third embodiment and its modification, reference numerals affixed to each module corresponding to the step serial numbers of FIG. 3 or FIG. 40.

The invention is not limited only to the above embodiments, and various modifications are possible without departing from the scope of the appended claims.

What is claimed is:

1. An image processing apparatus for receiving, from an image forming apparatus with a logarithm conversion process and a masking process, density data subjected to said logarithm conversion process and said masking process, and generating preview image data to display a preview image on a monitor, comprising:

inverse masking process means for subjecting said input density data to an inverse masking process corresponding to an inverse process of said masking process;

inverse logarithm conversion process means for performing an inverse logarithm conversion process corresponding to an inverse process of said logarithm conversion process;

monitor color correction means for correcting color in accordance with the coloring characteristics of said monitor; and monitor gamma correction means for correcting color in accordance with the gradation characteristics of said monitor.

2. An image processing apparatus according to claim 1, wherein said input density data contains Y, M, C, and K components, and said inverse masking process converts said input density data containing the Y, M, C, and K components into density data containing Y, M, and C components.

3. An image processing apparatus according to claim 1, further comprising control means for changing a parameter used by each of said process means while an operation of said masking process means is made in cooperation with an operation of said inverse masking process means.

4. An image processing apparatus according to claim 1, further comprising color correction means for correcting color of luminance data obtained by said inverse logarithm process means in accordance with the display characteristics and observation conditions of said display, and generating said preview image data being dependent on said display.

5. An image processing apparatus according to claim 1, further comprising mode setting means for manually setting a mode, wherein said parameter corresponds to the mode set by said mode setting means.

6. An image processing apparatus comprising:

measurement means for measuring a first color temperature of white color of a display and a second color temperature of ambient light; and conversion means for converting an input image signal into an image signal for the display in accordance with the measurement results of said measurement means, wherein said conversion means performs an image signal conversion so as to match said first color temperature with said second color temperature.

7. An image processing apparatus according to claim 6, wherein said input image signal is an image signal to be printed, and said conversion means converts a color specification system of the image signal.

8. An image processing apparatus according to claim 6, wherein said measurement means includes a color separation sensor and an A/D converter.

9. An image processing apparatus according to claim 6, wherein said ambient light is illumination light near the image processing apparatus.

10. An image processing apparatus according to claim 6, wherein said conversion means further comprises color adaptation correction means for correcting said image signal by predicting color sensed under the ambient light.

11. An image processing apparatus according to claim 10, wherein said measurement means measures displayed color while the emission level of each of R, G, and B colors of said display is stepwise changed.

12. A method of processing an image signal in which from an image forming apparatus with a logarithm conversion process and a masking process, density data subjected to said logarithm conversion process and said masking process is received, and preview image data is generated to display a preview image on a monitor, comprising the steps of:

subjecting said input density data to an inverse masking process corresponding to an inverse process of said masking process;

performing an inverse logarithm conversion process corresponding to an inverse process of said logarithm conversion process;

correcting color in accordance with the coloring characteristics of said monitor; and correcting color in accordance with the gradation characteristics of said monitor.

13. A method of processing an image signal comprising the steps of:

measuring a first color temperature of white color of a display and a second color temperature of ambient light; and converting an input image signal into an image signal for the display in accordance with the measurement results by said measuring step, wherein said converting step performs an image signal conversion so as to match said first color temperature with said second color temperature.

14. An image processing method comprising the steps of:

providing plural correction data in correspondence with plural combinations of type information of a display, color temperature information of the display and type information of observation ambient light;

setting the type information and the color temperature information of the display displaying a color image, and the type information of the observation ambient light of the color image;

selecting correction data based on the set information, from the correction data provided in said providing step; and performing correction on color image data by using the selected correction data.

15. A method according to claim 14, wherein there is provided a user interface to manually set the type information and the color temperature information of the display displaying the color image, and the type information of the observation ambient light of the color image.

16. A method according to claim 14, further comprising the step of performing gamma conversion on the corrected color image data.

17. An image processing apparatus comprising:

providing means for providing plural correction data in correspondence with plural combinations of type information of a display, color temperature information of the display and type information of observation ambient light;

setting means for setting the type information and the color temperature information of the display displaying a color image, and the type information of the observation ambient light of the color image;

selecting means for selecting the correction data based on the set information, from the correction data provided by said providing means; and correcting means for performing correction on the color image data by using the selected correction data.

18. An image processing method for generating preview image data representing a preview image, to confirm on a display an output color image generated by an image forming apparatus, comprising the steps of:

inputting from the image forming apparatus color image data representative of the output color image, the color image data depending on output characteristics of the image forming apparatus;

setting a type of the display and color temperature of the display;

selecting a conversion parameter according to the type of the display and the color temperature of the display; and converting the color image data by using the selected conversion parameter, such that the preview image is matched to the output color image.

19. An image processing apparatus for generating preview image data representing a preview image, to confirm on a display an output color image generated by an image forming apparatus, comprising:

input means for inputting from said image forming apparatus color image data representative of the output color image, the color image data depending on output characteristics of said image forming apparatus;

setting means for setting a type of said display and color temperature of said display;

selecting means for selecting a conversion parameter according to the type of said display and the color temperature of said display; and converting means for converting the color image data by using the selected conversion parameter, such that the preview image is matched to the output color image.

20. An image processing apparatus according to claim 19, wherein said image forming apparatus comprises masking process means for performing a masking process and logarithm conversion process means for performing a logarithm conversion process, and said conversion means comprises inverse masking means for performing an inverse masking process corresponding to an inverse process of said masking process and inverse logarithm conversion means for performing an inverse logarithm process corresponding to an inverse process of said logarithm process.

21. An image processing apparatus according to claim 19, wherein said image forming apparatus comprises a scanner for reading an original and generating image data representative of said original and image forming means for forming an image on a recording medium in accordance with said color image data.

22. An image processing apparatus according to claim 19, wherein said converting means performs a matrix calculation process in accordance with the type of said display.

23. An image processing apparatus according to claim 19, wherein said setting means sets observation ambient light of the preview image, and said converting means converts the color image data according to the observation ambient light.

24. An image processing apparatus according to claim 19, further comprising gamma conversion means for performing gamma conversion on the converted color image data, based on a user's manual instructions.

25. An image processing apparatus according to claim 19, wherein said setting means comprises a user interface for inputting a user's instructions concerning the type of said display and the color temperature of said display.

26. An image processing method which performs color processing for output to a display, comprising the steps of:

inputting type information of the display, color temperature information of the display and information of observation ambient light;

setting correction data in accordance with the type information of the display, the color temperature information of the display and the information of the observation ambient light, such that a tint of an image displayed on the display to which a color temperature based on the color temperature information has been set under the observation ambient light is accurate; and performing the color processing to input color image data based on the correction data set in said setting step.

27. An image processing method according to claim 26, further comprising a step of calculating the correction data in accordance with a change of state of the display or change of the observation ambient light.

28. An image processing method according to claim 27, wherein said step of calculating is performed in accordance with an instruction of an operator.

29. An image processing method according to claim 26, further comprising inputting color image data for producing an image.

30. An image processing method according to claim 26, further comprising a step of affecting gamma conversion instructed by an operator to said modified color image data.

31. An image processing apparatus which performs color processing for output to a display comprising:

input means for inputting type information of the display, color temperature information of the display and information of observation ambient light;

setting means for setting correction data in accordance with the type information of the display, the color temperature information of the display and the information of the observation ambient light, such that a tint of an image displayed on the display to which a color temperature based on the color temperature information has been set under the observation ambient light is accurate; and means for performing the color processing to input color image data based on the correction data set by said setting means.

32. A computer readable medium having recorded thereon codes for implementing a computer implementable method of image processing which performs color processing for output to a display comprising the steps of:

inputting type information of the display, color temperature information of the display and information of the display and information of observation ambient light;

setting correction data in accordance with the type information of the display, the color temperature information of the display and the information of observation ambient light, such that a tint of an image displayed on the display to which a color temperature based on the color temperature information has been set under the observation ambient light is accurate; and performing the color processing to input color image data based on the correction data set in said setting step.

* * * * *

UNITED STATES PATENT AND TRADEMARK OFFICE
CERTIFICATE OF CORRECTION

PATENT NO.    : 6,198,553 B1                                            Page 1 of 2
DATED         : March 6, 2001
INVENTOR(S)   : Nobuo Yamamoto et al.

It is certified that error appears in the above-identified patent and that said Letters Patent is hereby corrected as shown below:

<u>Title page,</u>
Insert -- (*) Notice:  This patent issued on a continued prosecution application filed under 37 CFR 1.53(d), and is subject to the twenty year patent term provisions of 35 U.S.C. 1.54(a)(2). --.

<u>Column 5,</u>
Line 18, "from which" should be deleted.

<u>Column 6,</u>
Line 34, "sued" should read -- used --.

<u>Column 7,</u>
Line 40, "enable" should read -- enabled --; and
Line 59, "enable" should read -- enabled --.

<u>Column 10,</u>
Line 32, "all" should read -- all --.

<u>Column 17,</u>
Line 50, "represents" should read -- represent --.

<u>Column 23,</u>
Line 20, "all" should read -- al l --.

<u>Column 26,</u>
Line 7, "adjustment" should read -- the adjustment --.

UNITED STATES PATENT AND TRADEMARK OFFICE
CERTIFICATE OF CORRECTION

PATENT NO.    : 6,198,553 B1
DATED         : March 6, 2001
INVENTOR(S)   : Nobuo Yamamoto et al.

It is certified that error appears in the above-identified patent and that said Letters Patent is hereby corrected as shown below:

Column 28,
Line 24, "judgement. A)" should read -- judgement. ¶A) --.

Signed and Sealed this

Sixth Day of August, 2002

Attest:

JAMES E. ROGAN
Attesting Officer        Director of the United States Patent and Trademark Office